United States Patent
Penilla et al.

(10) Patent No.: US 9,123,035 B2
(45) Date of Patent: Sep. 1, 2015

(54) ELECTRIC VEHICLE (EV) RANGE EXTENDING CHARGE SYSTEMS, DISTRIBUTED NETWORKS OF CHARGE KIOSKS, AND CHARGE LOCATING MOBILE APPS

(76) Inventors: Angel A. Penilla, San Jose, CA (US); Albert S. Penilla, Sunnyvale, CA (US)

(*) Notice: Subject to any disclaimer, the term of this patent is extended or adjusted under 35 U.S.C. 154(b) by 520 days.

(21) Appl. No.: 13/452,882

(22) Filed: Apr. 22, 2012

(65) Prior Publication Data
US 2012/0271723 A1 Oct. 25, 2012

Related U.S. Application Data

(60) Provisional application No. 61/478,436, filed on Apr. 22, 2011.

(51) Int. Cl.
H02J 7/00 (2006.01)
G06Q 20/18 (2012.01)
(Continued)

(52) U.S. Cl.
CPC ............ *G06Q 20/18* (2013.01); *B60L 11/1816* (2013.01); *B60L 11/1822* (2013.01); *B60L 11/1861* (2013.01); *B60S 5/06* (2013.01); *G01C 21/3679* (2013.01); *G06Q 10/20* (2013.01); *G06Q 30/00* (2013.01); *G06Q 30/0643* (2013.01); *G06Q 30/0645* (2013.01); *G07F 15/005* (2013.01); *H04B 5/0037* (2013.01); *H04W 4/02* (2013.01); *B60L 2240/547* (2013.01); *Y02T 10/705* (2013.01); *Y02T 10/7005* (2013.01); *Y02T 10/7044* (2013.01);
(Continued)

(58) Field of Classification Search
USPC .............. 320/109, 107, 104; 180/65.1, 65.21; 307/10.1; 701/22
See application file for complete search history.

(56) References Cited

U.S. PATENT DOCUMENTS

| 1,387,848 A | 8/1921 | Good |
| 3,690,397 A | 9/1972 | Parker |

(Continued)

FOREIGN PATENT DOCUMENTS

| EP | 0 693 813 | 1/1996 |
| EP | 2 101 390 | 9/2009 |

(Continued)

OTHER PUBLICATIONS

Angel Penilla, Related Application Specification for U.S. Appl. No. 14/595,186, filed Jan. 12, 2015.

(Continued)

*Primary Examiner* — Yalkew Fantu

(57) ABSTRACT

Systems and method are provided for providing auxiliary charge to a main battery of an electric vehicle. One system includes an auxiliary battery for holding a plurality of charge units, the auxiliary battery being connectable to the main battery of the electric vehicle, the plurality of charge units being rechargeable and being replaceable from within the auxiliary battery, such that replacing particular ones of the plurality of charge units with charge units with more charge increases a total charge of the auxiliary battery. Kiosks for storing a plurality of charge units. A display in the kiosk for an interface for enabling transactions to provide or receive charge units to customers, and a central processing center that communicates with a plurality of said kiosk over a network and a plurality of vehicles, The plurality of vehicles are provided with access to availability information of charge units at each of said kiosks.

16 Claims, 44 Drawing Sheets

(51) Int. Cl.
  *G07F 15/00*    (2006.01)
  *B60S 5/06*     (2006.01)
  *B60L 11/18*    (2006.01)
  *G01C 21/36*    (2006.01)
  *G06Q 10/00*    (2012.01)
  *G06Q 30/00*    (2012.01)
  *G06Q 30/06*    (2012.01)
  *H04B 5/00*     (2006.01)
  *H04W 4/02*     (2009.01)

(52) U.S. Cl.
  CPC ............ *Y02T 10/7072* (2013.01); *Y02T 90/124* (2013.01); *Y02T 90/128* (2013.01); *Y02T 90/14* (2013.01); *Y02T 90/16* (2013.01)

(56) References Cited

U.S. PATENT DOCUMENTS

| | | |
|---|---|---|
| 3,799,063 A | 3/1974 | Reed |
| 3,867,682 A | 2/1975 | Ohya |
| 4,052,655 A | 10/1977 | Vizza |
| 4,087,895 A | 5/1978 | Etienne |
| 4,102,273 A | 7/1978 | Merkle et al. |
| 4,132,174 A | 1/1979 | Ziegenfus et al. |
| 4,162,445 A | 7/1979 | Campbell |
| 4,216,839 A | 8/1980 | Gould et al. |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,187,423 A | 2/1993 | Marton |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,339,250 A | 8/1994 | Durbin |
| 5,343,970 A | 9/1994 | Severinsky |
| 5,349,535 A | 9/1994 | Gupta |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diler et al. |
| 5,488,283 A | 1/1996 | Doughert et al. |
| 5,492,190 A | 2/1996 | Yoshida |
| 5,544,784 A | 8/1996 | Malaspina |
| 5,548,200 A * | 8/1996 | Nor et al. ............ 320/109 |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,596,261 A | 1/1997 | Suyama |
| 5,612,606 A | 3/1997 | Guimarin et al. |
| 5,627,752 A | 5/1997 | Buck et al. |
| 5,631,536 A | 5/1997 | Tseng |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,815,824 A | 9/1998 | Saga et al. |
| 5,892,598 A | 4/1999 | Asakawa et al. |
| 5,898,282 A | 4/1999 | Drozdz et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,016,882 A | 1/2000 | Ishikawa |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,177,867 B1 | 1/2001 | Simon et al. |
| 6,177,879 B1 | 1/2001 | Kokubu et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,403,251 B1 | 6/2002 | Baggaley et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,498,457 B1 | 12/2002 | Tsuboi |
| 6,511,192 B1 | 1/2003 | Henion |
| 6,515,580 B1 | 2/2003 | Isoda et al. |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,822,560 B2 | 11/2004 | Geber et al. |
| 6,850,898 B1 | 2/2005 | Murakami |
| 6,899,268 B2 | 5/2005 | Hara |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 * | 9/2005 | Nagamine et al. ............ 320/109 |
| 6,952,795 B2 | 10/2005 | O'Gorman et al. |
| 7,010,682 B2 | 3/2006 | Reinold et al. |
| 7,013,205 B1 | 3/2006 | Hafner |
| 7,039,389 B2 | 5/2006 | Johnson, Jr. |
| 7,084,781 B2 | 8/2006 | Chuey |
| 7,131,005 B2 | 10/2006 | Levenson et al. |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,392,068 B2 | 6/2008 | Dayan et al. |
| 7,402,978 B2 | 7/2008 | Pryor |
| 7,415,332 B2 | 8/2008 | Ito et al. |
| 7,489,993 B2 * | 2/2009 | Coffee et al. ............ 701/32.3 |
| 7,495,543 B2 | 2/2009 | Denison et al. |
| 7,532,965 B2 | 5/2009 | Robillard |
| 7,565,396 B2 | 7/2009 | Hoshina |
| 7,567,166 B2 | 7/2009 | Bourgine De Meder |
| 7,617,893 B2 | 11/2009 | Syed et al. |
| 7,630,802 B2 | 12/2009 | Breed |
| 7,650,210 B2 | 1/2010 | Breed |
| 7,674,536 B2 | 3/2010 | Chipchase |

(56) References Cited

U.S. PATENT DOCUMENTS

| | | |
|---|---|---|
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,761,307 B2 | 7/2010 | Ochi et al. |
| 7,778,746 B2 | 8/2010 | McLeod |
| 7,796,052 B2 | 9/2010 | Katz |
| 7,850,351 B2 | 12/2010 | Pastrick et al. |
| 7,868,591 B2 | 1/2011 | Phillips et al. |
| 7,869,576 B1 | 1/2011 | Rodkey et al. |
| 7,885,893 B2 | 2/2011 | Alexander |
| 7,908,020 B2 | 3/2011 | Pieronek |
| 7,948,207 B2 | 5/2011 | Scheucher |
| 7,949,435 B2 | 5/2011 | Pollack |
| 7,956,570 B2 | 6/2011 | Lowenthal |
| 7,979,147 B1 | 7/2011 | Dunn |
| 7,979,198 B1 | 7/2011 | Kim et al. |
| 7,986,126 B1 | 7/2011 | Bucci |
| 7,991,665 B2 | 8/2011 | Hafner |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,027,843 B2 | 9/2011 | Bodin et al. |
| 8,035,341 B2 | 10/2011 | Genzel et al. |
| 8,036,788 B2 | 10/2011 | Breed |
| 8,054,048 B2 | 11/2011 | Woody |
| 8,063,762 B2 | 11/2011 | Sid |
| 8,068,952 B2 | 11/2011 | Valentine et al. |
| 8,072,318 B2 | 12/2011 | Lynam |
| 8,103,391 B2 | 1/2012 | Ferro et al. |
| 8,106,631 B2 | 1/2012 | Abe |
| 8,118,132 B2 | 2/2012 | Gray, Jr. |
| 8,164,300 B2 | 4/2012 | Agassi et al. |
| 8,229,625 B2 | 7/2012 | Lal et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,301,365 B2 | 10/2012 | Niwa et al. |
| 8,326,259 B2 | 12/2012 | Gautama et al. |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,412,401 B2 | 4/2013 | Bertosa et al. |
| 8,437,908 B2 | 5/2013 | Goff et al. |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0070851 A1 | 6/2002 | Raichle et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0141840 A1 | 7/2003 | Sanders |
| 2003/0153278 A1 | 8/2003 | Johnson |
| 2003/0163434 A1 | 8/2003 | Barends |
| 2003/0205619 A1 | 11/2003 | Terranova et al. |
| 2003/0209375 A1* | 11/2003 | Suzuki et al. ............... 180/65.3 |
| 2003/0234325 A1 | 12/2003 | Marino et al. |
| 2004/0046506 A1 | 3/2004 | Kawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0236615 A1 | 11/2004 | Msndy |
| 2004/0246119 A1 | 12/2004 | Martin et al. |
| 2004/0265671 A1 | 12/2004 | Chipchase et al. |
| 2005/0021190 A1 | 1/2005 | Worrell et al. |
| 2005/0035741 A1* | 2/2005 | Elder et al. .................. 320/116 |
| 2005/0044245 A1 | 2/2005 | Hoshina |
| 2005/0231119 A1 | 10/2005 | Ito et al. |
| 2006/0047380 A1 | 3/2006 | Welch |
| 2006/0125620 A1 | 6/2006 | Smith et al. |
| 2006/0182241 A1 | 8/2006 | Schelberg |
| 2006/0208850 A1 | 9/2006 | Ikeuchi et al. |
| 2006/0282381 A1 | 12/2006 | Ritchie |
| 2006/0287783 A1 | 12/2006 | Walker |
| 2007/0035397 A1 | 2/2007 | Patenaude et al. |
| 2007/0068714 A1 | 3/2007 | Bender |
| 2007/0090921 A1 | 4/2007 | Fisher |
| 2007/0126395 A1 | 6/2007 | Suchar |
| 2007/0159297 A1 | 7/2007 | Paulk et al. |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0024872 A1 | 1/2009 | Beverly |
| 2009/0030712 A1 | 1/2009 | Bogolea |
| 2009/0033456 A1 | 2/2009 | Castillo et al. |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0112394 A1 | 4/2009 | Lepejian et al. |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0240575 A1 | 9/2009 | Bettez et al. |
| 2009/0287578 A1 | 11/2009 | Paluszek |
| 2009/0304101 A1* | 12/2009 | LoPorto et al. .............. 375/260 |

(56) References Cited

U.S. PATENT DOCUMENTS

| | | |
|---|---|---|
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0052588 A1 | 3/2010 | Okamura et al. |
| 2010/0057306 A1 | 3/2010 | Ishii et al. |
| 2010/0089547 A1 | 4/2010 | King et al. |
| 2010/0094496 A1 | 4/2010 | Hershkovitz et al. |
| 2010/0112843 A1 | 5/2010 | Heichai et al. |
| 2010/0114798 A1 | 5/2010 | Sirton |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0201482 A1 | 8/2010 | Robertson et al. |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0071932 A1 | 3/2011 | Agassi et al. |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112710 A1 | 5/2011 | Meyer-Ebeling et al. |
| 2011/0112969 A1 | 5/2011 | Zaid et al. |
| 2011/0114798 A1 | 5/2011 | Gemmati |
| 2011/0130885 A1 | 6/2011 | Bowen et al. |
| 2011/0148346 A1 | 6/2011 | Gagosz et al. |
| 2011/0160992 A1 | 6/2011 | Crombez |
| 2011/0169447 A1 | 7/2011 | Brown et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0200193 A1 | 8/2011 | Blitz et al. |
| 2011/0202218 A1 | 8/2011 | Yano |
| 2011/0202476 A1 | 8/2011 | Nagy et al. |
| 2011/0224900 A1 | 9/2011 | Hiruta et al. |
| 2011/0246252 A1 | 10/2011 | Uesugi |
| 2011/0270480 A1 | 11/2011 | Ishibashi et al. |
| 2011/0279083 A1 | 11/2011 | Asai |
| 2011/0279257 A1 | 11/2011 | Au et al. |
| 2011/0303509 A1 | 12/2011 | Agassi et al. |
| 2011/0309929 A1 | 12/2011 | Myers |
| 2012/0013300 A1 | 1/2012 | Prosser et al. |
| 2012/0019196 A1 | 1/2012 | Fung |
| 2012/0019204 A1 | 1/2012 | Matsuo |
| 2012/0025765 A1 | 2/2012 | Frey et al. |
| 2012/0028680 A1 | 2/2012 | Breed |
| 2012/0038473 A1 | 2/2012 | Fecher |
| 2012/0041624 A1 | 2/2012 | Stewart et al. |
| 2012/0053754 A1 | 3/2012 | Pease |
| 2012/0062361 A1 | 3/2012 | Kosugi |
| 2012/0068817 A1 | 3/2012 | Fisher |
| 2012/0074903 A1 | 3/2012 | Nakashima |
| 2012/0078413 A1 | 3/2012 | Baker, Jr. |
| 2012/0105197 A1 | 5/2012 | Kobres |
| 2012/0109519 A1 | 5/2012 | Uyeki |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158229 A1 | 6/2012 | Schaefer |
| 2012/0158244 A1 | 6/2012 | Talty et al. |
| 2012/0179323 A1 | 7/2012 | Profitt-Brown et al. |
| 2012/0194346 A1 | 8/2012 | Tsai et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0248868 A1 | 10/2012 | Mobin et al. |
| 2012/0256588 A1 | 10/2012 | Hayashi et al. |
| 2012/0259665 A1 | 10/2012 | Pandhi et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0024306 A1 | 1/2013 | Shah et al. |
| 2013/0026972 A1 | 1/2013 | Luke et al. |
| 2013/0027183 A1 | 1/2013 | Wu et al. |
| 2013/0030581 A1 | 1/2013 | Luke et al. |
| 2013/0030630 A1 | 1/2013 | Luke et al. |
| 2013/0033203 A1 | 2/2013 | Luke et al. |
| 2013/0037339 A1 | 2/2013 | Hickox |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0116892 A1 | 5/2013 | Wu et al. |
| 2013/0119898 A1 | 5/2013 | Ohkura |
| 2013/0127247 A1 | 5/2013 | Oh et al. |
| 2013/0127416 A1 | 5/2013 | Karner et al. |
| 2013/0132307 A1 | 5/2013 | Phelps et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0181582 A1 | 7/2013 | Luke et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0254097 A1 | 9/2013 | Marathe et al. |
| 2013/0280018 A1 | 10/2013 | Meirer et al. |
| 2013/0282254 A1 | 10/2013 | Dwan et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0028089 A1 | 1/2014 | Luke et al. |
| 2014/0028255 A1* | 1/2014 | Brimacombe ............... 320/109 |
| 2014/0042968 A1 | 2/2014 | Hiroe |
| 2014/0047107 A1 | 2/2014 | Maturana et al. |
| 2014/0066049 A1 | 3/2014 | Cho et al. |

(56) References Cited

U.S. PATENT DOCUMENTS

| | | | |
|---|---|---|---|
| 2014/0089016 A1 | 3/2014 | Smullin et al. | |
| 2014/0106726 A1 | 4/2014 | Crosbie | |
| 2014/0118107 A1 | 5/2014 | Almomani | |
| 2014/0120829 A1 | 5/2014 | Bhamidipati | |
| 2014/0125355 A1 | 5/2014 | Grant | |
| 2014/0142783 A1 | 5/2014 | Grimm et al. | |
| 2014/0163771 A1 | 6/2014 | Demeniuk | |
| 2014/0163774 A1 | 6/2014 | Demeniuk | |
| 2014/0164559 A1 | 6/2014 | Demeniuk | |
| 2014/0172192 A1 | 6/2014 | Kato | |
| 2014/0172265 A1 | 6/2014 | Funabashi | |
| 2014/0172727 A1 | 6/2014 | Abhyanker et al. | |
| 2014/0179353 A1 | 6/2014 | Simon | |
| 2014/0200742 A1 | 7/2014 | Mauti et al. | |
| 2014/0203077 A1 | 7/2014 | Gadh et al. | |
| 2014/0207333 A1 | 7/2014 | Vandivier et al. | |
| 2014/0214261 A1 | 7/2014 | Ramamoorthy et al. | |
| 2014/0214321 A1 | 7/2014 | Kawamata et al. | |
| 2014/0218189 A1 | 8/2014 | Fleming et al. | |
| 2014/0232331 A1 | 8/2014 | Stamenic et al. | |
| 2014/0236414 A1 | 8/2014 | Droz et al. | |
| 2014/0236463 A1 | 8/2014 | Zhang et al. | |
| 2014/0253018 A1 | 9/2014 | Kong et al. | |
| 2014/0277936 A1 | 9/2014 | El Dokor et al. | |
| 2014/0278089 A1 | 9/2014 | Gusikhin et al. | |
| 2014/0300739 A1 | 10/2014 | Mimar | |

FOREIGN PATENT DOCUMENTS

| | | | |
|---|---|---|---|
| EP | 2 230 146 | | 9/2010 |
| EP | 2 428 939 | | 3/2012 |
| JP | 07-031008 | | 1/1995 |
| JP | 7-36504 | | 7/1995 |
| JP | 9-119839 | | 5/1997 |
| JP | 10170293 | | 6/1998 |
| JP | 10-307952 | | 11/1998 |
| JP | 11-049079 | | 2/1999 |
| JP | 11-51681 | | 2/1999 |
| JP | 11-176487 | | 7/1999 |
| JP | 11-205914 | | 7/1999 |
| JP | 2000-102102 | | 4/2000 |
| JP | 2000-102103 | | 4/2000 |
| JP | 2000-341868 | | 12/2000 |
| JP | 2001-128301 | | 5/2001 |
| JP | 2003-118397 | | 4/2003 |
| JP | 2003-262525 | | 9/2003 |
| JP | 2005-67453 | | 3/2005 |
| JP | 2009-171646 | | 7/2009 |
| JP | 2009-171647 | | 7/2009 |
| JP | 4319289 | | 8/2009 |
| JP | 2010-191636 | | 9/2010 |
| JP | 2010-200405 | | 9/2010 |
| JP | 2010-269686 | | 12/2010 |
| JP | 2011-126452 | | 6/2011 |
| JP | 2011-131631 | | 7/2011 |
| JP | 2011-142704 | | 7/2011 |
| KR | 1998-045020 | | 9/1998 |
| KR | 2004-0005146 | | 1/2004 |
| KR | 20100012401 | | 2/2010 |
| KR | 10-0971278 | | 7/2010 |
| KR | 20110004292 | | 1/2011 |
| KR | 20110041783 | | 4/2011 |
| TW | 200836452 | | 9/2008 |
| TW | I315116 | | 9/2009 |
| TW | M371880 | | 1/2010 |
| TW | M379269 | | 4/2010 |
| TW | M379789 | | 5/2010 |
| TW | M385047 | | 7/2010 |
| TW | 201043986 | | 12/2010 |
| TW | 201044266 | | 12/2010 |
| WO | 98/21132 | | 5/1998 |
| WO | 2009/039454 | | 3/2009 |
| WO | WO2009/039454 | * | 3/2009 |
| WO | 2010/033517 | | 3/2010 |
| WO | 2010/143483 | | 12/2010 |
| WO | 2011/138205 | | 11/2011 |
| WO | 2012/160407 | | 11/2012 |
| WO | 2012/160557 | | 11/2012 |
| WO | 2013/024483 | | 2/2013 |
| WO | 2013/024484 | | 2/2013 |
| WO | 2013/074819 | | 5/2013 |
| WO | 2013/080211 | | 6/2013 |
| WO | 2013/102894 | | 7/2013 |
| WO | 2013/108246 | | 7/2013 |
| WO | 2013/118113 | | 8/2013 |
| WO | 2013/142154 | | 9/2013 |
| WO | 2013/144951 | | 10/2013 |

OTHER PUBLICATIONS

Angel Penilla, Related Application Specification for U.S. Appl. No. 14/599,541, filed Jan. 18, 2015.
Angel Penilla, Related Application Specification for U.S. Appl. No. 14/602,256, filed Jan. 21, 2015.

* cited by examiner

Main charges auxiliary when main power charge is charging main battery, main battery is full and auxiliary is less than full Auxiliary battery is triggered to start being accessed for power after main battery reaches an empty threshold (e.g. ¼ charge or less).

Extra charge bars to fill / recharge auxiliary battery.

Motor pulls power from main battery or auxiliary battery independently, without charge transfer.

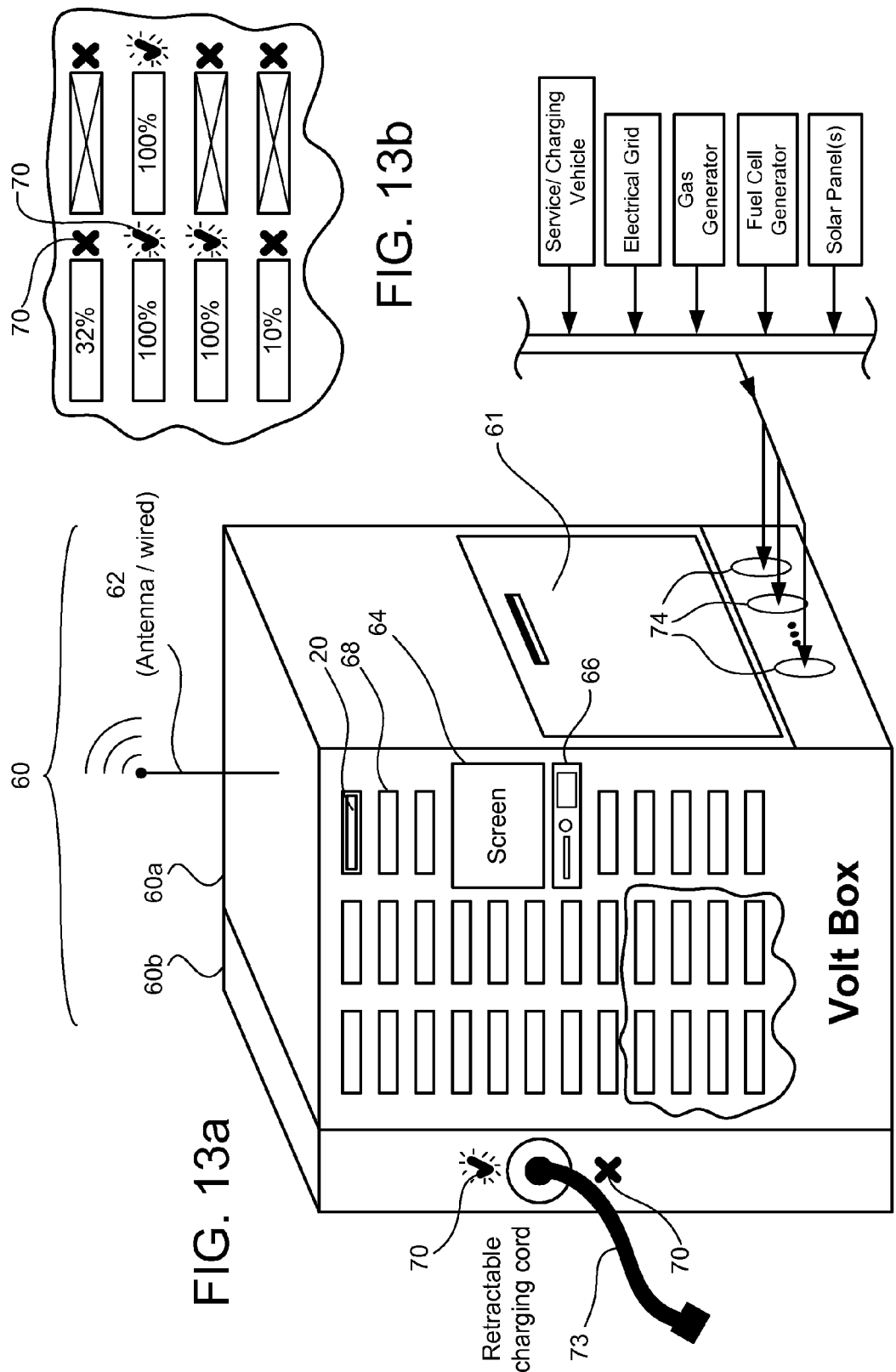

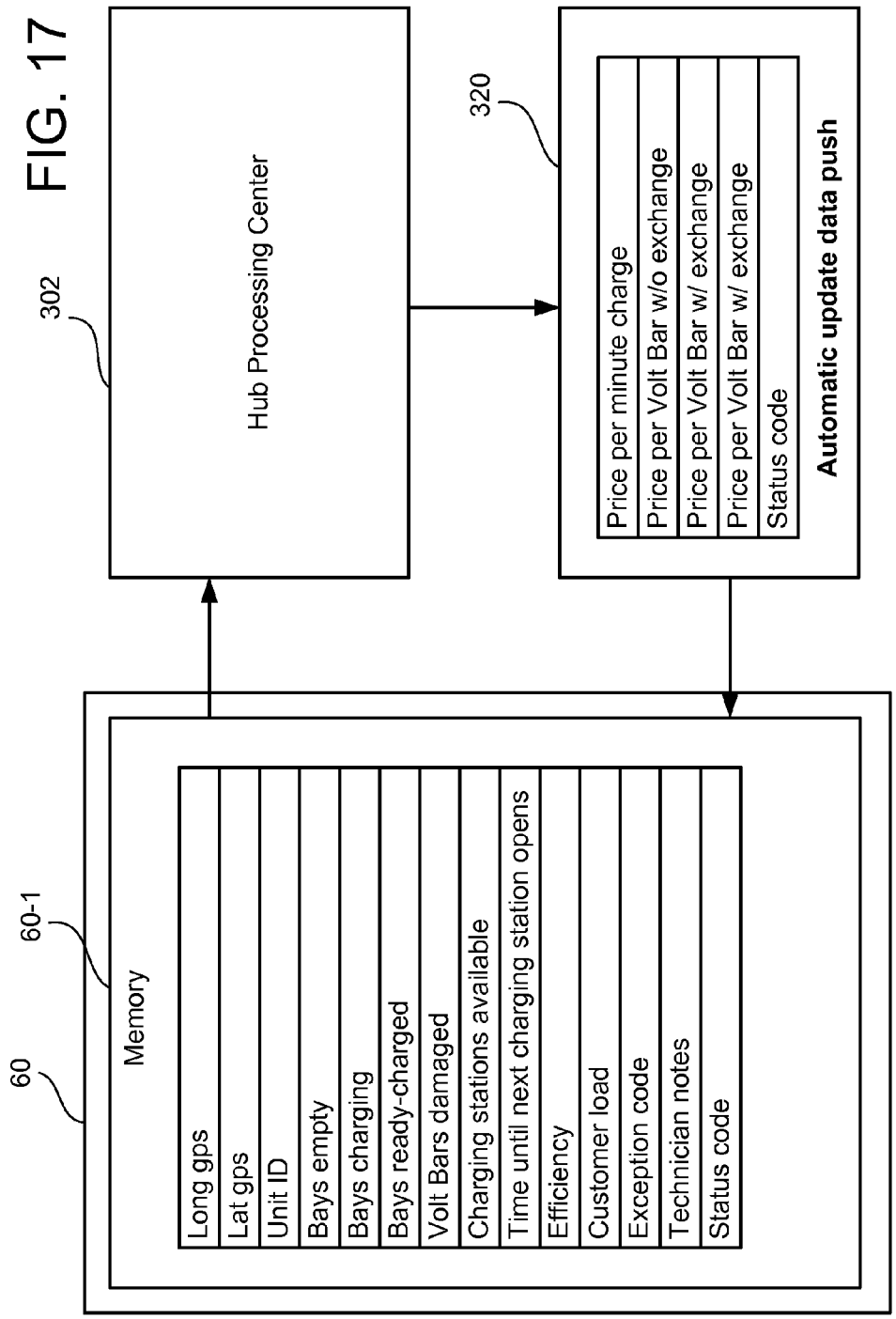

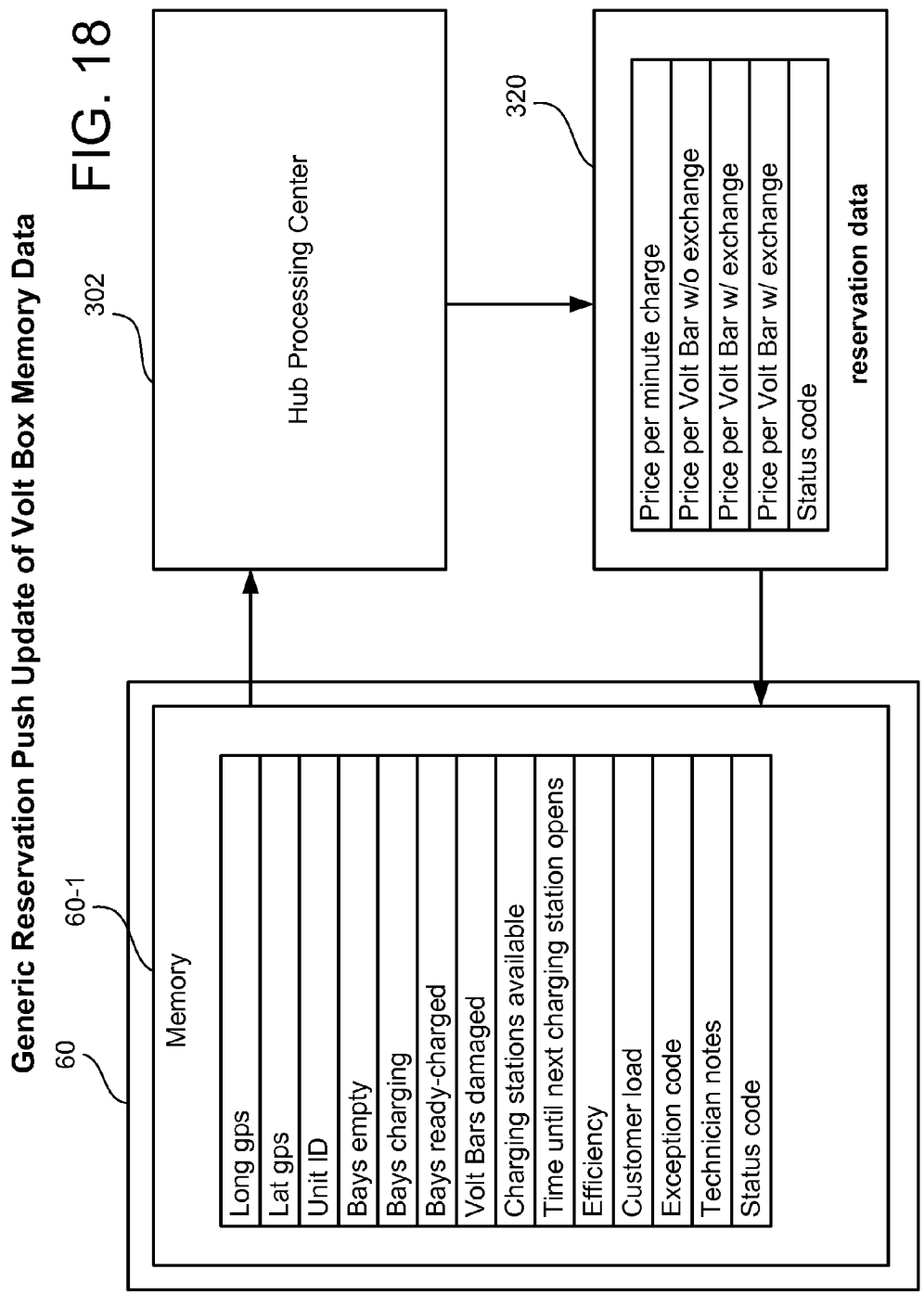

FIG. 36A
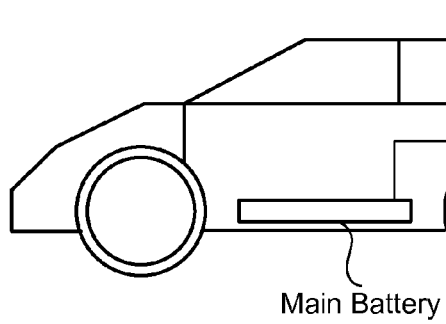
Main Battery
FIG. 36B
Top surface defines surface of trunk
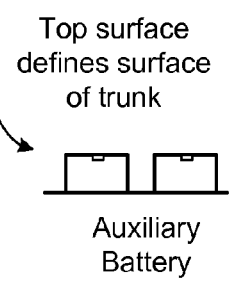
Auxiliary Battery
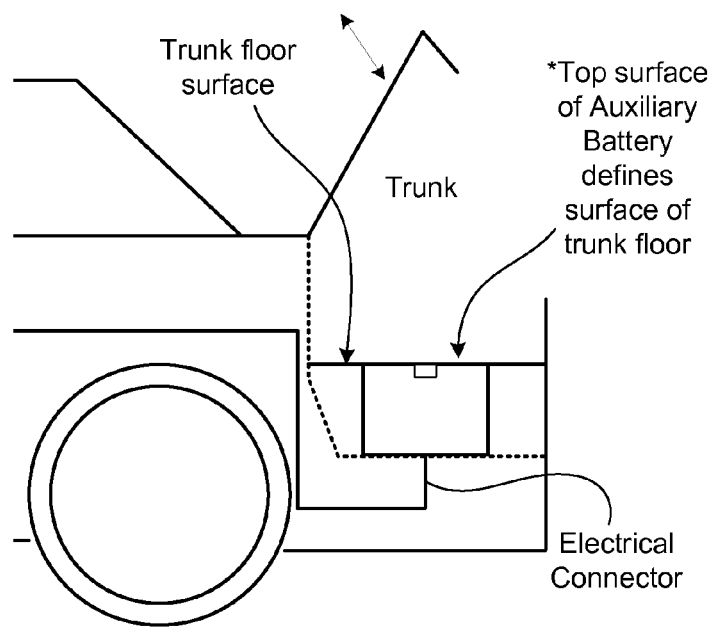
Trunk floor surface
Trunk
*Top surface of Auxiliary Battery defines surface of trunk floor
Electrical Connector
FIG. 36C Charge Station Metrics

| | |
|---|---|
| (Current Data) | - Plugs: 10<br>- In Use: 6 |
| (Historical Estimate) | - Available Now: 4<br>- Available in 20 min: 2<br>- Available in 2 hours: 8<br>- Available in 3 hours: 1<br>- Available in 3.5 hours: 0 |
| (Cost) | - Hourly cost schedule<br>- Green rating |

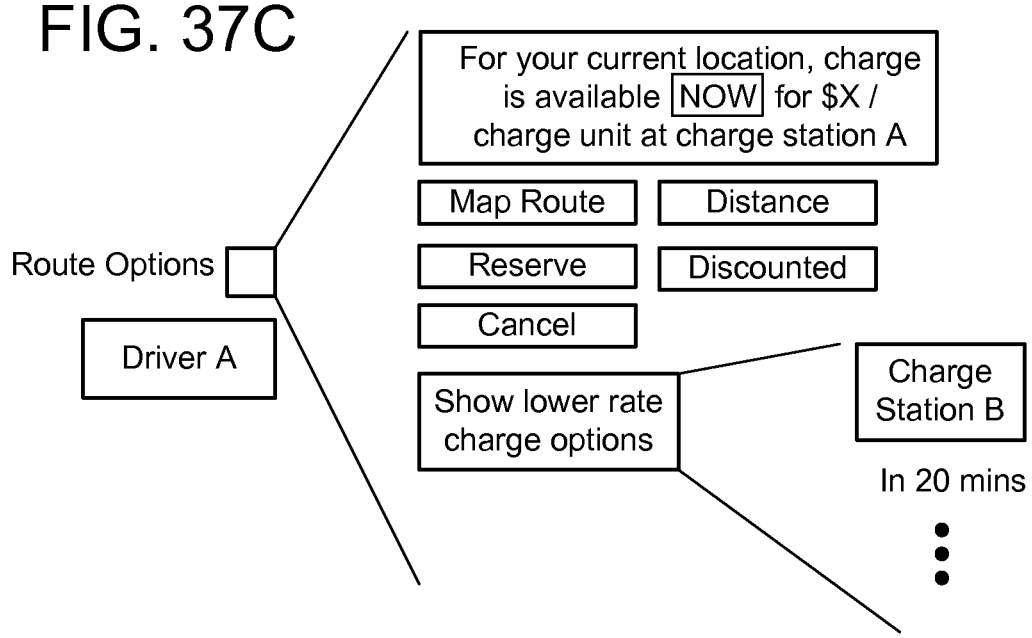

Route Options

Driver A

For your current location, charge is available NOW for $X / charge unit at charge station A Map Route   Distance
Reserve   Discounted
Cancel Show lower rate charge options Charge Station B In 20 mins

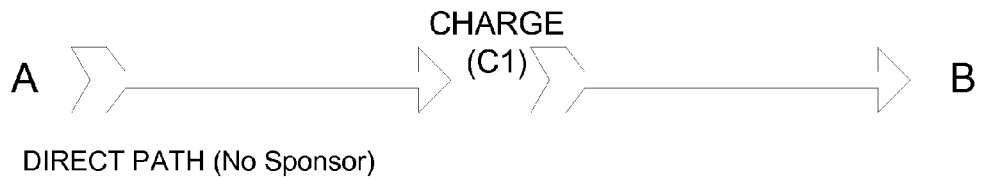
DIRECT PATH (No Sponsor)
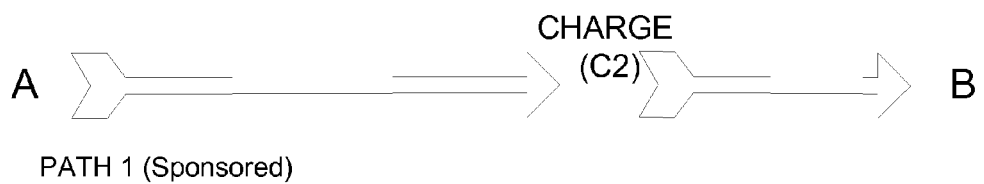
PATH 1 (Sponsored)
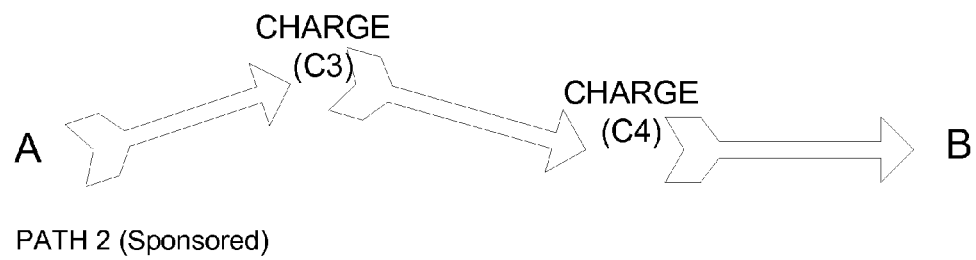
PATH 2 (Sponsored)
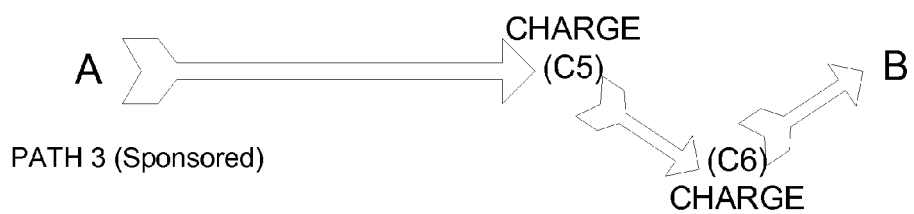
PATH 3 (Sponsored)
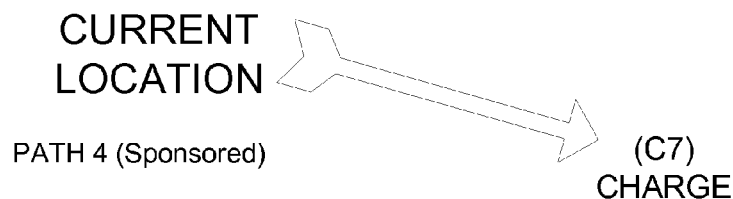
PATH 4 (Sponsored)
FIG. 39

| PATH | Number of Stops | Charge Location(s)/ Map Path | Sponsor/Reward | Est. Trip Time, with charge stop | Est. Cost |
|---|---|---|---|---|---|
| Direct Path (no sponsor) | 1 | C1 / MAP | No Reward | 12 min. | $10 |
| PATH 1 (sponsored) | 1 | C2: MAP (sponsored by Big Coffee Co.) | Big Coffee Co. $2 off Charge bill | 14 min. | $8 |
| PATH 2 (sponsored) | 2 | C3, C4 / MAP (Sponsored by: Quick Stop market & Big Coffee Co.) | Quick Stop Market & Big Coffee Co. $4 off Charge bill | 17 min | $6 |
| PATH 3 (sponsored) | 2 | C5, C6 / MAP (Sponsored by: Box Store & Big Coffee Co.) | Box Store & Big Coffee Co. $ 5 off Charge bill | 17 min | $5 |
| PATH 4 (sponsored) | 0 | C7 / MAP (Sponsored by: Big Coffee Co.) | Big Coffee Co. $ 1 off Charge bill | 5 min. | $9 |

FIG. 40

ELECTRIC VEHICLE (EV) RANGE EXTENDING CHARGE SYSTEMS, DISTRIBUTED NETWORKS OF CHARGE KIOSKS, AND CHARGE LOCATING MOBILE APPS

CLAIM OF PRIORITY

The present invention claims priority to U.S. Provisional Patent Application No. 61/478,436, filed on Apr. 22, 2011, and entitled Electric Vehicle (EV) Range Extending Charge Systems, Distributed Networks of Charge Kiosks, and Charge Locating Mobile Apps", which is herein incorporated by reference.

CROSS REFERENCE TO RELATED APPLICATION

This application is related to U.S. patent application Ser. No. 13/452,881 entitled "Methods and Systems for Processing Charge Availability and Route Paths for Obtaining Charge for Electric Vehicles", filed on the same date as the present application, and which is herein incorporated by reference.

FIELD OF THE EMBODIMENTS

The present invention relates to systems and methods that enable operators of electric vehicles (EV) to extend their range by utilizing auxiliary charging batteries. Also disclosed are systems for defining a network of charge dispensing kiosks, and mobile applications for obtaining information about available dispensing kiosks, availability of charge, reservations for charge, and purchasing of charge remotely.

BACKGROUND

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However specialty recharging stations are significantly few compared to fossil fuel stations. In fact, the scarcity of recharging stations in and around populated areas has caused owners of electric vehicles to coin the phrase "range anxiety," to connote the possibility that their driving trips may be limited in range, or that the driver of the electric vehicle will be stranded without recharging options. It is this problem of range anxiety that prevents more than electric car enthusiasts from switching to pure electric cars, and abandoning their expensive fossil fuel powered vehicles.

It is in this context that embodiments of the invention arise.

SUMMARY

Embodiments are described with reference to methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged without the vehicle, and can be installed or placed in the vehicle to provide supplemental charge to the vehicles main battery. Thus, if the main battery becomes drained/used, the auxiliary battery compartment, having a plurality of charged batteries, can resume providing charge to the vehicle.

In one embodiment, the auxiliary battery compartment is configured to hold a plurality of smaller batteries, referred to herein as "volt bars." A volt bar should also be interchangeably viewed to be a "charge unit." The charge unit is a physical structure that holds charge, as does a battery. A charge unit can also be a fraction of charge, which may be contained in a physical structure.

Broadly speaking, a volt bar is a battery that can be inserted into an auxiliary battery carrier. The auxiliary battery carrier, or compartment, can be lifted by human and placed into a vehicle, such as the trunk of the vehicle. The auxiliary charging carrier can then be removed from the vehicle to provide charge to the volt bars contained within the auxiliary battery carrier. For instance, owners of electric vehicles can purchase an auxiliary battery carrier and fill the auxiliary battery carrier with a plurality of volt bars.

In one embodiment, the user will charge all of the volt bars by charging the auxiliary battery carrier before the auxiliary battery carrier is placed into the vehicle. In one embodiment, the auxiliary battery carrier, and its volt bars can be charged utilizing the charge provided from the main battery. For instance, if the vehicle is charged overnight utilizing the primary charging receptacle, and the auxiliary battery carrier is connected to the vehicle (containing volt bars), the volt bars in the auxiliary battery carrier will also be charged. In one embodiment, once the main battery and the vehicle are charged, the charge will then be transferred to the volt bars contained in the auxiliary battery carrier. As such, charging the vehicle will accomplish the task of charging the main battery as well as the auxiliary battery carrier that includes a plurality of volt bars. In another embodiment, the volt bars can be directly inserted into slots defined on the vehicle itself. In this example, manufacturers will design compartments that can accept one or more volt bars, thus eliminating the need for an auxiliary batter carrier. The compartments can be on the side of a vehicle with or without a door, in the trunk, in the passenger compartment, etc. So long as volt bars can be accepted into a receptacle and the volt bar(s) can provide charge to the vehicle or axillary charge to the main battery, the placement of the volt bar(s) is, in one embodiment, a design configuration.

In one embodiment, the volt bars utilized in the auxiliary battery carrier can be replaced with fresh batteries purchased while the user of the electric vehicle is on a trip or a distance from the user's home base. For instance, volt bars can be sold utilizing a kiosk system. The kiosk system would, in one embodiment, store available volt bars that can be purchased by drivers of electric vehicles while away from their home base. For example, the kiosk system will provide one or a plurality of receptacles for receiving volt bars that are depleted in charge, and dispense charged volt bars to users desiring to extend the range of their trip. The kiosk, in one embodiment, will be coupled to a power source that can then recharge the volt bars and make them available to other users that trade in their charge de-pleaded volt bars.

If the user wishes to purchase volt bar without first returning a charged the depleted volt bar, the user can be charged a separate fee that is higher than if the user had returned a depleted volt bar. The kiosk system would preferably be connected to the Internet so that users of electric vehicles could access an application that would identify locations of kiosk systems with available volt bars. In one embodiment, the application would include software that communicates with an application sitting in a central hub that manages all of the kiosk systems deployed in the field. The kiosk systems will also report the status of available volt bars, volt bars returned and in charging mode, available charging slots, inventory of volt bars, discounts available at particular kiosk systems, and potential damage to volt bars that have been returned. By compiling this information, the kiosk system can interface with the central hub, which provides information to users accessing an Internet application (mobile application), so that users can locate the closest kiosk system or the closest kiosk system having discounts.

In one embodiment, the discounts provided by the specific kiosk systems can be programmed based on the desire to sell more volt bars at certain kiosk systems with excess inventory, or to encourage virtual routing of volt bars throughout geographic regions. For example, if trends are detected by software operating on the central hub that volt bars are migrating from East to West, a depleted inventory may be found in the East. To encourage load-balancing of inventory, discounts can be provided in the West, which would then cause migration of volt bars toward the east. In one embodiment, each of the kiosk systems would be enabled with software that communicates with the central hub, and the software would be utilized to provide the most efficient information regarding inventory, and operational statistics of each kiosk system deployed throughout a geographic region (e.g., geo-location)

In another embodiment, each kiosk system may be configured with an interface that receives payment data from the users. Example payment receipts may include credit card swiping interfaces, touchscreens for facilitating Internet payment options (PayPal), coupon verification, and communication of deals with friends through a social networking application. These applications can be facilitated by software operating at the kiosk station, or by software executing on the users mobile device, or a combination of both. In still another embodiment, each of the volt bars that are installed in the various kiosk stations will be tracked using tracking identifiers. In one embodiment, without limitation, the tracking can be facilitated using RFID tags. The RFID tags can be tracked as users purchase, return, and charge the depleted volt bars at the various kiosk stations.

Additionally, the volt bars will include memory for storing information regarding number of charges, the health of the battery cells, the current charging levels, and other information. Additionally, the volt bars can store information regarding the various kiosk stations that the volt bars have been previously been installed in, or received from. All of this information can be obtained by the software running at the kiosk station, and communicated to the central hub. The central hub can therefore use this information to monitor the health of the various volt bars and can inject new volt bars into the system at various locations when it is detected that the inventory is reaching its end of life.

In still another embodiment, the central hub can direct maintenance vehicles to remove damaged volt bars from kiosks, or insert new volt bars at certain kiosk locations. Because the central hub will know the frequency of volt bar utilization at each of the kiosk locations, the central hub can dispatch maintenance vehicles and personnel to the most optimal location in the network of kiosk stations.

In another embodiment, a system for providing auxiliary charge to a main battery of an electric vehicles is provided. The system includes an auxiliary battery for holding a plurality of charge units, the auxiliary battery being connectable to the main battery of the electric vehicle, the plurality of charge units being rechargeable and being replaceable from within the auxiliary battery, such that replacing particular ones of the plurality of charge units with charge units with more charge increases a total charge of the auxiliary battery. Also provided is a kiosk for storing a plurality of charge units, the kiosk having, (i) slots for storing and recharging the plurality of charge units; (ii) control systems for communicating over a network, the control system includes logic for identifying inventory of charging units in the kiosk and logic for processing payments and fee adjustments for charge units provided or received in the slots of the kiosk. The system also includes a display for providing an interface for enabling transactions to provide or receive charge units to customers. The system further provides a central processing center that communicates with, (i) a plurality of said kiosk over a network, the central processing center configured to provide for centralized rate changes to prices to charge for the charge units at each of the plurality of kiosks, wherein changing the price of the charge units is specific to each of the kiosks and is based on a plurality of metrics, including availability at each kiosk and discounts, and (ii) a plurality of vehicles, the plurality of vehicles being provided with access to availability information of charge units at each of said kiosks, the availability information being custom provided to the plurality of vehicles based on geo-location.

Another embodiment is for a method for providing charge options to drivers of electric vehicles. The method includes receiving data concerning charge providing availability from charge locations, receiving a request from processing logic of an electric vehicle, the request identifying a desire to obtain charge, and determining a current location of the electric vehicle. The method further includes determining identification of charge locations in proximity to the electric vehicle and determining any sponsored rewards offered by the charge locations. The method communicates to the electric vehicle a path to one of the charge locations, the path identifying a sponsored reward offered at the charge location for the path.

Yet another embodiment, a computer processed method for providing charge options to drivers of electric vehicles is provided. The electric vehicles have wireless access to a computer network. The method includes receiving data concerning charge providing availability from charge locations and receiving data concerning sponsored rewards offered by the charge locations and rules for offering the sponsored rewards. The method receives a request from processing logic of an electric vehicle, and the request identifies a desire to obtain charge in route between a current location of the vehicle and a destination location. The method includes generating a plurality of paths that can be traversed by the electric vehicle between the current location and the destination location, where each of the paths identify possible charge locations at which the electric vehicle can be charged. Each of the possible charge locations identifying any sponsored rewards offered if the electric vehicle obtains charge at the possible charge locations. The method includes forwarding the plurality of paths as options to the user of the electric vehicle via a user interface. The sponsored rewards are identified to the user to enable tradeoffs between length of path and reward obtained.

BRIEF DESCRIPTION OF DRAWINGS

The invention may best be understood by reference to the following description taken in conjunction with the accompanying drawings.

FIG. 13a illustrates a kiosk system that can receive volt bars in a used condition (depleted), can charge depleted volt bars to a suitable charge level, and can dispense fully charged volt bars from the kiosk (referred to herein as a volt box), in accordance with one embodiment of the present invention.

FIG. 13b illustrates a detailed diagram of the face panel of the kiosk system of FIG. 13a, which represents one example interface of the kiosk, in accordance with one embodiment of the present invention.

FIG. 17 illustrates an example data structure and data communication transferred between a central hub and a volt box, and periodic automatic push-update of volt box memory data, in accordance one embodiment of the present invention.

FIG. 18 illustrates another embodiment of a data structure (providing data) to a hub processing center (that communicates with full box stations) and the exchange of information, such as reservation data, in accordance with one embodiment of the present invention. In one embodiment, the hub is a type of central processing center, and the central processing center can have one or more processing systems and the systems can be localized or distributed and interconnected in any location in the world.

FIGS. 36A-36C illustrate example locations for placing an auxiliary battery in a vehicle and communication with an existing vehicle or one retrofitted to receive additional batteries of varying sizes or form factors, in accordance with one embodiment of the present invention.

FIGS. 37A-C illustrates internet cloud processing for route generation and charge availability, for vehicles (or internet connected devices) that connect to the cloud (e.g., network processing connected to the internet and storage), in accordance with one embodiment of the present invention.

FIGS. 39 and 40 illustrate examples of a paths taken by electric vehicles and options for receiving charge along that paths, the paths can be sponsored or not sponsored, and metrics concerning the paths are provided to drivers of the EVs, and the charge can be either connections to charge stations (for conventional charging of the native vehicle battery) or stocking/restocking of volt bars to augment the native battery or both, in accordance with one embodiment of the present invention.

DETAILED DESCRIPTION

Embodiments are described methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged with or without the vehicle, and can be installed or placed in the vehicle to provide supplemental charge to the vehicles main battery. Thus, if the main battery becomes depleted, the auxiliary battery compartment, having a plurality of charged batteries, can resume providing charge to the vehicle.

Figure 1:
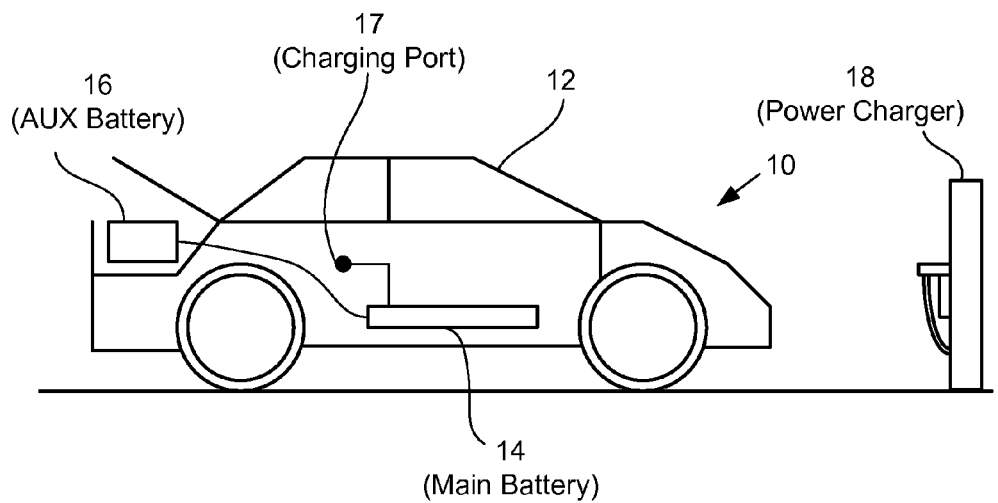
FIG. 1 illustrates a broad embodiment of a vehicle having a main battery and an auxiliary battery carrier, in accordance with one embodiment of the present invention.

FIG. 1 illustrates a broad embodiment of a vehicle having a main battery and an auxiliary battery carrier, in accordance with one embodiment of the present invention. As shown, a vehicle 10 is provided with a main battery 14. Main battery 14 can be installed in any configuration on a vehicle, and as shown, the main battery 14 is preferably installed near a lower section of vehicle 10. Installation of the battery 14 near the lower section (i.e., underneath section) will enable automated handling for replacement of main battery 14. For example, main battery 14 may be removed by automated handling equipment when vehicle 10 reaches a battery replacement location, or shop.

Alternatively, main battery 14 can be placed in any location suitable for ergonomic placement on, attached, or integrated with body structures of vehicle 10. Although vehicle 10 is illustrated to be a car, vehicle 10 can take on any configuration such as, a sports car, a utility car, a truck, a pickup, an industrial vehicle, a delivery vehicle, a 3 wheeled vehicle, a 2 wheeled vehicle, etc. In one embodiment, vehicle 10 can be a 100% electric vehicle, a partial electric vehicle and fossil fuel powered vehicle (hybrid), or variations thereof.

Vehicle 10 is illustrated with a charging port 17 that couples to main battery 14. Charging port 17 will enable standardized charging of vehicle 10 at designated charging stations, such as power charger 18. Power charger 18 can be installed at the vehicles home-base, or can be installed at various locations designated for charging for a fee.

In one embodiment, an auxiliary battery carrier 16 can be inserted into a compartment of the vehicle 10 and is configured for electrical connection to main battery 14. Auxiliary battery carrier 16, in one embodiment, is configured to be placed into the compartment by a human, and is configured with suitable handles for lifting the auxiliary battery carrier 16 into and out of vehicle 10. The handles can be provided on the sides of auxiliary battery carrier 16 to provide for an ergonomic lifting procedure of the auxiliary battery carrier 16 into and out of vehicle 10.

Still further, the auxiliary battery carrier 16 can be provided with wheels and an handle, so that the unit can be pulled on wheels, similar to travel luggage transport systems. For instance, the handle can be compressed or slid into a side of the auxiliary battery carrier, and when transport is needed, the handle can be extended out to allow pulling, as facilitated by wheels attached to the bottom of the auxiliary battery carrier 16.

Auxiliary battery carrier 16 may be coupled to a power charger 18 before being placed into vehicle 10. As noted above, power charger 18 can be located at the vehicle user's home or can be located at any distributed charging location throughout the globe.

In one embodiment, auxiliary battery carrier 16 can be charged by plugging a receptacle into a common wall outlet, and allowing the auxiliary battery carrier 16 to charge all volt bars 20 contained in the auxiliary battery carrier 16 for a period of time. In one embodiment, the auxiliary battery carrier 16 can also itself include a battery cell that is rechargeable with sufficient voltage charge. In this embodiment, the auxiliary battery carrier 16 can provide charge to the vehicle 10 even when no volt bars 20 are contained within the auxiliary battery carrier 16. In another embodiment, the auxiliary battery carrier 16 will not include a battery cell, and all charge storage will be held in the respective volt bars 20 installed therein.

Auxiliary battery carrier 16, in one embodiment, can be defined from molded plastic with molded handles for ease of handling and protection of the volt bars contain therein. The molded plastic is configured, in one embodiment, to provide a rugged cushioning to the auxiliary battery carrier 16 in case of accidental dropping, accidental impacts, and overall rigidity. The molded plastic can, in one embodiment include cushioning on the exterior surfaces, and may include a lid for enclosing the volt bars 20 contained therein. As will be shown below, the auxiliary battery carrier 16 can also include plugs, cables, and interfaces for allowing interconnection with charging outlets, and interfaces with vehicle 10.

As illustrated in FIG. 1, auxiliary battery carrier 16 is electrically coupled to main battery 14. This illustration is, in one embodiment a logical connection between auxiliary battery 16 and main battery 14. Thus, it will be understood that the electric connection between the auxiliary battery carrier 16 and the main battery 14 can take on any configuration. Interconnections can be by way of receptacles built into vehicle 10 in the vicinity of auxiliary battery carrier 16. Interconnections can be by way of extension wires or cables that coupled to or adjacent to the charging port 17. Interconnections can be by way of circuit panel plugs that interconnect to circuitry.

Broadly speaking, the circuitry can include, in one embodiment, central processing units, logic, memory, and other electrical and/or computing modules to enable interconnections between auxiliary battery carrier 16 and main battery 14. Additionally, software can control interfaces between auxiliary battery carrier 16 and main battery 14, such as to detect the presence of auxiliary battery carrier 16, control the transfer of voltage between the auxiliary battery carrier 16 and the main battery 14, or the electric motor of vehicle 10, and to interface with electronics, modules, and communication devices that may be integrated within the auxiliary battery carrier 16.

Accordingly, it should be understood that auxiliary battery carrier 16 can be removed from vehicle 10 for charging, can be charged on vehicle 10, can be interconnected to vehicle 10, can be interconnected to standard charging port 17, and can be refilled with auxiliary batteries (volt bars) with refresh charges to extend the life of charge provided by auxiliary battery carrier 16. Thus, the placement of auxiliary battery carrier 16 on the vehicle 10 can take on any configuration, depending on the definition of the vehicle and its available storage compartments or location suitable for supporting the auxiliary battery carrier 16.

In one embodiment, the main battery 14 and the batteries that define the volt bars 20 can be constructed using any number of battery technologies, or technologies that can store charge or energy. Additionally, main battery 14 can be configured in any number of formats, and can be integrated in any portion of a vehicle. In one embodiment, any portion of the vehicle can be converted into an electric storage compartment. For example, parts of a vehicle's floorboard can define the electric storage compartment, and thus may act as main battery 14. In another embodiment, the outer shell or frame of the vehicle can be integrated with cavities or structures that are suited for storing electric power.

Thus, although main battery 14 is shown as a single unit, the placement and distribution on the vehicle can vary. Furthermore, the main battery 14 can work in conjunction with a hybrid system, that enables charging of the main battery 14 during use of the system. Charging in the hybrid vehicle can be by way of collection of energy from braking functions, or the like. Other ways of collecting energy can be by way of collecting energy from the use of the vehicle's shock absorbers. As a vehicle traverses terrain, the vehicle's shocks absorb energy and/or resist movement. These types of energy collection systems can, in one embodiment, be recollected to the main battery 14 or can be transferred to the auxiliary batteries of the vehicle.

The control of such transfer can be managed by an onboard computer and controlled by a processor. In another embodiment, the control can be carried out dynamically from a remote location. For instance, the vehicle can be connected to the internet. If local conditions change, such as the weather or type of terrain being traversed, the vehicle can be automatically controlled to transfer or collect energy from certain systems, which can be prioritized over others. Still further, solar cells on vehicles can also be configured to collect energy and such solar cells can be controlled to transfer energy to either the main battery 14 or the auxiliary battery carrier 16.

It should be understood that in addition to standard battery technology, storage of electric energy can also be accomplished using alternate or emerging technologies. One such technology is referred to as ultra-capacitor technology. Broadly speaking, an ultra-capacitor is a device for the efficient storage of power. An ultra-capacitor is also known as a double-layer capacitor, which polarizes an electrolytic solution to store energy electrostatically. Even though it is an electrochemical device, no chemical reactions are involved in its energy storage mechanism. This mechanism is highly reversible, and allows the ultra-capacitor to be charged and discharged hundreds of thousands of times. An ultra-capacitor also has a lifetime that is greater than conventional batteries, and is resistant to changes in temperature, shock, overcharging, and provides for rapid charging. These types of batteries also require less maintenance than conventional batteries and are more environmentally friendly because they lack common toxic chemicals utilized in standard batteries.

It is anticipated that charge storage technology will continue to improve over time to provide additional charge capacity, lighter weight, and smaller form factors. As such improvements continue to evolve, the embodiments described herein which refer to "batteries," should be broadly construed to include any type of electric fuel storage.

Figure 2:
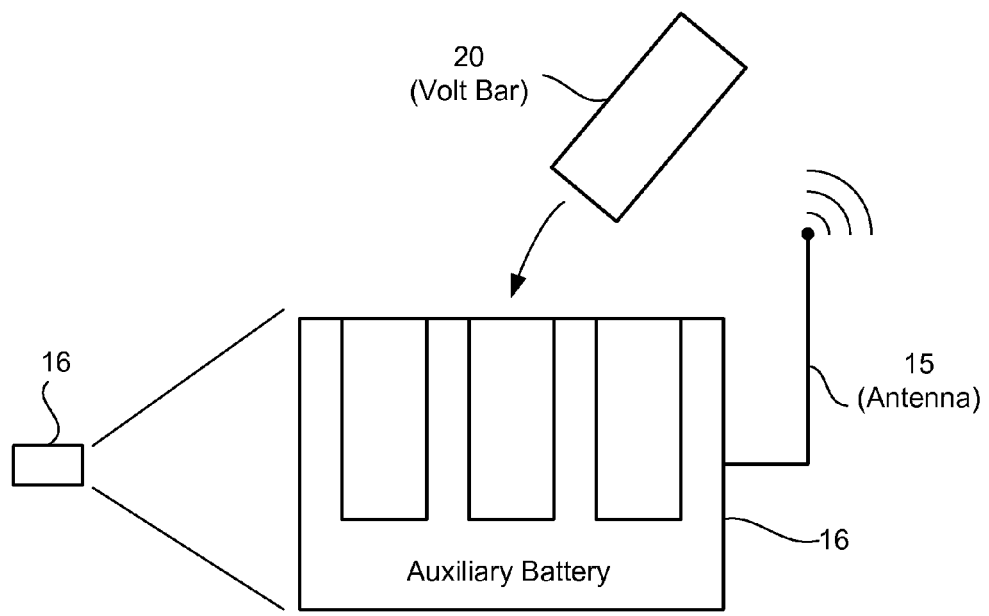
FIG. 2 illustrates a more detailed picture of the auxiliary battery carrier, designed to receive one or more batteries (volt bars), in accordance with one embodiment of the present invention.

FIG. 2 illustrates a more detailed picture of the auxiliary battery carrier, designed to receive one or more batteries (volt bars), in accordance with one embodiment of the present invention. As shown, auxiliary battery carrier 16 can include a number of slots that are defined for receiving volt bars 20. Will include charge receptacles (not shown) that will mate with complementary receptacles defined within the auxiliary battery carrier 16. Thus, charge can be transferred from volt bar 20 and auxiliary battery carrier 16 once inserted within the slots of auxiliary battery carrier 16.

It should be understood that any number of volt bar's 20 can be installed in an auxiliary battery carrier 16. The larger the auxiliary battery carrier 16 becomes, the heavier the carrier will be for human lifting and installation. If the auxiliary battery carrier 16 is designed for commercial purposes, auxiliary battery carrier 16 can be defined to have a larger footprint, and can be installed using suitable machinery. For example, auxiliary battery carrier 16 can be defined for use in construction vehicles, and the number of volt bars 20 capable of being installed in a larger auxiliary battery carrier 16 can be numerous. To handle the increase in weight, specialized vehicles, or standard construction vehicles (e.g. forklifts) can be used to lift auxiliary battery carrier 16 into and out of vehicle 10. Thus, the size of auxiliary battery carrier 16 is modular, and can be made to receive more or less volt bars 20. In still another embodiment, the size of volt bars 20 can be varied, such that larger sized volt bars 20 can be inserted into a suitably sized auxiliary battery carrier 16 having associated slots.

In still another embodiment, the volt bars 20 can be designed in ultra large-size capacity. The ultra large-size can be configured for installation into a large container. The large container can be, for example, a typical shipping container converted into a power source. The shipping container can then be delivered to specific sites for use at special events, construction sites, or the power special equipment at office space locations. The modular construction of a large container having volt bars 20 can then be managed by a separate distribution system that allows users to request and have delivered specific large containers with suitable battery capacity for the desired tasks.

In one embodiment, auxiliary battery carrier 16 can include an antenna 15. Antenna 15 can be configured to communicate with electronics and software/firmware of auxiliary battery carrier 16. Antenna 15 can be used to allow auxiliary battery carrier 16 to communicate with a remote server over the Internet, and report the status of auxiliary battery carrier 16. For example, if a user driving vehicle 10 experiences a decrease charged in main battery 14, and an associated decrease charge in auxiliary battery carrier 16, auxiliary battery carrier 16 can include firmware/hardware/software that will enable communication to a central hub.

The central hub can then generate a message that will be communicated to the driver of vehicle 10. The message can include an identification of the closest kiosk that has suitable volt bars 20 that can be purchased to replenish depleted contained in auxiliary battery carrier 16. The user can also be provided with messages that identify special deals for obtaining volt bars, and deals for exchanging depleted volt bars. In one embodiment, the message can be communicated to the user's smart phone, a display panel on vehicle 10, or other personal electronics of the user. Communication between auxiliary battery carrier 16 and the devices utilized by the user to receive messages can be managed using any number of protocols, such as Wi-Media, near field communication (NFC), Wi-Fi, Bluetooth, radio communication, wired communication, etc.

Figure 3:
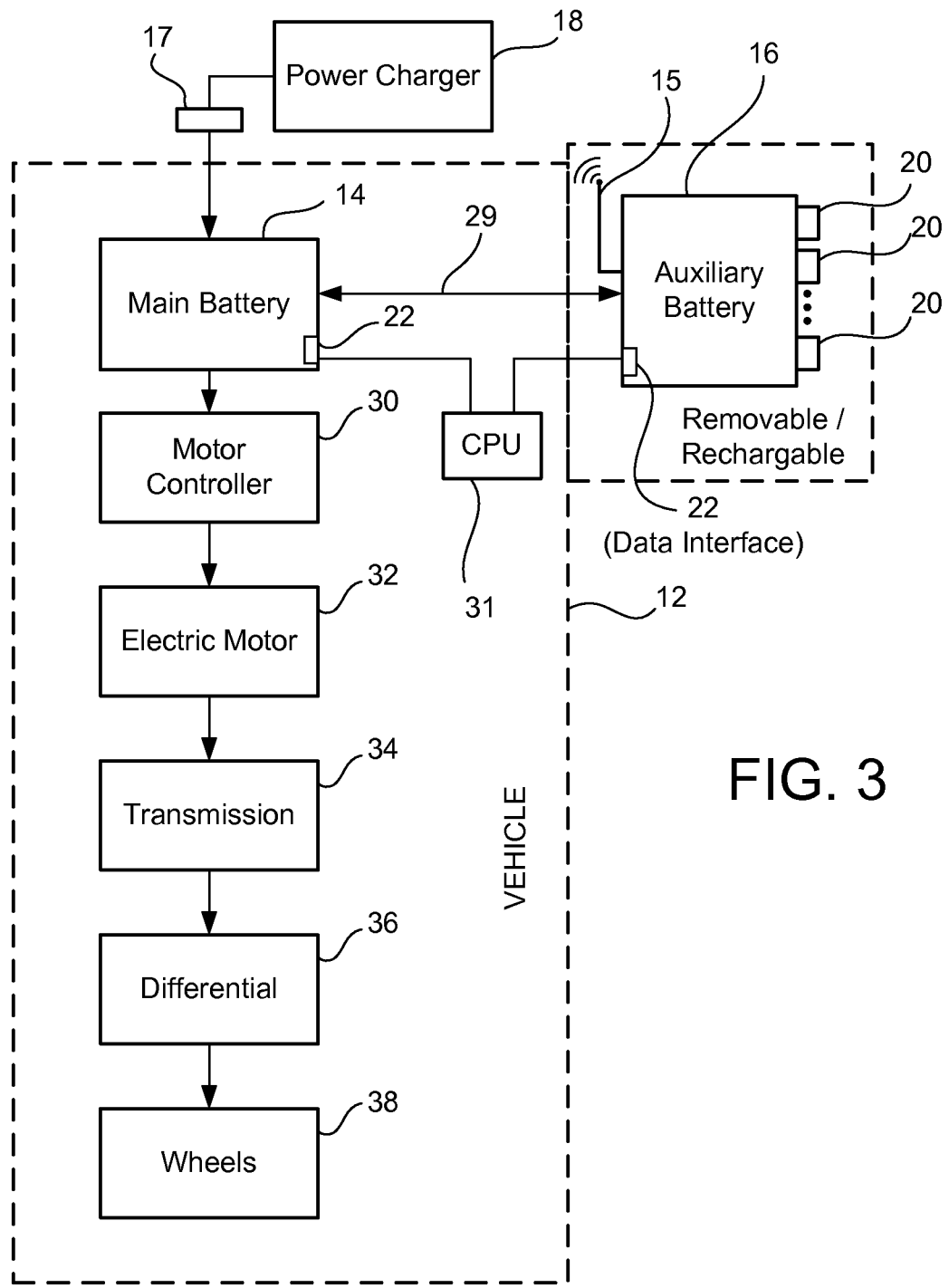
FIG. 3 illustrates a detailed block diagram of a vehicle interfaced with an auxiliary battery carrier, and interfaced directly with a main battery of the vehicle while being interfaced with a CPU, in accordance with one embodiment of the present invention.

FIG. 3 illustrates a detailed block diagram of a vehicle interfaced with an auxiliary battery carrier, and interfaced directly with a main battery of the vehicle while being interfaced with a CPU, in accordance with one embodiment of the present invention.

Vehicle 12 can include a number of standard components, as well as components for interfacing with the auxiliary battery carrier 16. As shown, the vehicle can be provided with charge via a power charger 18 by connection to charging port 17. Main battery 14 is connected to auxiliary battery carrier 16 by way of a power interface 29. In one embodiment, data interface 22 is associated with each Main battery 14 and auxiliary battery 16. Data interface 22 provides the link by which a central processing unit (CPU) 31 can communicate with main battery 14 and the auxiliary battery carrier 16. For purposes of general description, it should be understood that CPU 31 can be defined in any number of form factors and configurations.

For instance, CPU 31 can be part of a digital signal processor, a printed circuit board with circuitry, general logic, logic and memory, firmware, or circuitry that can sense the status of the main battery 14 and auxiliary battery carrier 16, and can communicate data to other modules or circuitry. Broadly speaking, some link or interconnection is provided between main battery 22 and auxiliary battery carrier 16, so that appropriate interfaces can be made between the batteries, in one embodiment of the present invention. Power interface 29 can provide the interface for exchanging charge between the charge contained in ancillary battery carrier 16 and the main battery 14, as will be described in more detail below. Auxiliary battery carrier 16 is shown capable of receiving a plurality of volt bars 20, and can be equipped with an antenna 15 for communicating with a remote server or with circuitry/software of vehicle 12.

Continuing with the description of components that may be part of an electric vehicle 12, a motor controller 30 is shown interfacing with main battery 14. Motor controller 30 be shown interfacing with electric motor 30, and electric motor 30 is shown interfacing with transmission 34. Transmission 34 is shown interfacing with differential 36, which interfaces with the wheels 38.

The general description of components/parts of vehicle 12 are provided as exemplary components only, and shall not limit other configurations of electric vehicles that may include additional components/parts or omit certain components/parts. In general, vehicle 12 should be configured with sufficient components and infrastructure to enable main battery 14 and/or auxiliary battery carrier 16 (and volt bars 20) to provide power to vehicle 12 to enable propulsion in the desired direction.

Figure 4:
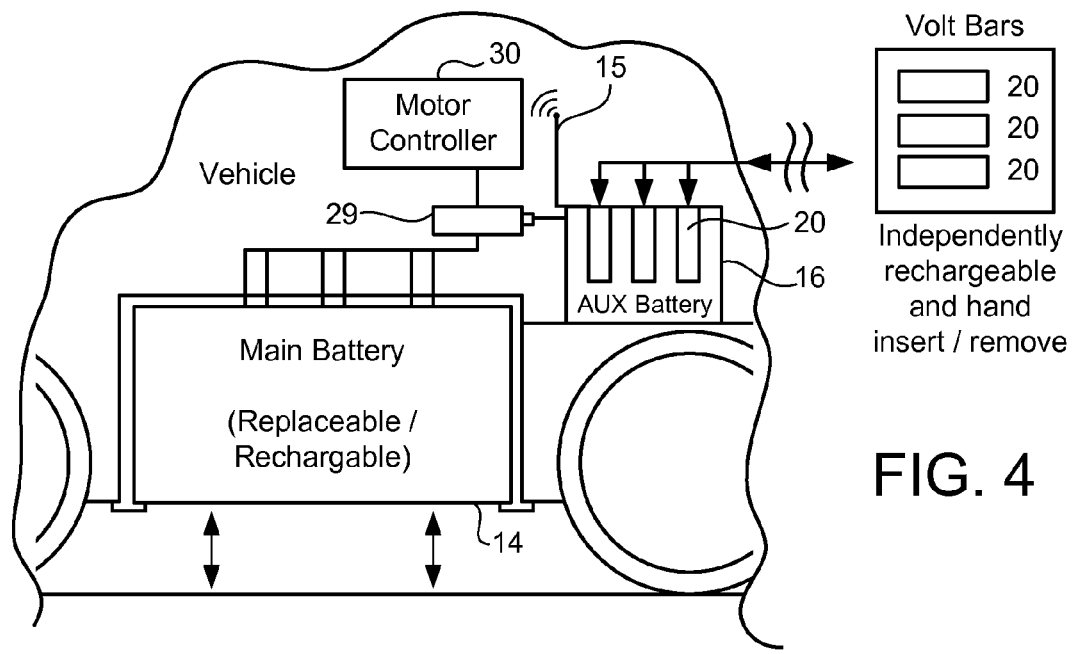
FIG. 4 illustrates a detailed diagram of a vehicle having a main battery that is replaceable or rechargeable, and interfaced with an auxiliary battery carrier, in accordance with one embodiment of the present invention.

FIG. 4 illustrates a detailed diagram of a vehicle having a main battery that is replaceable or rechargeable, and interfaced with an auxiliary battery carrier, in accordance with one embodiment of the present invention.

As shown, FIG. 4 illustrates an embodiment where the main battery of a vehicle can be replaced from a location defined under the vehicle. The main battery 14 can be coupled to the auxiliary battery carrier 16 by way of power interface 29. Power interface 29 is also coupled to the motor controller 30 that interfaces with the electric motor 32 of the vehicle. As shown, the volt bars 20 are independently chargeable and can be hand insertable and removed from the auxiliary battery carrier 16, depending on the needs of the vehicle.

Also illustrated is antenna 15 that can be integrated with the auxiliary battery carrier 16 for communication of status associated with auxiliary battery carrier 16. It is noted herein that antenna 15, being coupled to the auxiliary battery carrier 16 allows for independent communication by the auxiliary battery carrier 16, separate from any communication being performed by the vehicles electronics or communication systems.

By separating these two communications systems, it is possible for communication between the auxiliary battery carrier and distributed hubs that managed the availability of volt bars throughout the network, without interference by communications systems of the vehicle. Additionally, by separating the communications systems of auxiliary battery carrier 16 from the vehicle, it is possible for the auxiliary battery carrier 16 to independently communicate with the central hub when the auxiliary battery carrier is in or out of the vehicle.

Figure 5:
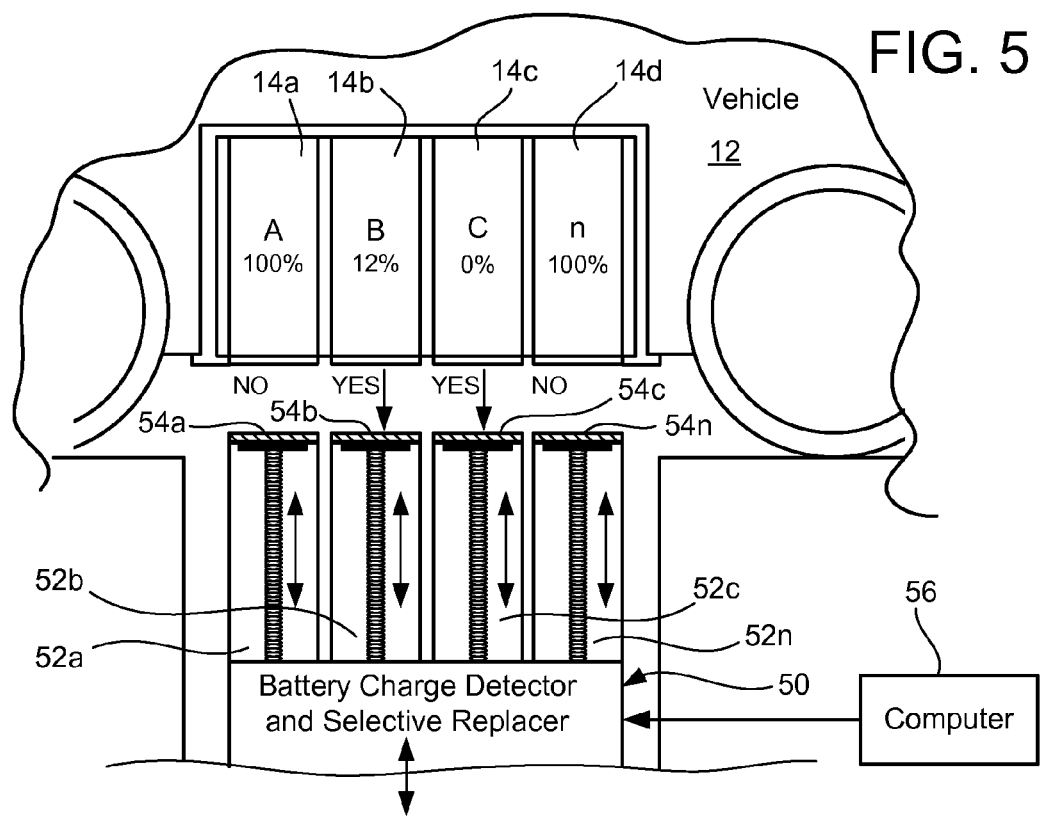
FIG. 5 illustrates another detailed diagram of a main battery of the vehicle, partitioned into a plurality of segments, in accordance with one embodiment of the present invention.

FIG. 5 illustrates another detailed diagram of a main battery of the vehicle, partitioned into a plurality of segments, in accordance with one embodiment of the present invention. In this embodiment, the main battery 14 of the vehicle 12 is partitioned into a plurality of insertable and removable battery segments 14a-14d. Although only four segments are shown, it is possible for the partitioning to be performed in any number of segments. By segmenting the main battery, it is possible for a battery charge detector and selecter to replace only those segments that need replacing.

For example, if the vehicle 12 drives into a battery changing station, the battery changing station can have a system of replacement actuators 52a-52d, that can connect to the various main battery segments 14, and facilitate removal and replacement with a fresh battery. In the example shown, the replacement actuators 52 each include sensors 54a-54d that coupled to each of the main battery segments 14. The sensors are configured to communicate with a control interface defined at a surface of the main battery segments. The control interface will communicate with a computer 56 through a port 50 which will identify the charging level of the various battery segments. If a particular battery segments is substantially full, that battery segment will be allowed to remain in the vehicle.

Alternatively, if a particular battery segment is only partially depleted, the driver will be given the option to replace the battery segment with a fresh fully charged battery segment. In one embodiment, the vehicle owner will be given a credit for the remaining battery charge left in the battery segment, so that the vehicle owner will be charged only for that charge that is purchased. For example, if main battery segment 14b is only 12% charged, if that battery segment is replaced, the driver will be charged for the charge value of 88%. In still another embodiment, when the user of the vehicle drives into the battery replenishment station, a control system dashboard can be presented to the user of the vehicle to allow the user to enter into a display screen how much battery replacement is desired.

For instance, if the driver the vehicle only wants to spend to replace one battery segment at that particular time due to budgetary issues, only one segment can be replaced. By segmenting the main battery, and providing options to the user of the vehicle, the user is provided with more flexibility of only charging the main battery with the amount of charge they desire to pay for at any particular time. In still another embodiment, while the main battery is being replaced in a segmented manner, it is possible for vehicle 12 also be coupled to a receptacle that charges the auxiliary battery carrier 16, and its volt bars 20 contained therein. In still another embodiment, the volt bars can be manually replaced at the station during the charging of the main battery 14.

Alternatively, the battery changing station can also automatically remove volt bars from a compartment of the vehicle and reinsert charged volt bars into the vehicle at the same time or during the same session of replacing or charging of the main battery. Accordingly, the flexibility of charging, and partitioning batteries out of vehicle will provide users with more options for charging, depending on their driving necessities, and targeted budgets.

Additionally, by providing display screens to the users to allow selection of their desired charging parameters at a charging station, the user will have control over which battery sections, segments, volt bars, or systems will be recharged (whether completely recharged or partially recharged), and may credit users for any charge remaining on a particular battery segment when a new battery segment is reinserted into the vehicle.

Figure 6:
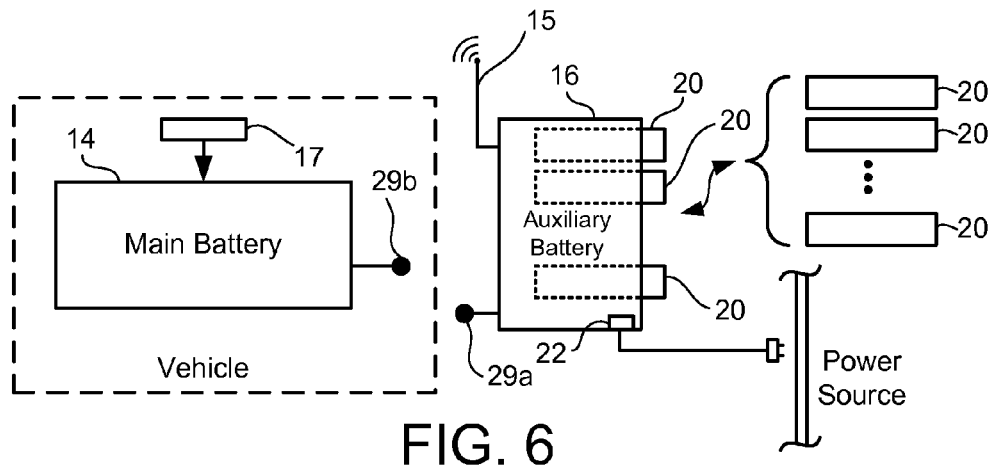
FIG. 6 illustrates a main battery of a vehicle capable of being interfaced with an auxiliary battery carrier that can receive volt bars, and can be interfaced to a power source, in accordance with one embodiment of the present invention.

FIG. 6 illustrates a main battery of a vehicle capable of being interfaced with an auxiliary battery carrier that can receive volt bars, and can be interfaced to a power source, in accordance with one embodiment of the present invention.

In this embodiment, the main battery 14 is shown having a power interface 29b, that couples to a power interface 29a of the auxiliary battery carrier 16. Coupling of the power interfaces 29 will occur when the auxiliary battery carrier 16 is coupled to the vehicle. As illustrated, the main battery 14 is coupled to a charging port 17. The charging port 17 will typically be the charging outlet on the vehicle that will receive a connector that couples to power. For example, in a home configuration, the receptacle can be provided with a connection to the power grid of the home. The receptacle is then connected to the charging port 17 of the vehicle when charging of the vehicles main battery 14 is desired.

As shown, a plurality of volt bars 20 can be inserted or removed from the auxiliary battery carrier 16. The volt bars 20, when inserted in the auxiliary battery carrier 16, can be charged when the auxiliary battery carrier 16 is connected to a power source by way of a connector 22. Over time, the volt bars can be replaced with new volt bars, or volt bars purchased at kiosk locations throughout a charging network of volt bars and dispensing units. As noted before, an antenna 15 can be provided with auxiliary battery carrier 16 to enable independent communication by the auxiliary battery carrier 16 to a central hub over the Internet. The central hub, although identified as "central," can be defined by a plurality of distributed hubs located in a cloud network topology that may include private, public or hybrid cloud technologies that are installed throughout a particular territory.

For example, one network of central hubs can be distributed throughout a particular continent of the globe, a particular country, a particular county, a particular state, or particular city. A larger scale interconnected network can then manage the distributed central hubs to allow interchange of information and transfer of volt bars to the desired kiosk locations depending on need and depending on the flow patterns of the volt bars 20. As described herein, flow patterns mean that volt bars when picked up at certain kiosk locations will then be dropped off at other kiosk locations. If more people pickup volt bars at particular locations and travel in the same direction, more volt bars will gather at that direction where volt bars travel the most. Thus, because volt bars can be tracked, it is possible to define and track the flow patterns of the volt bars throughout the network.

Figure 7:
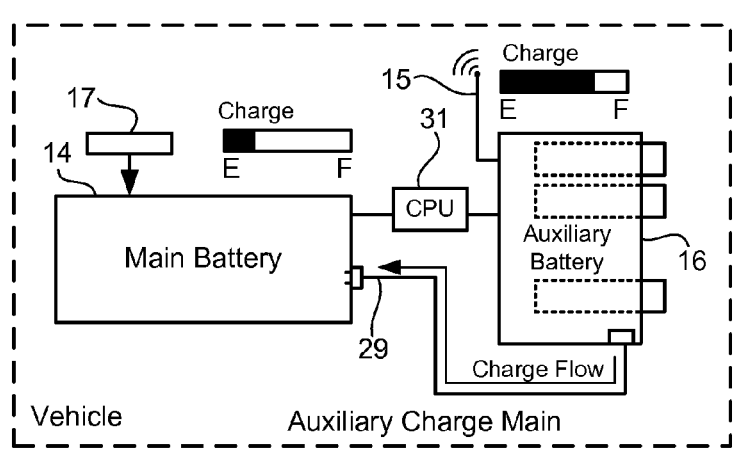
FIG. 7 illustrates an embodiment where the main battery is interfaced with the auxiliary battery carrier, and a CPU controls the flow of charge between the two, depending on their level of charge, in accordance with one embodiment of the present invention.

FIG. 7 illustrates an embodiment where the main battery is interfaced with the auxiliary battery carrier, and a CPU controls the flow of charge between the two, depending on their level of charge, in accordance with one embodiment of the present invention. In this embodiment, the main battery 14 is shown having a low charging level, and the auxiliary battery carrier 16 is shown having a higher charging level. In one embodiment, is possible for the auxiliary battery carrier 16 to transfer charged to the main battery 14 during operation. Control of the charging flow between the auxiliary battery carrier 16 and the main battery 14 can be by way of a central processing unit 31. The central processing unit 31 is generally shown as a block diagram.

However, it should be understood that central processing unit 31 can include any number of electronics, control systems, and software for coupling the auxiliary battery carrier 16 to the main battery 14. The coupling can be by way of connectors between the auxiliary battery carrier 16 and connectors on the vehicle, which then interface to main battery 14.

Figure 8:
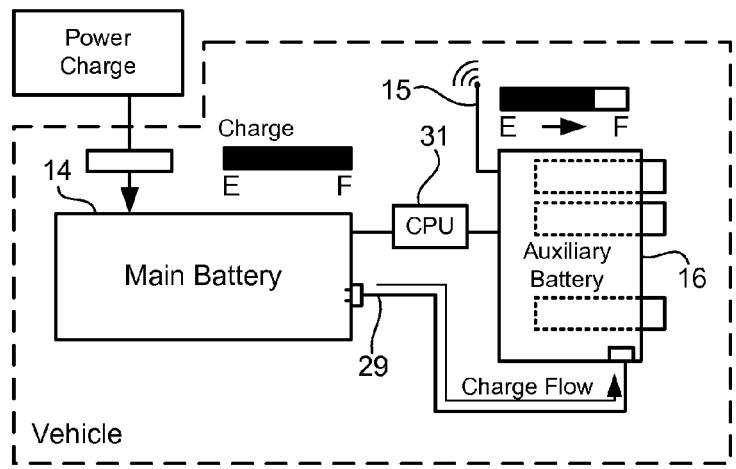
FIG. 8 illustrates another embodiment where the main battery of the vehicle is being directly charged, and the auxiliary battery is charged once the CPU detects that the main battery has been fully charged, in accordance with one embodiment of the present invention.

FIG. 8 illustrates another embodiment where the main battery of the vehicle is being directly charged, and the auxiliary battery is charged once the CPU detects that the main battery has been fully charged, in accordance with one embodiment of the present invention. As shown, the charge level in the main battery 14 is completely full, as power charger has been delivered to the charging port 17 of main battery 14. In this embodiment, charge flow can be directed from the main battery 14 to the auxiliary battery carrier 16.

Again, CPU 31 can be used to control the charge flow between the main battery 14 and auxiliary battery carrier 16. In some embodiments, CPU 31 will direct that no charge between the two systems will occur, and the auxiliary battery carrier will directly supply charge to the electric motor for power. As such, it is not necessary that the auxiliary battery carrier be directly or indirectly connected to main battery 14, as vehicles can provide their own separate connection between the auxiliary battery carrier 16 and the electric motor. It is again noted that the auxiliary battery carrier 16 can be integrated as part of the vehicle, by way of a plurality of slots defined in some compartment on the vehicle. Those particular slots can then be coupled to the electric motor, or coupled to the main battery, or both.

Figure 9:
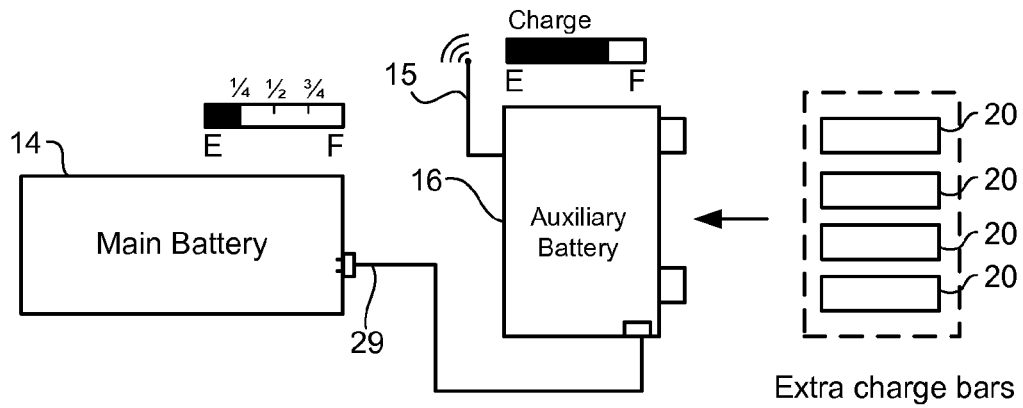
FIG. 9 illustrates an embodiment where the auxiliary battery is triggered to start being accessed by the main battery once the main battery reaches a particular depletion level, in accordance with one embodiment of the present invention.

FIG. 9 illustrates an embodiment where the auxiliary battery is triggered to start being accessed by the main battery once the main battery reaches a particular depletion level, in accordance with one embodiment of the present invention. In this embodiment, the control systems can trigger that the auxiliary battery carrier 16 is accessed by the main battery 14 for additional charged only when the main battery 14 reaches a threshold. In this example, ¼ charge or less will trigger the transfer of charge. Of course, it should be understood that any threshold value can be set, and ¼ is only an example for illustrating the monitoring of charge contained in each of main battery 14 an auxiliary battery 16. In still another embodiment, additional charge bars 20 can be inserted into auxiliary battery carrier 16 at any particular point in time.

Figure 10:
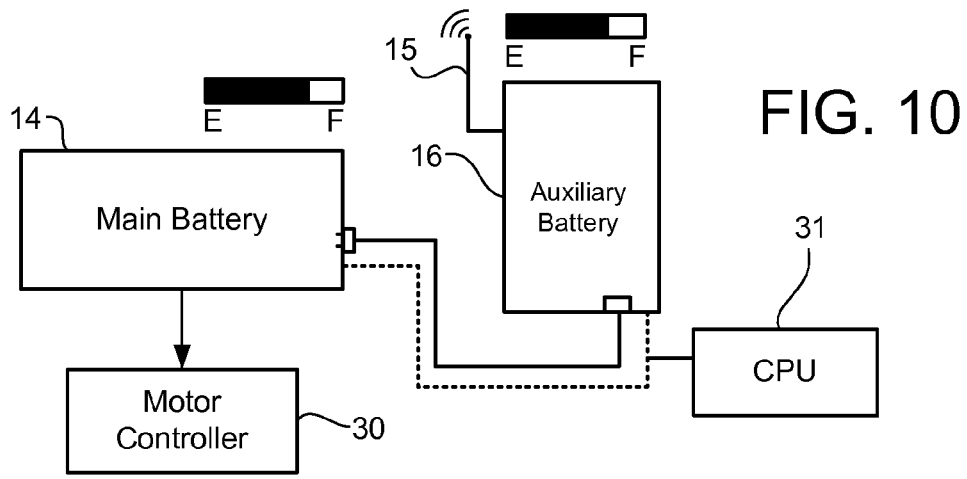
FIG. 10 illustrates another embodiment where the main battery and the auxiliary battery are each capable of providing power to a motor directly, without transferring charge between either of the batteries, in accordance with one embodiment of the present invention.

FIG. 10 illustrates another embodiment where the main battery and the auxiliary battery are each capable of providing power to a motor directly, without transferring charge between either of the batteries, in accordance with one embodiment of the present invention.

Figure 11:
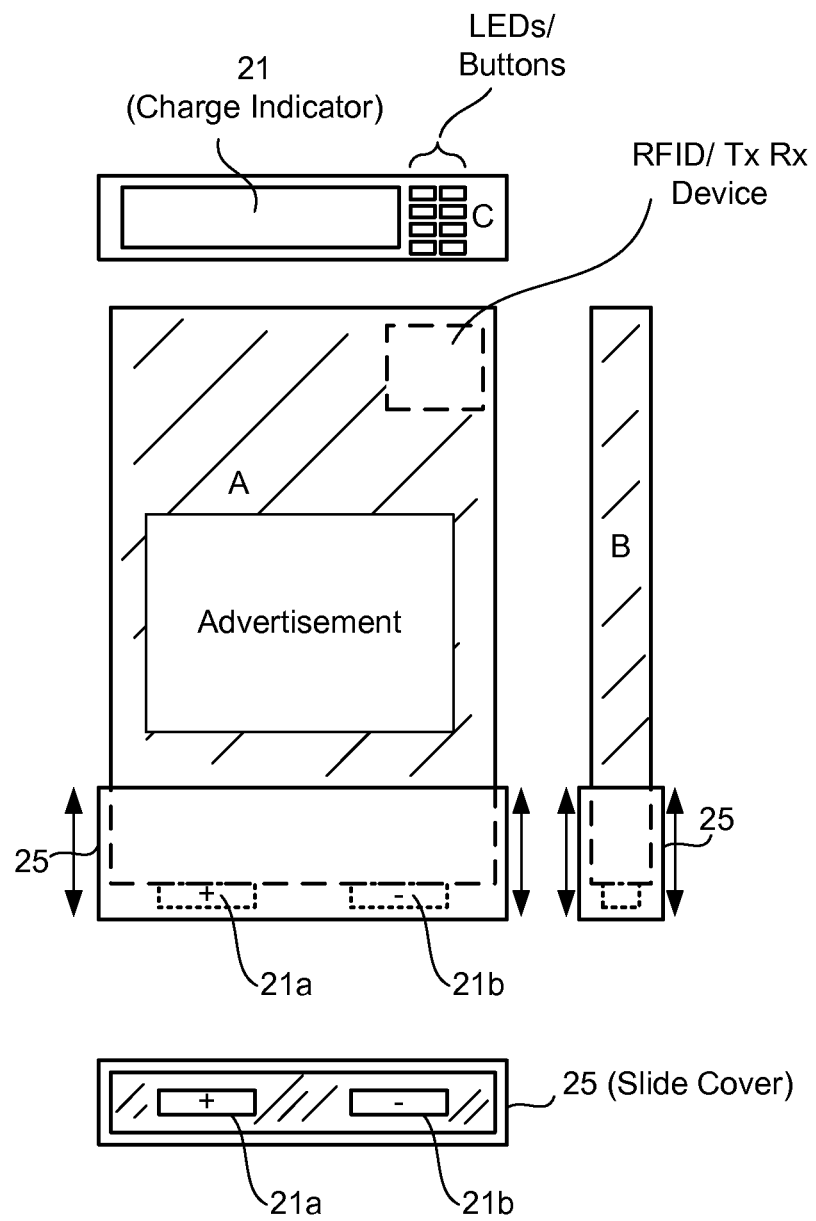
FIG. 11 illustrates an embodiment of the volt bar (battery) that is dimensionally sized to fit within a slot of the auxiliary battery carrier, in accordance with one embodiment of the present invention.

FIG. 11 illustrates an embodiment of the volt bar (battery) that is dimensionally sized to fit within a slot of the auxiliary battery carrier, in accordance with one embodiment of the present invention. In this example, a particular volt bar 20 can include various dimensional sides. A particular volt bar 20 can be provided with advertisements from various sponsors in physical, static or electronically and dynamically delivered form, and can include charge indicators 21, LED buttons, RF ID for transmission and receiving, and can include a slider protector 25. The slider protector 25 is configured to protect the electrodes 21a and 21b. The slider is configured to be slid up to expose the electrodes when the volt bar is inserted into the auxiliary battery carrier 16 or into a slot of the vehicle. The advertisement can also change dynamically by way of an LED screen, and can change based on codes provided by transmissions received from the antenna of the auxiliary battery carrier 16. The dimensional sizes of a volt bar 20 can change depending on the form factor of the carrier, or the form factor of the slots in the vehicle.

Additionally, various slider technology, or connector technology can be used to allow exposure of the electrodes when necessary for connection with the auxiliary battery carrier or the receiving slot such as direct contact or wireless charge and discharge technologies. Accordingly, the form factor illustrated here in is only provided as one example. Other examples can include form factor such as tubular form factors, elongated form factors, cylinder form factors, etc. the charge indicator 21 can be provided in the form of a digital display, a plurality of LEDs, or a mechanical indicator.

The LED buttons can also provide information regarding the health of the volt bar, the life of the volt bar, serial numbers of the volt bar and other information. The RFID can be used to track the when volt bar 20 is inserted into and out of auxiliary battery carriers, or received from or inserted into kiosk locations, and can be tracked globally for their movement around the network. When a volt bar reaches its lifespan, a kiosk will confiscate the volt bar so that further introduction into the network can be prevented. Confiscated volt bars can then be replaced by service technicians.

Figure 12:
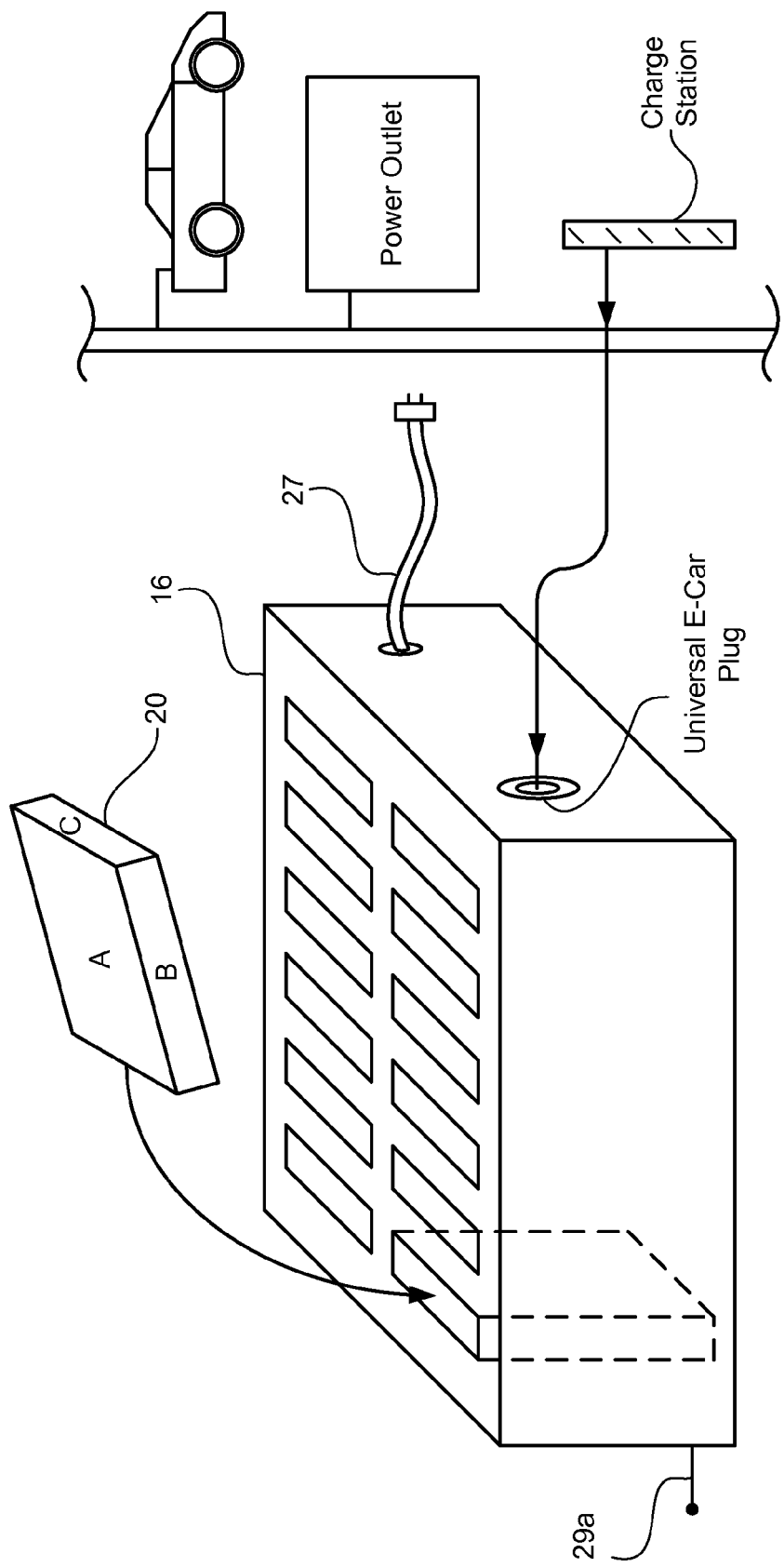
FIG. 12 illustrates the auxiliary battery carrier with a plurality of slots capable of receiving one or more volt bars that will be charged once placed in one of the slots, in accordance one embodiment of the present invention.

FIG. 12 illustrates the auxiliary battery carrier with a plurality of slots capable of receiving one or more volt bars that will be charged once placed in one of the slots, in accordance one embodiment of the present invention. In this example, the auxiliary battery carrier is shown receiving a particular volt bar 20. A universal plug can be provided on the auxiliary battery carrier 16 that will allow connection to a charging station. Alternatively, a cable 27 can be used to connect to a power outlet, or connect directly to the vehicle. The power outlet can be a basic outlet plug 27 to allow connection to any standardized plug for receiving electrical power. When the auxiliary battery carrier 16 is full of volt bars 20, the volt bars contained within auxiliary battery carrier 16 can be charged.

FIG. 13a illustrates a kiosk system that can receive volt bars in a used condition (depleted), can charge depleted volt bars to a suitable charge level, and can dispense fully charged volt bars from the kiosk (referred to herein as a volt box), in accordance with one embodiment of the present invention. As illustrated, a kiosk location is shown, and is referred to herein as a volt box. The volt box is an expandable charging station 60. The charging station 60 can also include direct charging ports 60b and can include a plurality of slots for dispensing volt bars 20 in section 60a. The volt box can include a screen 64 for allowing a user to interface with the kiosk location and allow the user to purchase any number of volt bars. A payment interface 66 is also provided to allow user to purchase the volt bars.

Charging stations 60 can also be deployed as a mobile unit the can be dropped off at any particular location, such as a storefront, or outside of a big box chain store. Once dropped off they can be deployed, connected to the Internet, and can be powering the volt bars inserted therein. Charge can be received by the electrical grid, a gas generator, a fuel-cell generator, solar panels, or can be charged from a service charging vehicle. The kiosk will include a service ports 61 that will allow service technicians to empty volt bars that have been confiscated as they may have reached their lifespan, or insert new volt bars when the kiosk location is less than full or is in need of additional volt bars due to flow patterns that drive volt bars to other kiosk locations.

As shown, direct charging ports 60b include a retractable charging cord 73 with a charging plug so that vehicles can drive up and receive charge from the kiosk location, those charging their main battery. At the same time, the user can purchase any number of volt bars for use in their auxiliary battery carrier 16 or in preformed slots defined on the vehicle itself. An antenna 62 is also shown providing the volt box access to communicate with the network of other volt boxes, and/or the central hub. By providing this communication, it is possible the track how full or empty the volt box charging station is, and service vehicles can be deployed to replenish, and/or service the particular charging stations 60.

As illustrated, charging is performed through a plurality of interfaces 74, or a single interface 74, depending on the configuration and location of the volt box station in the deployed network.

FIG. 13b illustrates a detailed diagram of the face panel of the kiosk system of FIG. 13a, which represents one example interface of the kiosk, in accordance with one embodiment of the present invention. The indicator lights or insignias can be provided on the face of the kiosk location to indicate the charging level of the particular volt bars inserted therein. In some cases, volt bars inserted into slots will only be partially charged, and thus will not be available for purchase. Light indicators can be provided to illustrate which volt bars can be removed from the kiosk location. In another embodiment, the volt bars are mechanically pulled into the kiosk location and served to the user in a dispensing manner.

The dispensing system can then be handled internally to the volt box so that a single slot is provided for receiving used volt bars and dispensing new volt bars. As such, users approaching a kiosk location may empty the used volt bars from their auxiliary battery carrier and insert them into the kiosk location to receive a credit for the volt bar unit. If the credit is received by returning a user volt bar, the user is only charged a nominal fee for the charge when a new or recharged volt bar is dispensed.

Figure 13C:
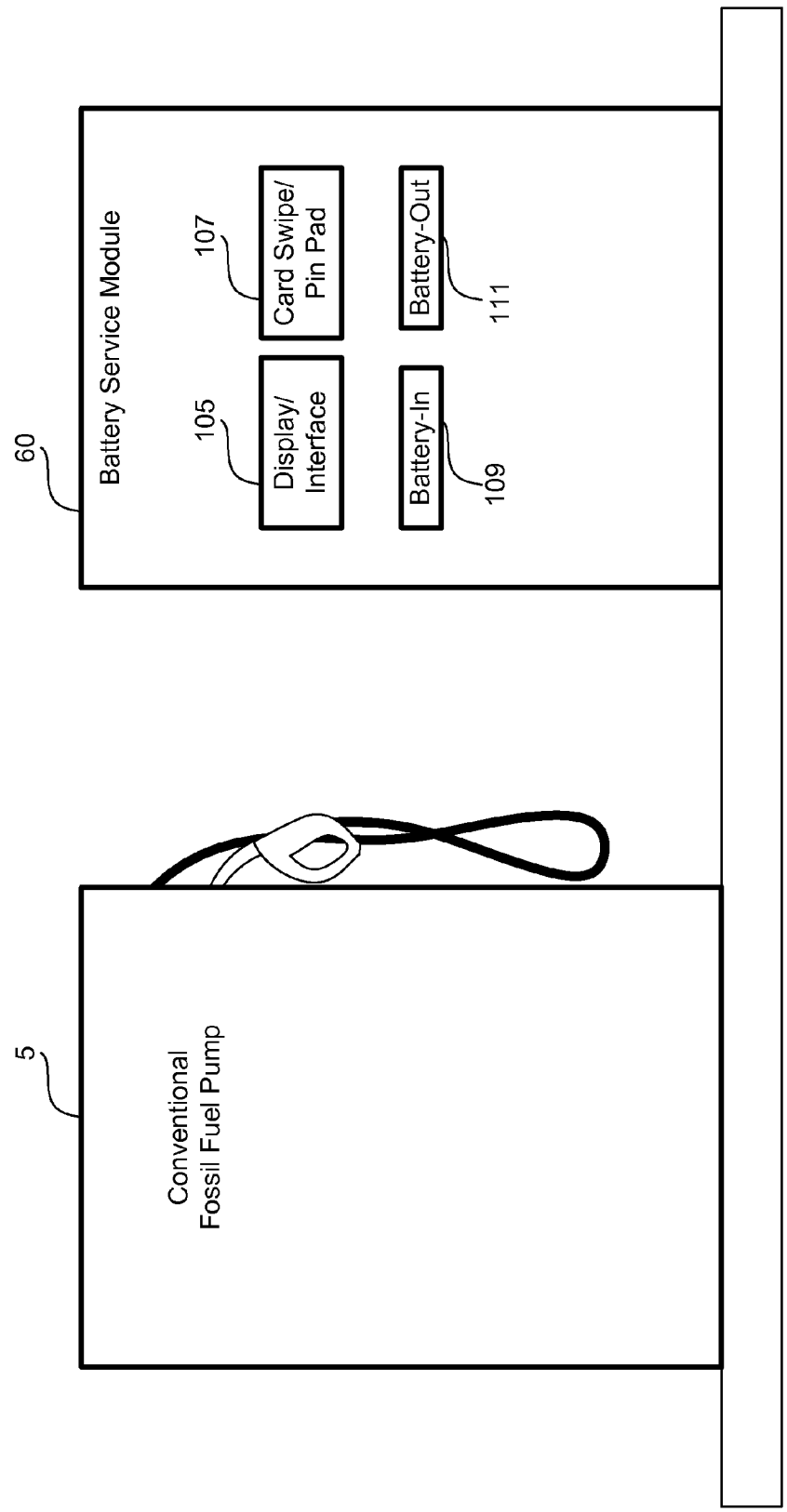
FIG. 13c illustrates one example form factor of a battery service module, that can output or receive volt bars in a service station environment (potentially alongside a conventional fossil fuel pump or nearby location), in accordance with one embodiment of the present invention.

FIG. 13c illustrates one example form factor of a battery service module, that can output or receive volt bars in a service station environment (potentially alongside a conventional fossil fuel pump or nearby location), in accordance with one embodiment of the present invention.

Figure 13D:
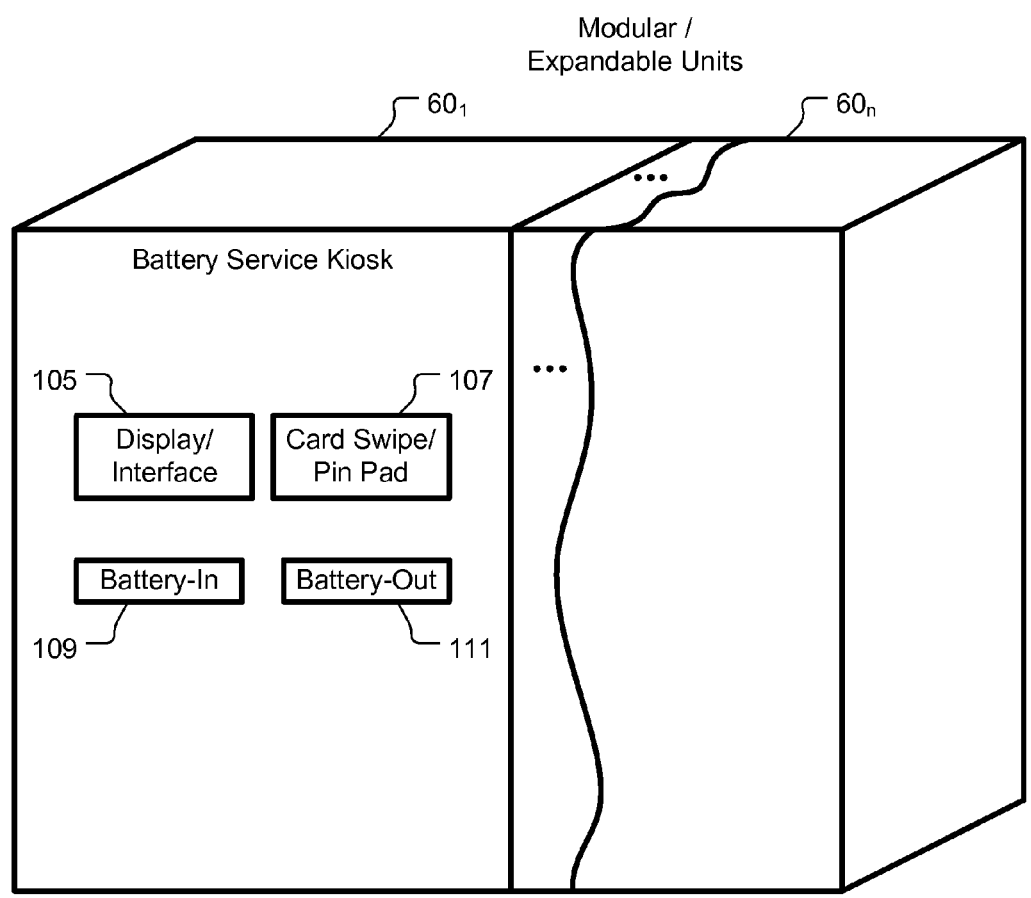
FIG. 13d illustrates an example battery service kiosk that can be expandable in a modular form by adding or subtracting kiosk units to satisfy demand at particular locations, in accordance with one embodiment of the present invention.

FIG. 13d illustrates an example battery service kiosk, that can be expandable in a modular form by adding or subtracting kiosk units to satisfy demand at particular locations, in accordance with one embodiment of the present invention. In this example, kiosk locations can be added in a connected manner to existing kiosk locations to expand the capacity of the modular system. By doing this, one kiosk can include the display interface 105, the battery in slot 109, the battery out slot 111, and the card swipe/pin pad 107 information.

Figure 13E:
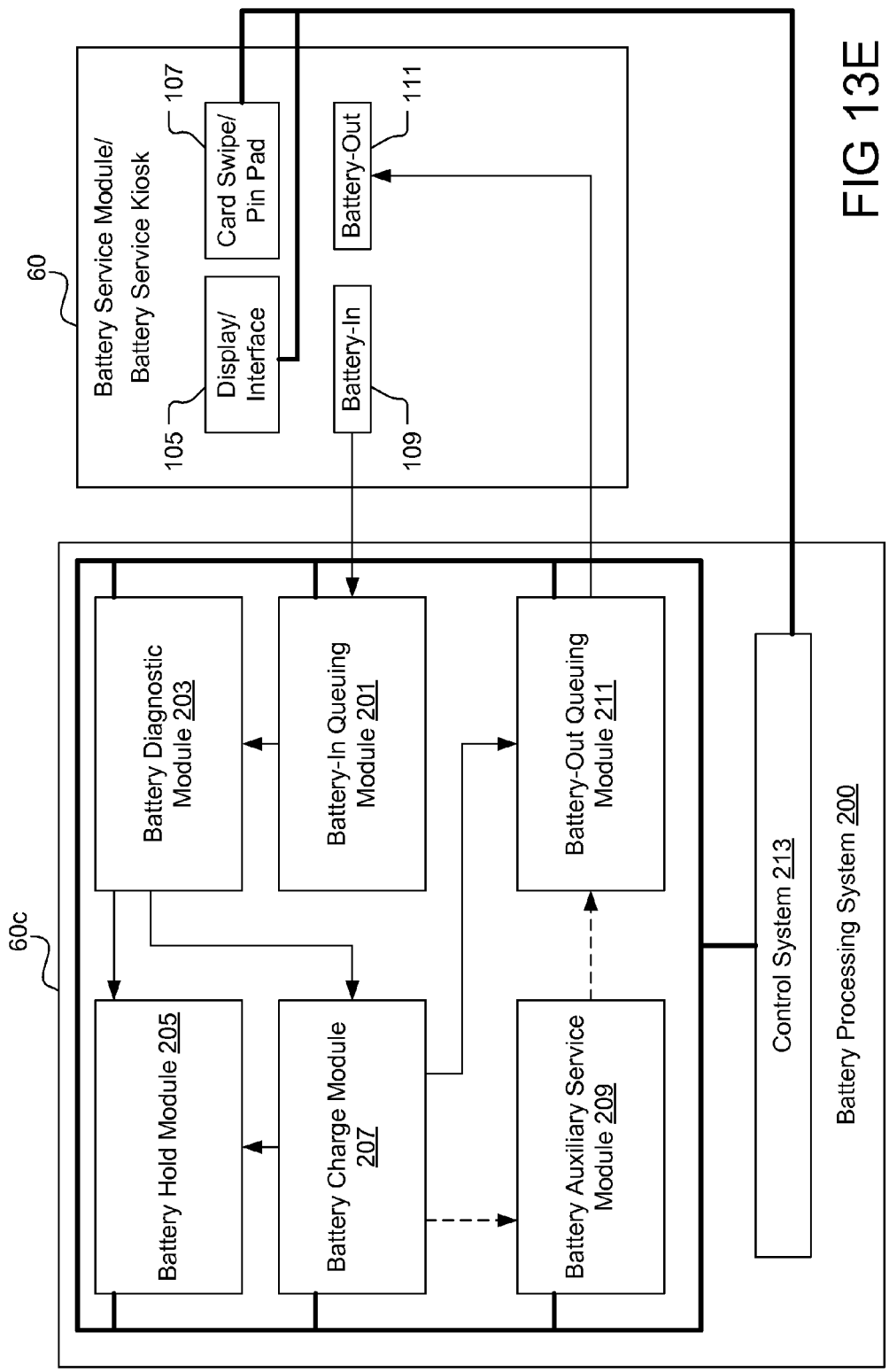
FIG. 13e illustrates one example logic diagram for processing battery data associated with batteries received at the kiosk, batteries dispensed at the kiosk, and associated payment transactions, in accordance with one embodiment of the present invention.

FIG. 13e illustrates one example logic diagram for processing battery data associated with batteries received at the kiosk, batteries dispensed at the kiosk, and associated payment transactions, in accordance with one embodiment of the present invention. This example shows a battery management system 60c, that includes several subsystems. A battery processing system 200 is shown including a control system 213. The control system 213 is coupled to a plurality of modules that control the receiving and dispensing of volt bars at a particular kiosk location, in one example. As shown, the battery processing system 200 includes a battery hold module 205, a battery charge module 207, a battery diagnostic module 203, a battery in queuing module 201, a battery auxiliary service module 209, and a battery out queuing module 211.

These systems are then connected to the battery service module or battery service kiosk 60. As shown, the battery in slot 109 is coupled to the battery in queuing module 201. When the battery is received, the battery is then put through a battery diagnostic module 203 where the battery diagnostic module will determine if the battery should be held or confiscated by battery hold module 205. If the battery is in good condition, the battery charge module 207 will charge the battery and allow the battery to be dispensed to a battery out queuing module 211, which in turn allows the battery to be output by the battery out slot 111. Again, the control systems described herein are only representative of one example and the control systems for receiving used or uncharged volt bars and dispensing new volt bars at particular kiosk locations can be modified to account for the volume of volt bars being dispensed, the form factor of the kiosk location, and other factors.

Figure 14A:
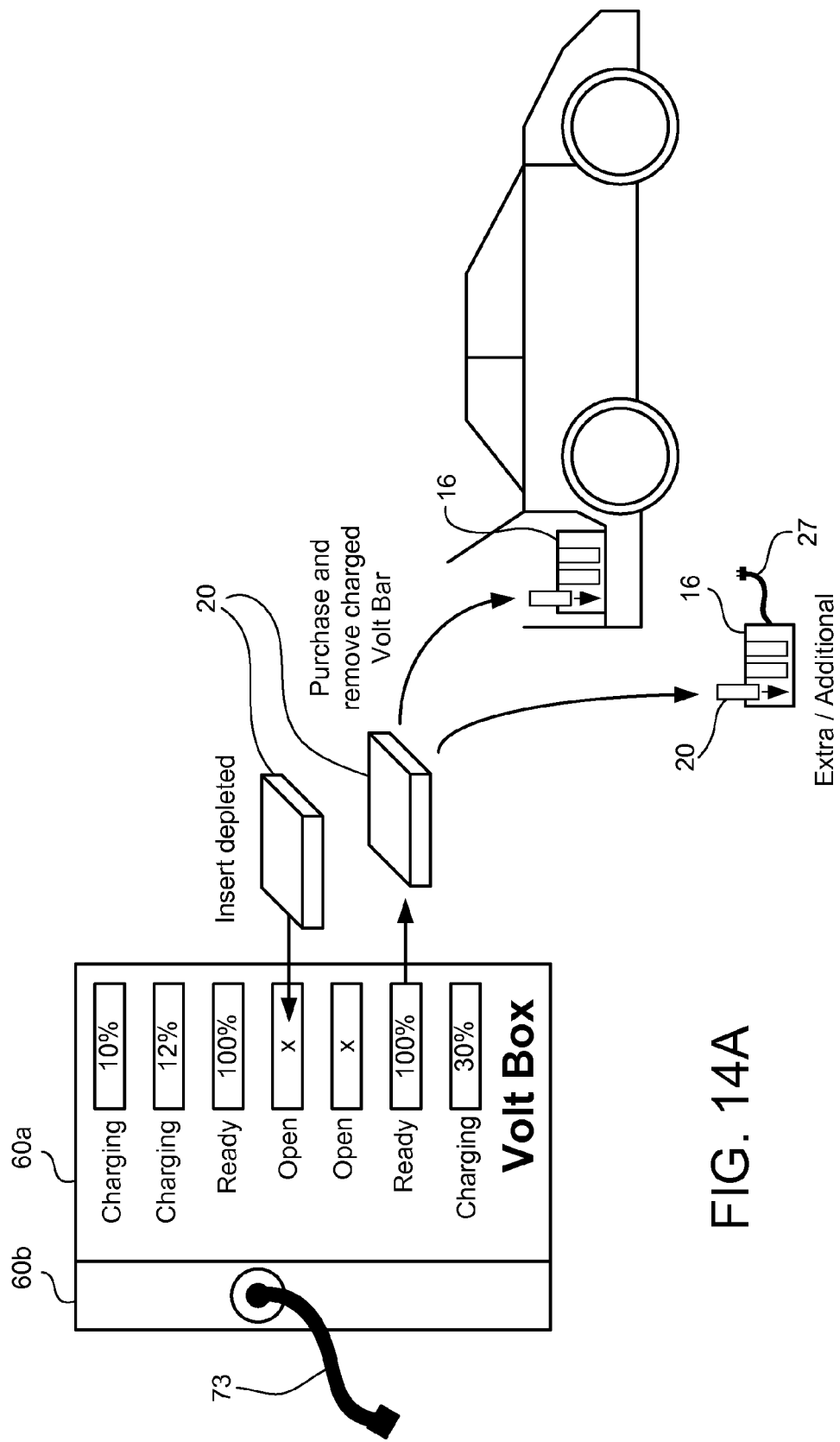
FIG. 14a illustrates one embodiment of an interface including a plurality of indicators at a volt box, that can receive and dispense volt bars for use by electric vehicles (in auxiliary battery carriers, or pre-manufactured slots in the vehicle), in accordance with one embodiment of the present invention.

FIG. 14a illustrates one embodiment of an interface including a plurality of indicators at a volt box, that can receive and dispense volt bars for use by electric vehicles (in auxiliary battery carriers, or pre-manufactured slots in the vehicle), in accordance with one embodiment of the present invention. As shown, an example of a volt box 60a having a plurality of volt bars is shown. Depleted volt bars 20 can be inserted into open slots, while users can purchase and remove charged volt bars from ready slots. The volt bars can then be inserted into an auxiliary battery carrier 16 that are external to the car or integrated within the car, or can be placed into the car.

Figure 14B:
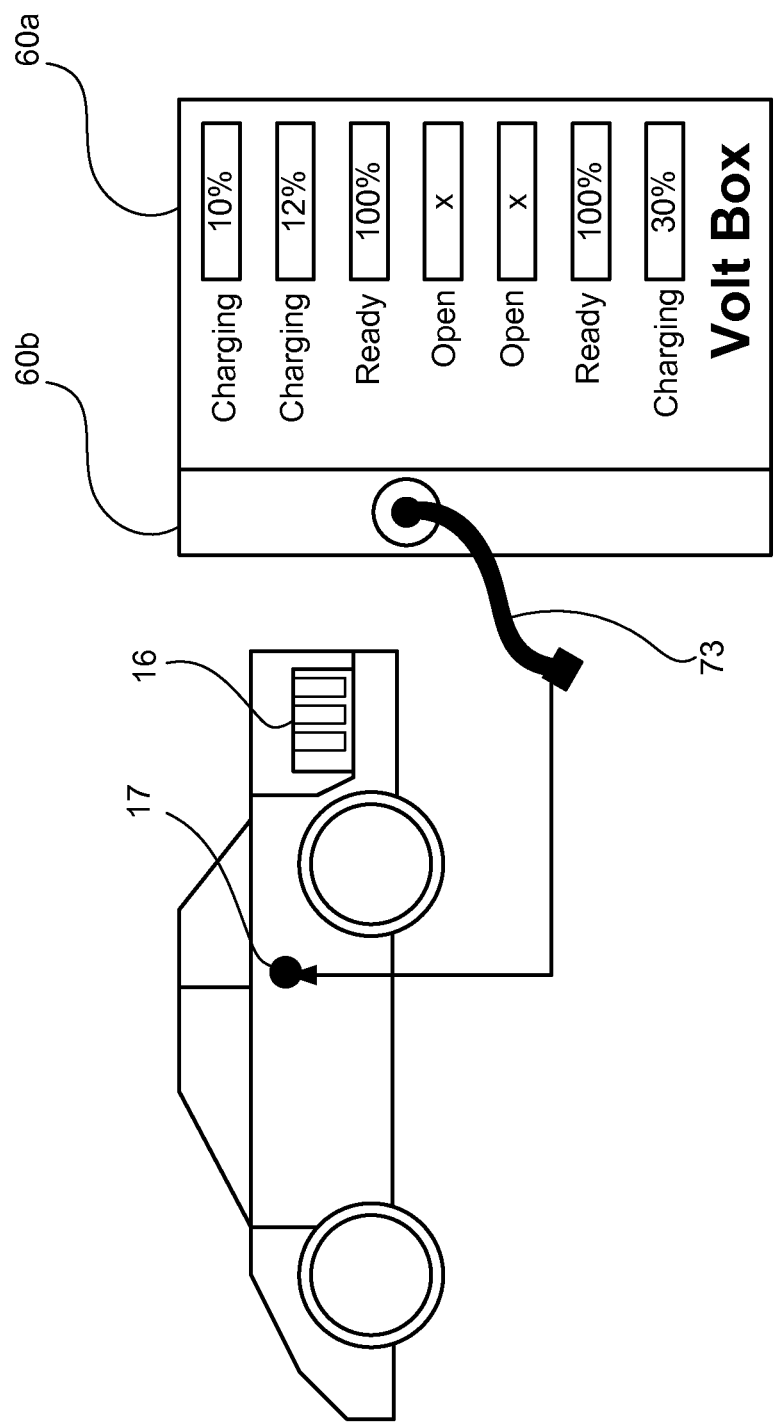
FIG. 14b illustrates another embodiment of a volt box (kiosk location) that additionally includes one or more charging cables that can be directly connected to an electric vehicles plug for efficient recharging at a remote location away from the user's base location (home), in accordance with one embodiment of the present invention.

FIG. 14*b* illustrates another embodiment of a volt box (kiosk location) that additionally includes one or more charging cables that can be directly connected to an electric vehicles plug for efficient recharging at a remote location away from the user's base location (home), in accordance with one embodiment of the present invention.

Figure 15:
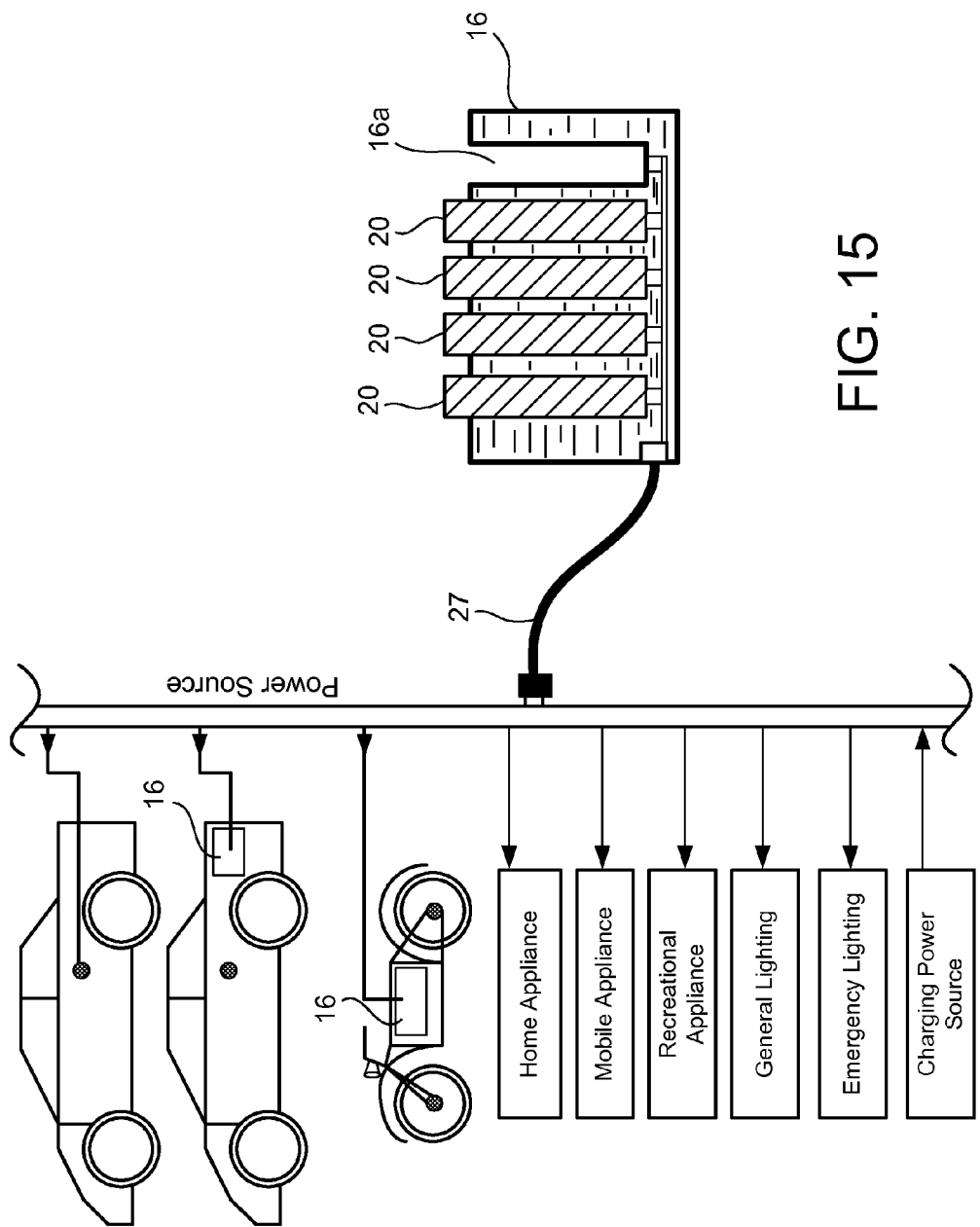
FIG. 15 illustrates an embodiment where in auxiliary battery carrier can be charged from any number of sources, and the volt bars can be used to charge and power any number of electric vehicles, or electric equipment, in accordance with one embodiment of the present invention.

FIG. 15 illustrates an embodiment where in auxiliary battery carrier can be charged from any number of sources, and the volt bars can be used to charge and power any number of electric vehicles, or electric equipment, in accordance with one embodiment of the present invention. This example shows that the power source can be delivered to any number of vehicles or appliances that consume electric power. A volt box 16 can be charged from various power sources, and can be inserted into various transportation vehicles, or appliances. The examples shown are various cars, motorcycles, home appliances, mobile appliances, recreational appliances, general lighting equipment, emergency lighting equipment, or charging power sources.

Figure 16A:
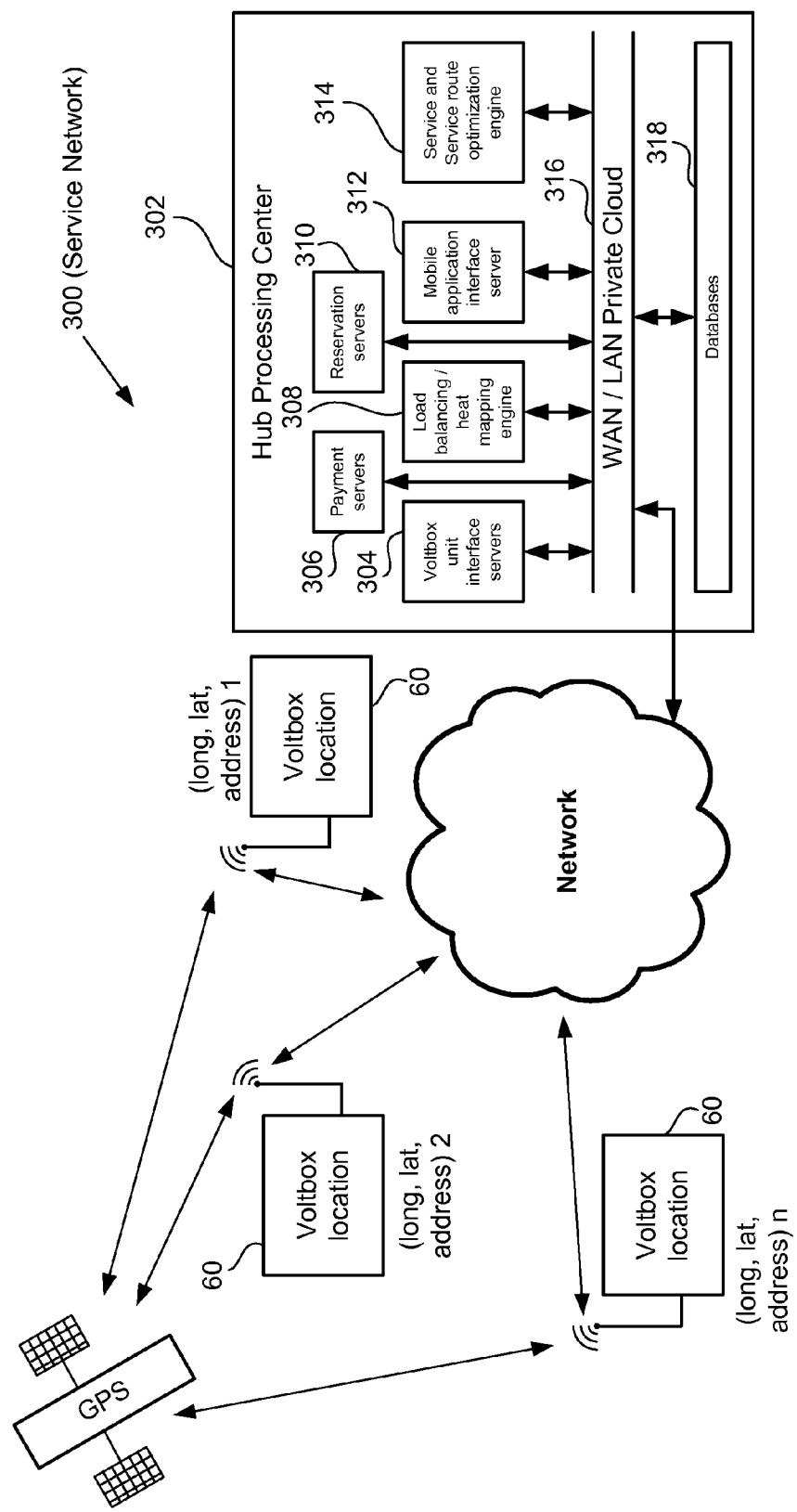
FIG. 16a illustrates one embodiment of the present invention that allows for volt box location (kiosk location) tracking of inventory and tracking of movement of volt bars among the various kiosk locations (defining the service network), in accordance with one embodiment of the present invention.

FIG. 16*a* illustrates one embodiment of the present invention that allows for volt box location (kiosk location) tracking of inventory and tracking of movement of volt bars among the various kiosk locations (defining the service network), in accordance with one embodiment of the present invention.

Figure 16B:
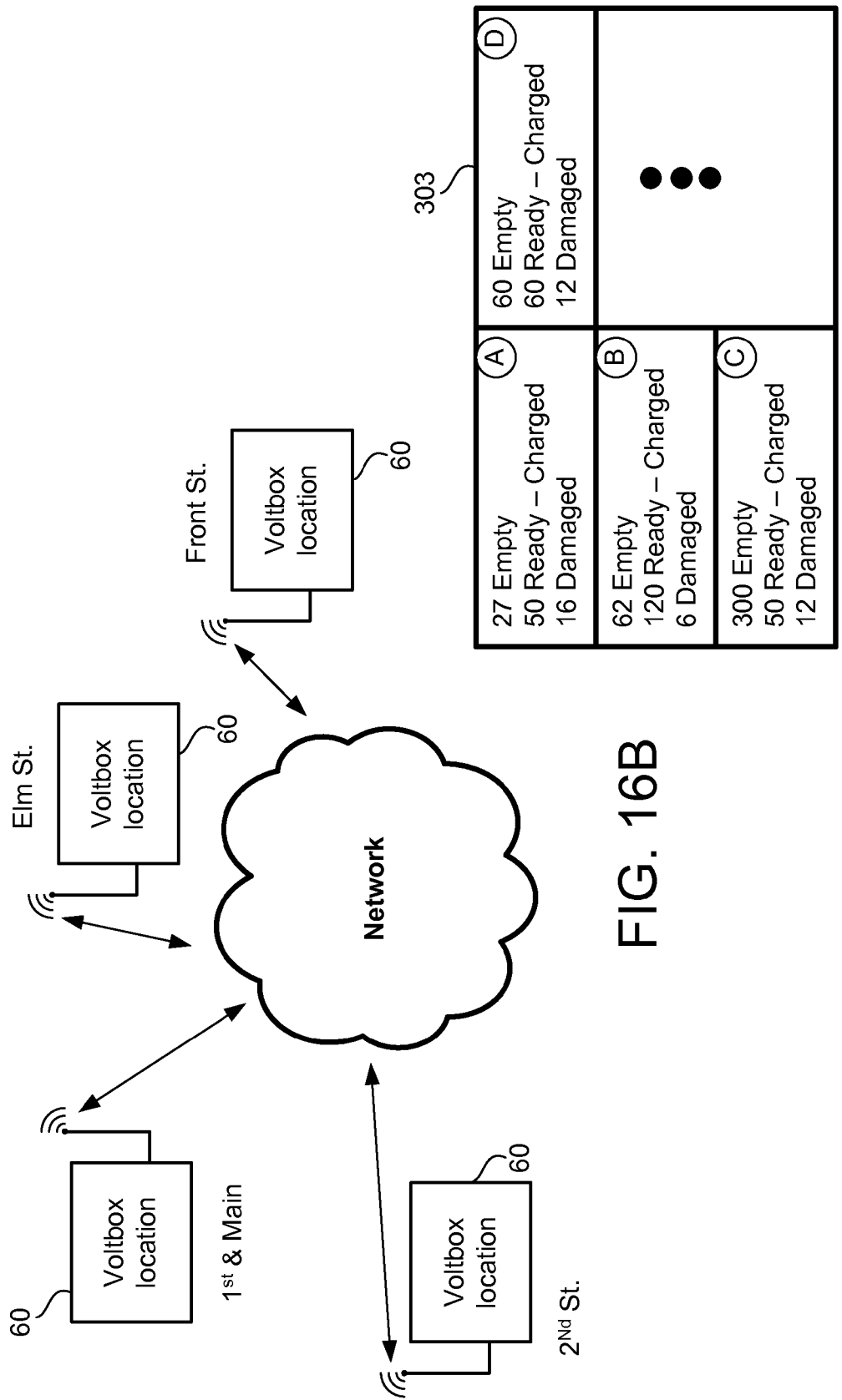
FIG. 16b illustrates another embodiment where volt box locations can be in communication with a central hub, where the central hub collects information regarding the number of empty, ready, charged, and otherwise utilized volt bars that can be purchased/rented by users at the volt box (kiosk) locations, in accordance with one embodiment of the present invention.

FIG. 16*b* illustrates another embodiment where volt box locations can be in communication with a central hub, where the central hub collects information regarding the number of empty, ready, charged, and otherwise utilized volt bars they can be purchased/rented by users at the volt box (kiosk) locations, in accordance with one embodiment of the present invention. This example illustrates how a hub processing center 302 couples to a service network 300. The hub processing center at 302 will include a number of operational units. The units can include payment servers 306, reservation servers 310, volt box unit interface servers 304, load balancing and heat mapping engines 308, mobile application interface servers 312, service and service route optimization engines 314, interfaces through wide area networks and local area networks and private/public/hybrid cloud infrastructures 316, and databases 318. The payment servers receive payments from the users and redeem payments from payment interface businesses.

The reservation servers 310 will allow users to reserve volt bars at particular volt box kiosk locations ahead of time. This ensures that users are able to obtain their volt bars at the destination they are approaching or have discovered that volt bars are available. By allowing users to advance reserve volt bars, users arriving at the kiosk location will not be discouraged if they find out that the volt bars that were indicated to be available are no longer available.

The load balancing and heat map engine 308 is configured to track the flow patterns of the volt bars around a particular network. If volt bars are accumulating at particular kiosk locations, the load-balancing engine can institute discounts at particular kiosk locations to influence the automatic distribution of the volt bars to other locations where volt bars are in short supply, or move volt bars away from locations where volt bars are accumulating. The heat map can identified in real time the movement of volt bars by tracking the RFID's on the various volt bars as they traverse the locations in the network.

For instance, as volt bars are removed from vehicles and inserted into kiosk locations, the volt bars can be analyzed to see where the volt bar originated, and where the volt bars have been from a historical mapping perspective. If volt bars appear to accumulate more in a particular location, the heat map will indicate a higher heat level, or indicator of where volt bars may be accumulating. The mobile application interface can then relay this information to users who are attempting to locate volt bars in the network. The mobile application interface server is configured to provide information to users on smart phones, or similar devices, or computer interfaces connected to the Internet.

An application can then track the user's current location and can inform the user of the closest kiosk location for obtaining a volt bar. The user can be provided with options to purchase an advance reserve the volt bars from those locations. The user can also be provided with discounts if the heat map desires to move certain volt box inventory away from certain kiosk locations to other kiosk locations. The discounts can influence users to obtain volt bars from certain volt boxes as opposed to others, thus automatically load-balancing the distribution of volt bars throughout the network.

Having information of the locations with volt bars, the status of volt bars, and the flow patterns, the service and service route optimization engine 314 can direct service agents to the most efficient locations to provide service. The service can include replacing volt bars that are identified to be past their useful life, replenish volt bars, and/or service the kiosk infrastructure. As shown in FIG. 16*a*, the various volt box locations 60 can be tracked using GPS information, address information, or previously defined location information. IP address locations and cell tower accessing can also be used.

Accordingly, the hub processing unit 302 is intelligently interfaced with the network to allow management of the various kiosk locations and ensure efficient distribution of volt bars to the various vehicles, and to provide information to users through mobile devices, computer interfaces, and allow for efficient and ease of purchase and reservation when volt bars are desired. By providing this information to users in a dynamic manner, users of electric vehicles will not be challenged with range anxiety when operating their electric vehicles from location to location throughout the globe.

Knowing that kiosk locations are available, and their ability to reserve, purchase, or identify availability of volt bars, and associated discounts, users are empowered with information that will enable efficient purchasing and utilization of energy for their electric vehicles. Social networks can also be accessed to determine if any comments or referrals are being made about specific locations, or if problems are being experienced at certain locations. Social networks can also be tapped to identify if certain locations are liked over other locations, and if certain features are particularly good or fall below some accepted standard.

FIG. 17 illustrates an example data structure and data communication transferred between a central hub and a volt box, and periodic automatic push-update of volt box memory data, in accordance one embodiment of the present invention. This embodiment shows that each location can be managed and the quantity of volt bars each location can be tracked by the central processing hub, to efficiently utilize the volt bars throughout the network. As shown, the volt box locations (kiosk locations) can be distributed throughout a city at different street addresses. Service personnel can then be routed to the specific streets of a city to perform the servicing operations.

The most efficient routes can then be predefined for the service technicians so that service can be made at each volt box location. This embodiment illustrates that each volt box location 60 can collect a plurality of data that can be relayed to the hub processing center 302. Based on the information collected by the hub processing center 302, on-demand information can be provided to the system for setting the price of each volt bar, and other parameters at specific volt box locations.

For example, the periodic updates can be pushed to the volt box memory data so that the charging stations can provide efficient pricing information, and adjustments based on market conditions. Memory 60-1 illustrates the various information data that can be stored at the volt box 60, and communicated to the hub processing center 302.

FIG. 18 illustrates another embodiment of a data structure (providing data) to a hub processing center (that communicates with full box stations) and the exchange of information, such as reservation data, in accordance with one embodiment of the present invention. This example illustrates a generic reservation push update of the volt box memory data. In this example, reservation data can be pushed to the volt box when obtained by the hub processing center 302. As noted above, when users reserve volt bars at specific volt box locations, the volt box locations need to update their information so that the reservation can be set.

Figure 19:
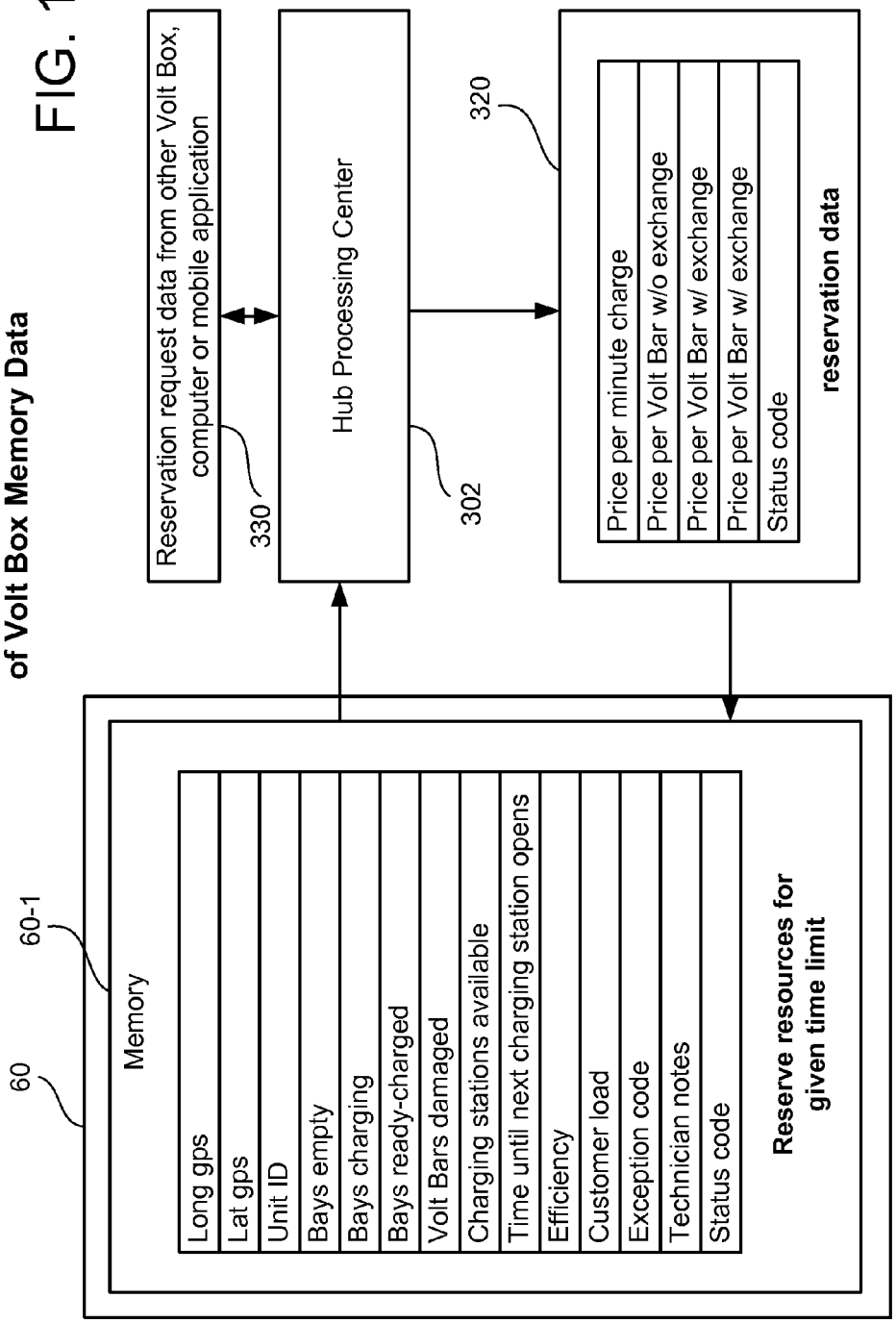
FIG. 19 illustrates another embodiment of a mobile/network reservation transaction and the transfer of data between the mobile application, the hub processing center, and the memory of a volt box (computing system managing the kiosk), in accordance with one embodiment of the present invention.

FIG. 19 illustrates another embodiment of a mobile/network reservation transaction and the transfer of data between the mobile application, the hub processing center, and the memory of a volt box (computing system managing the kiosk), in accordance with one embodiment of the present invention. In this example, the mobile/network reservation push update is made to the volt box memory data. For example, a reservation request data from another volt box can be received or from a computer or mobile application in step 330. The hub processing center 302 will then receive this information from the memory and will be in communication with the memory of the volt box to reserve resources for the given time limit. The reservation data is received from 320, in response to the setting by the hub processing center 302.

Figure 20A:
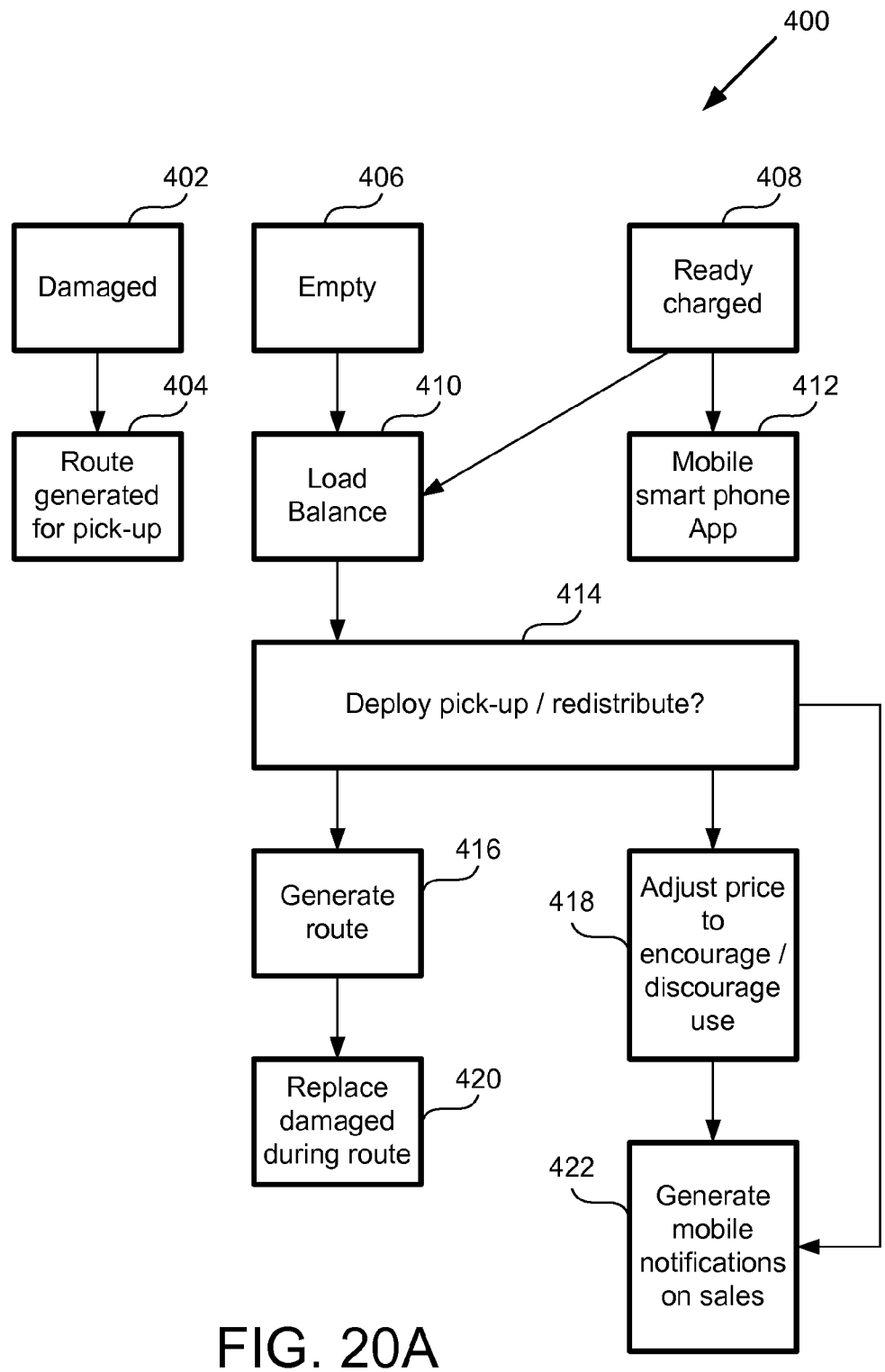
FIG. 20a illustrates an embodiment of logic that tracks information regarding the status of volt bars in the various kiosk stations, interfacing with mobile smart phone applications, load-balancing algorithms, and service route information, in accordance with one embodiment of the present invention.

FIG. 20a illustrates an embodiment of logic that tracks information regarding the status of volt bars in the various kiosk stations, interfacing with mobile smart phone applications, load-balancing algorithms, and service route information, in accordance with one embodiment of the present invention. This also illustrates an example of the processing of volt bars, such as managing damaged volt bars 402 and generating a route for pickup 404, when service operations are performed. Empty volt bar information 406 can then be communicated to a load balancer 410. The load balancer 410 can also receive information from ready charged volt bars 408. This information can then be communicated to a mobile smart phone application 412. Logic can then be processed in operation 414, to deploy pickup of volt bars or redistribution of volt bars.

The redistribution or pickup can then be managed by a route generator 416 where replacement of damaged volt bars 420 can occur during a route. In still another embodiment, the price can be adjusted in real time to encourage or discourage use of particular kiosk locations by module 418. Mobile notifications can also be generated to customers of particular sales or discounts based on the desired encouragement to move or flow volt bars to or from specific kiosk location is s by module 422. System 400 is provided as an example of the management systems that can controlled to achieve specific load-balancing, notifications, and management communications to users of the network.

Figure 20B:
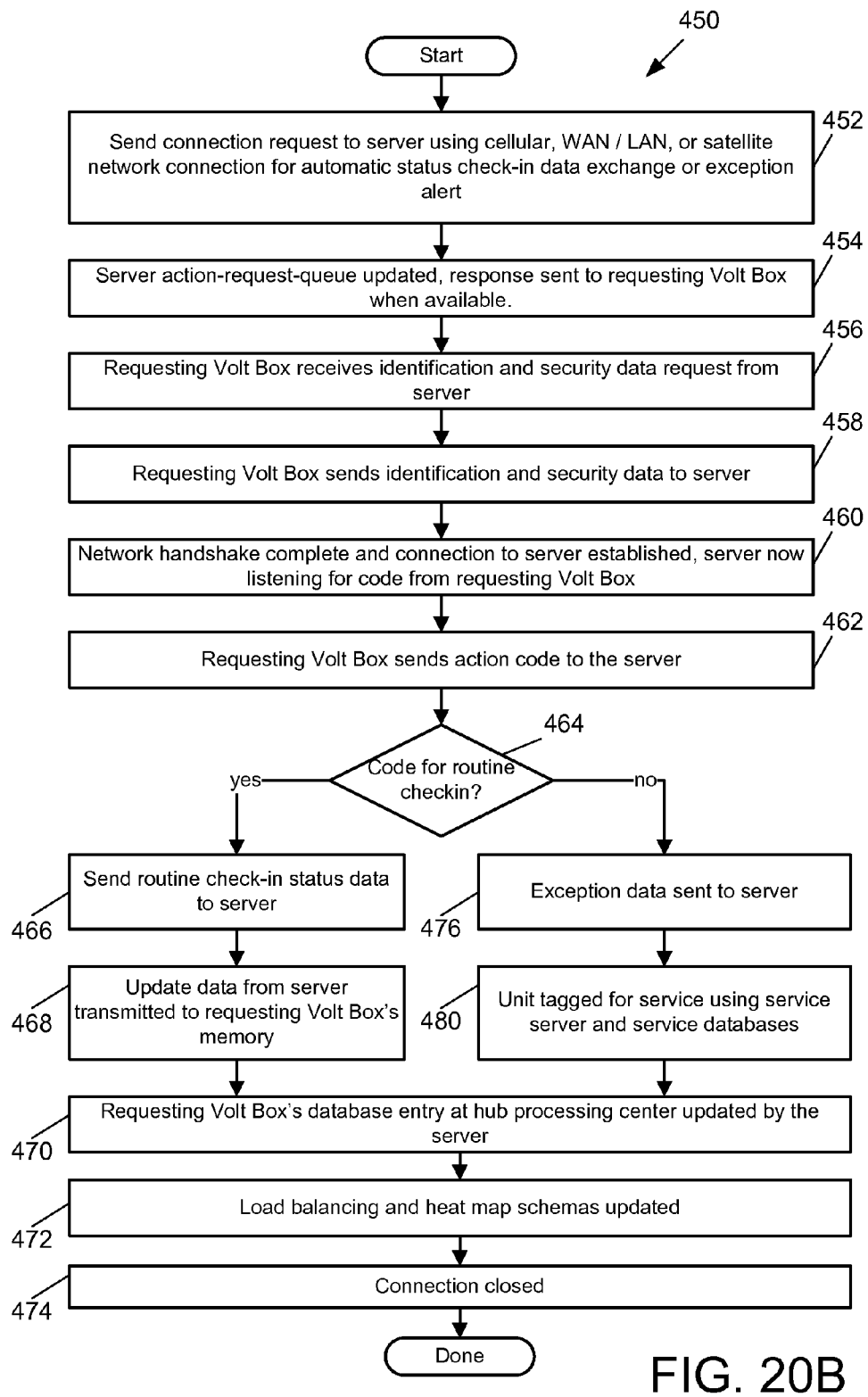
FIG. 20b illustrates an example data exchange between a volt box and the central hub for periodic updates, exception alerts and database updating including but not limited to load balancing and heat-map schemas, in accordance with one embodiment of the present invention.

FIG. 20b illustrates an example data exchange between a volt box and the central hub for periodic updates, exception alerts and database updating including but not limited to load balancing and heat-map schemas, in accordance with one embodiment of the present invention. In this specific process 450, the volt box uses a network including but not limited to cellular, WAN, LAN and or satellite to attempt to establish a connection with a server in the central hub in 452. The connection request sent to the server in 454 enters into a queue for processing.

When the server acknowledges the requesting volt box's connection attempt, the server will send identification and security information requirements back to the volt box in 456. The requesting volt box then sends the identification and security information requested by the server in 458 to establish the network handshake and commence data exchange described in 460. Once data exchange channels are open between the volt box and the server, the volt box sends an action code to the server, 462, at which point the server in 464 will determine if the code sent by the volt box is a routine check-in code. If the code sent by the volt box to the server is not a routine check-in code, the server will receive the code as exception data in 476 and subsequently tag the volt box that sent the code for service and update all dependant systems in 480.

If the code sent to the server in 462 and checked in 464 was a routine check-in code then the routine check in status on the sever is updated and the server subsequently sends update data to the requesting volt box's memory with up to date information. Data stores pertaining to the requesting volt box on the central processing hub and servers are updated after either a routine check-in code or an exception code has been successfully processed by the server, 470. Additional dependant systems and schemas are updated to provide the most up to date aggregate data and reporting after each and every individual volt box is updated in 472. When all updating has completed the connection between the requesting volt box and the server is closed, 474.

Figure 20C:
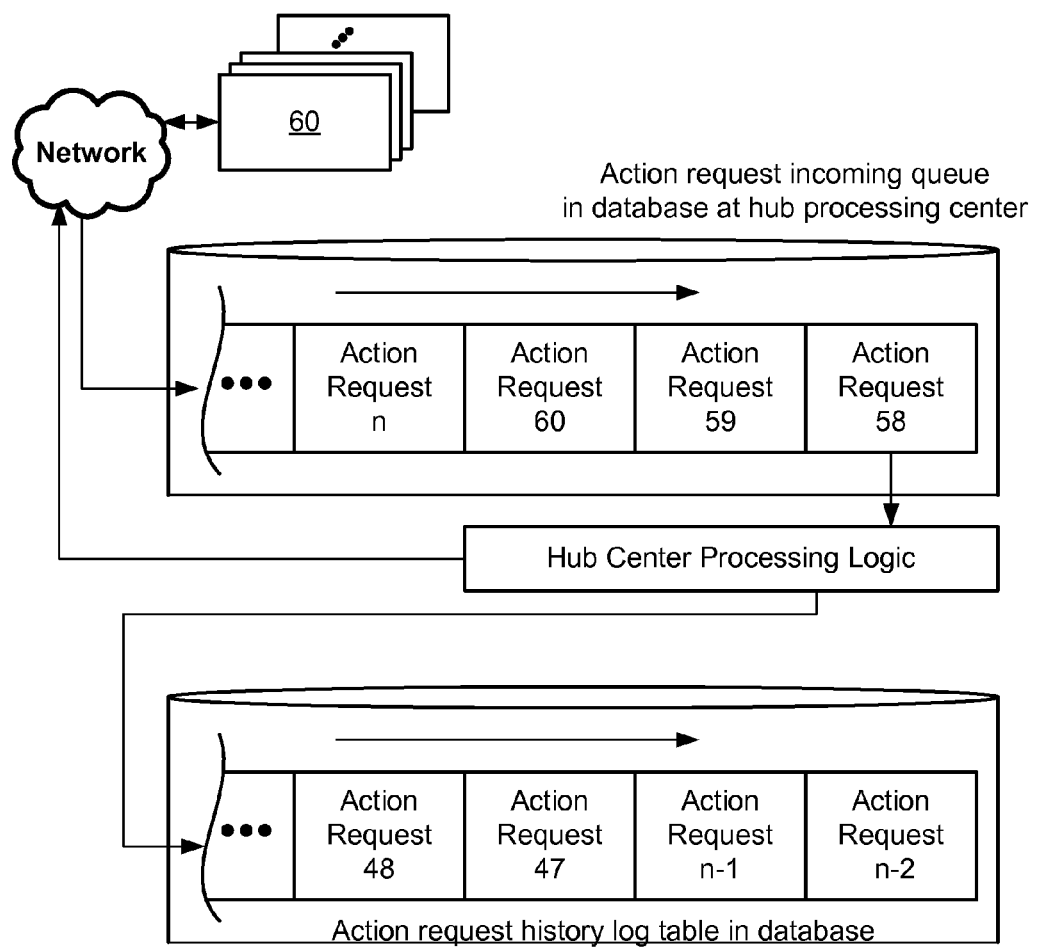
FIG. 20c illustrates an example data structure used in the processing, action, reply and logging of action requests from volt boxes in the field in accordance with one embodiment of the present invention.

FIG. 20c illustrates an example data structure used in the processing, action, reply and logging of action requests from volt boxes in the field in accordance with one embodiment of the present invention. The data structure and communication shown describes how a plurality of volt boxes, 60, communicates to a data structure within the hub processing center that receives action requests in an organized fashion for processing.

Logic at the hub processing center cycles through data segments in the data structure to individually address action requests using methodologies including but not limited to first-in-last-out, last-in-first-out, priority queuing, and weighted fair queuing. After the hub processing center processes an action request, a sync is performed with the volt box that sent the now processed action request. Additionally, an action request history storage data structure and database is updated with details specific to each processed action request such as identifying information for the requesting volt box, action requested, action performed, when it was performed and any additional notes, data points, tracking and reporting necessary to catalog and warehouse data related to action request handling.

Figure 20D:
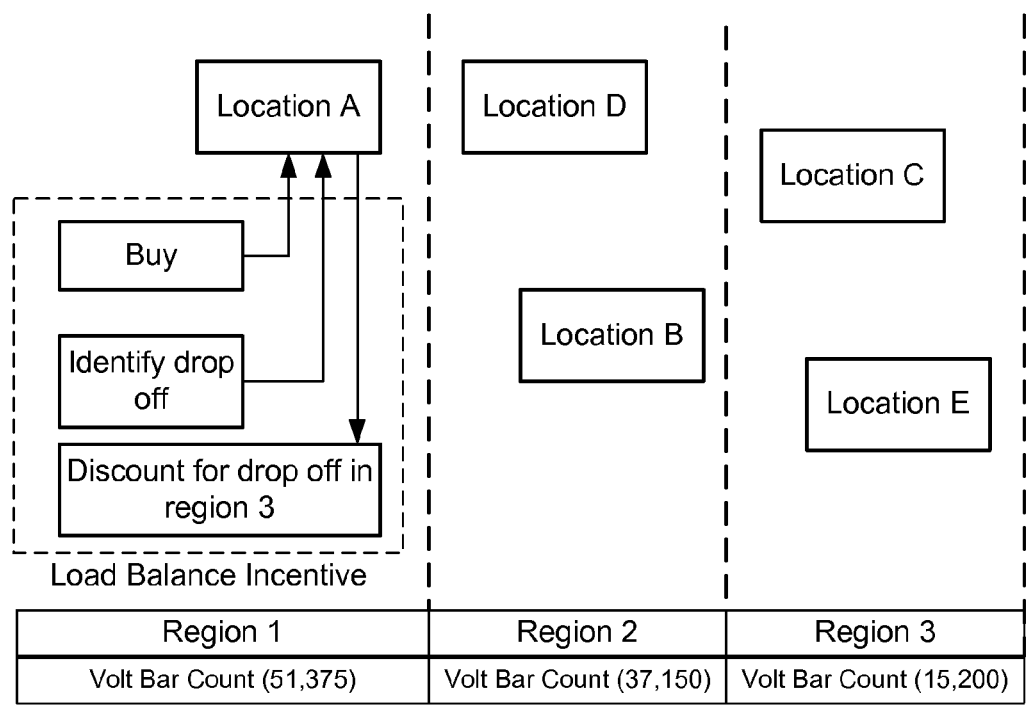
FIG. 20d describes one method of incentive driven virtual load balancing and rebalancing of volt bars in a given network of volt boxes in given regions, in accordance with one embodiment of the present invention.

FIG. 20d describes one method of incentive driven virtual load balancing and rebalancing of volt bars in a given network of volt boxes in given regions, in accordance with one embodiment of the present invention. In this example of the embodiment, regions are shown to work in conjunction with one another for load balancing of volt bars. Three regions are shown with varying number of volt bars located in aggregate total from the entirety of volt boxes designated as residing within the given region.

Region 1 shows to have 51,375 volt bars while region 3 only holds 15,200 volt bars. In order to maintain a steady inventory of volt bars across all regions, each volt box will advertise an incentive to exchange, purchase or drop off volt bars at a volt box in a region that is running low on volt bar inventory. When the inventory in a certain region is low as compared to other regions, volt boxes in that particular region may de-incentive consumers by raising the price of volt bars at a volt box accordingly.

Volt bar inventory may run low or high for a variety of reasons such as high demand due to a high traffic event close by or low demand due to a bedroom community in which most commuters are away for most of the day. Pricing will fluctuate to stabilize and load balance the availability of volt bars across all regions. Regions may be comprised of sub regions or be part of a larger regions. Regions also have the ability to become part of other regions dynamically and similarly individual volt boxes may be assigned to any given region based on demand, load balancing and strategy.

Figure 21:
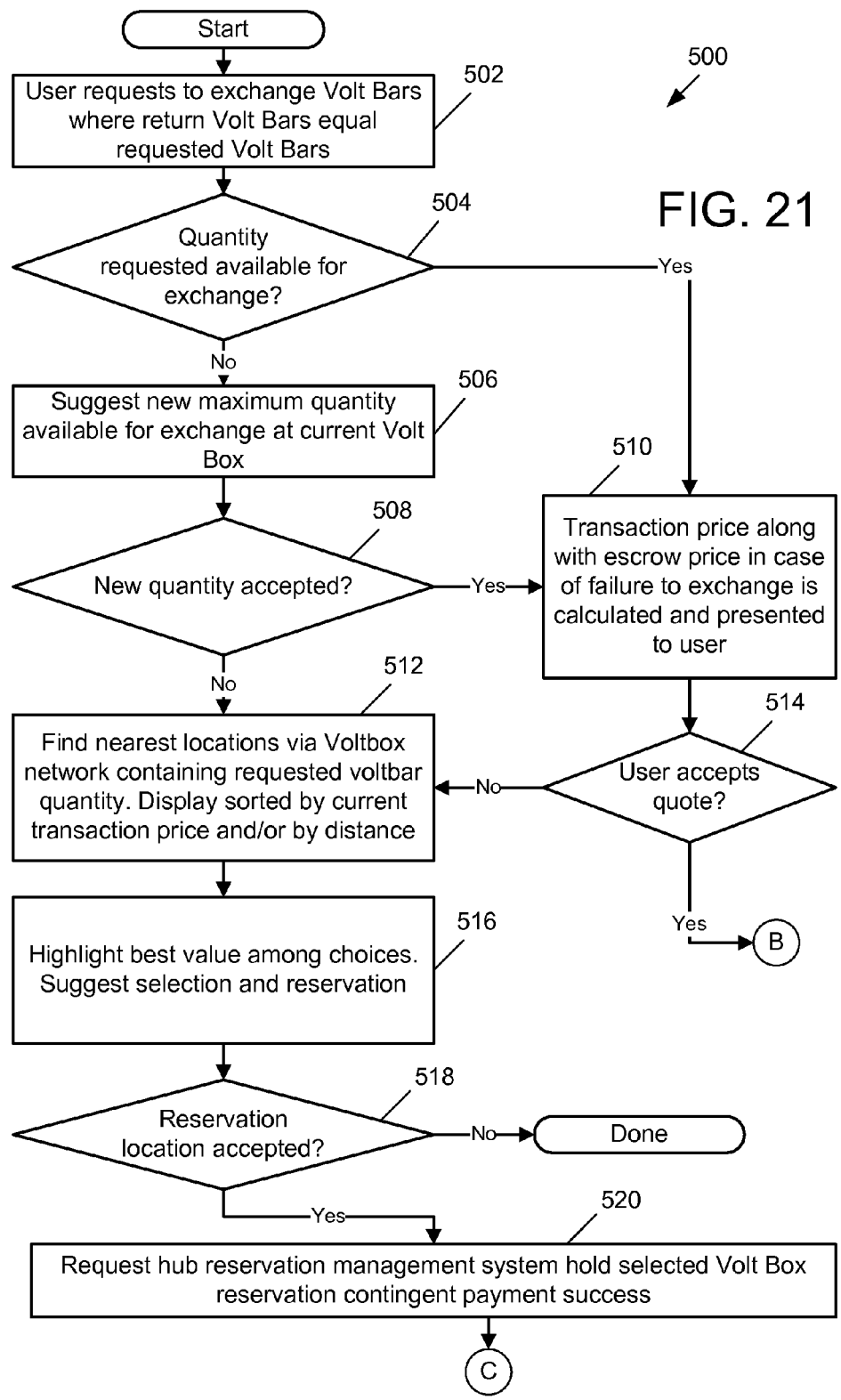
FIG. 21 illustrates a volt box use case in which a user requests to exchange volt bars where the number of return volt bars equal the requested volt bars, as well as logic for confirming validity of the request, exception handling, re-routing of the request and remote reservation for the request, in accordance with one embodiment of the present invention.

FIG. 21 illustrates a volt box use case in which a user requests to exchange volt bars where the number of return volt bars equal the requested volt bars, as well as logic for confirming validity of the request, exception handling, re-routing of the request and remote reservation for the request, in accordance with one embodiment of the present invention. This example embodiment is described by flow 500 with continuation B on FIG. 22 and continuation C on FIG. 23. In this example of the embodiment, a user requests to exchange volt bars at a volt box where the amount of fully charged volt bars requested equal the amount of discharged or spent volt bars the user will deposit into the volt box in 502. The user will enter the amount of volt bars required for their transaction and the system will determine, 504 if there are sufficient fully charged volt bars available to fill the user's request.

If there are enough fully charged volt bars to fill the users order, a transaction price along with an escrow price will be calculated presented to the user. The transaction price will be based on a successful transaction in which the same amount of fully charged volt bars tendered to the user equals the discharged volt bars deposited. If the user fails to deposit any amount of volt bars required to successfully complete the transaction, a penalty fee will be deducted from the escrow paid by the user in 510. If the user does not accept the quote and pricing offered by the volt box, 514, the user proceeds to 512.

If the volt box in 514 determines that the user has accepted the pricing presented in 510 (see FIG. 22), the volt box will ask for payment in one of the available forms including but not limited to cash, NFC, credit, pre-paid volt box code or a volt box credit account number in 522. Alternatively, if the user is reserving/purchasing volt bars via application on a network connected device, payment will be taken over the network as well. The volt box will then determine in 524 if the payment was successful. If the payment was not successful, the volt box or application on a network connected device will give the user the option to try to tender payment again in 526. If the user does not opt to try again the use case ends. In one embodiment, the volt box and network servers are updated with transaction results data.

If the payment is successful initially or after subsequent attempts in 524, then the volt box, volt box kiosk or application on a network connected device will make the number of fully charged volt bars available for removal of the volt box and designate their location in the volt box either visually and or audibly in 528. The user then performs the exchange in 530 where the user's spent volt bars are deposited into the same bays, available bays, slots or mechanism for depositing volt bars. The volt box then communicates with the volt bars via RFID or other wired or wireless communication method to determine if the correct amounts of depleted volt bars have been deposited in 532. The volt box also gathers information regarding the state of each volt bar at the time of deposit.

After the deposit has been completed, the volt box calculates if there is a refund due to the user or if the transaction has been completed in 534. If the volt box determines that damaged volt bars have been detected, an exception code is sent to the server at the processing hub that tags the volt box for volt bar replacement service. The volt box communicates data to the server about the transaction including but not limited to where the volt bars were tendered, the charge cycles the volt bar has completed, the user(s) the volt bar has been used by and other identifying information for reporting metrics and data warehousing.

The volt box then places the bay(s) containing the damaged volt bar(s) out of service as well as the volt bar(s) themselves by deactivating them. If no volt bars in 536 were determined to be damaged the use case ends after the server on the volt box network is updated with pertinent information regarding the transaction. If at 504 the volt box, volt box kiosk or application on a network connected device determines there are not sufficient fully charged volt bars at the volt box to fill the user's order, the volt box interface will suggest the user request the available maximum volt bars from the volt box in 506. If the new quantity is accepted in 508 then the user continues to 510.

If the user does not accept the new quantity of available fully charged volt bars available for transaction, the volt box will calculate and display using information from the volt box network which of the nearest volt box locations can fill the users requested volt bar exchange quantity. The volt box will use incentive, load balancing information from the server at the processing hub to display the user's options sorted by price, distance and or both in 512. The volt box in 516 will suggest the best value or incentives option for the user and allow the user to reserve the volt bars at the location described by the volt box in 516. If the user does not reserve the volt bars suggested by the volt box the use case ends without further action, and a server may be updated.

However, if the user does accept one of the qualifying volt box transaction sites, the volt box sends a request to the volt box reservation system to hold the volt bars requested at the volt box location indicated for the user while the user tenders payment in 520. (see FIG. 23) The volt box will ask for payment in one of the available forms including but not limited to cash, pre-paid volt box code or a volt box account number in 540. The volt box will then determine in 542 if the payment was successful. If the payment was not successful, the volt box or application on a network connected device will give the user the option to try again in 544. If the user does not opt to try again the volt box will notify the server at the processing hub to release the volt bars from reservation at the target volt box to make them available in the general pool of reservable/exchangeable/purchasable volt bars in 546.

If the payment is successful initially or after subsequent attempts in 542, then the volt box, volt box kiosk or application on a network connected device where the payment transaction in was completed will send a confirmation to the target volt box through the volt box network to retain the requested amount of volt bars for at least a pre determined number of minutes or hours in 548. The volt box will also produce a code for the user to take to the target volt box to redeem the pre purchased volt bar transaction. In one embodiment, the volt box network will update the user's account with reservation data accessible through any network connected device to view metrics and data related to all interactions the user has with the volt box network. When the user arrives at the target volt box holding reservation data for the user's transaction, the user will enter the code to redeem his or her transaction. The volt box will compare the code to code data on the server through the network to determine the validity and dispense as needed in 550.

If the user does not perform the transaction at the target volt box within the allotted time, the volt bars will be released into the available pool and the user will be credited. After the user performs his or her transaction the use case ends without further action. In one embodiment, a server may be updated.

Figure 22:
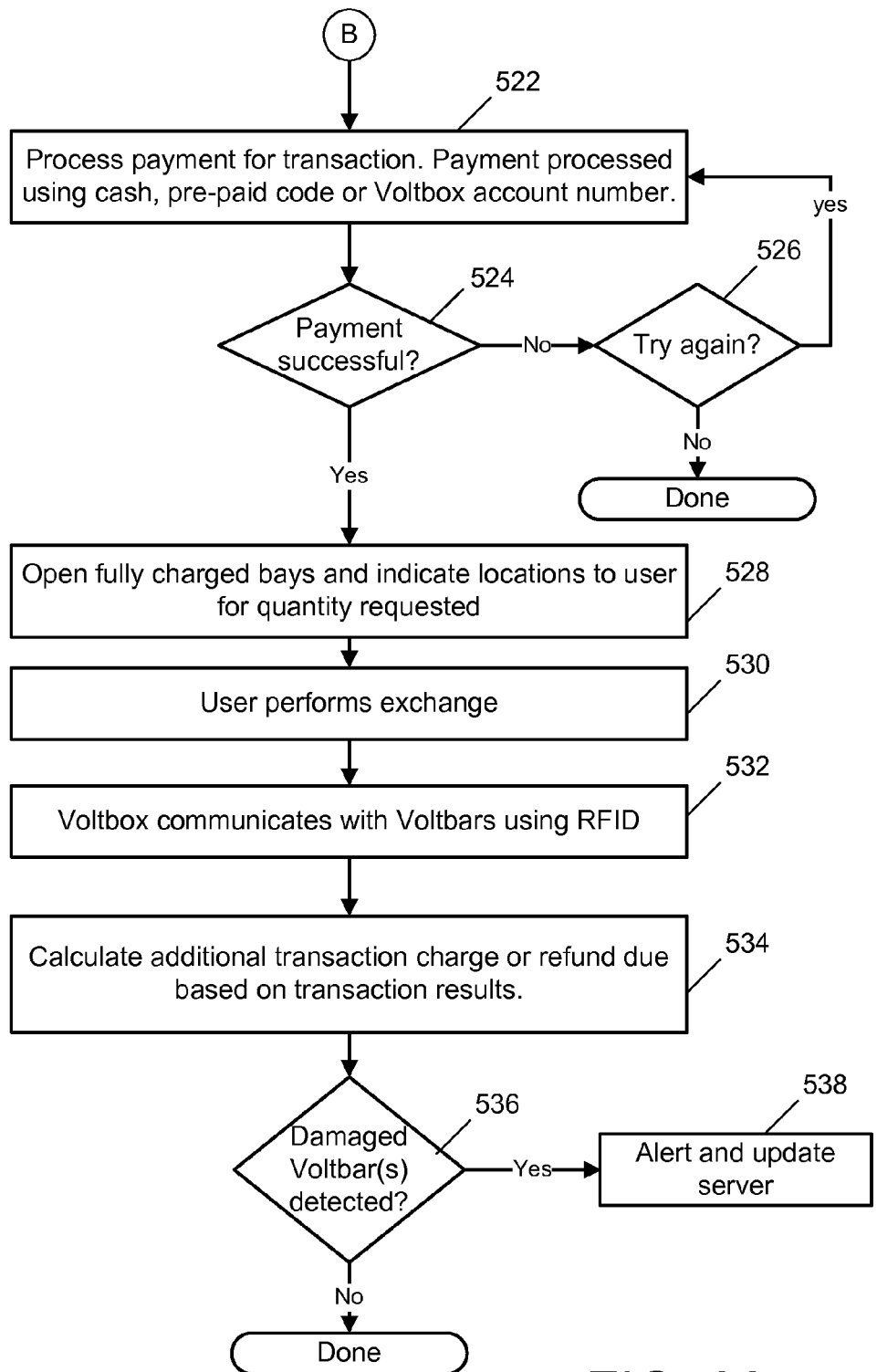
FIG. 22 illustrates one method of purchase and volt bar dispensing as requested in FIG. 21, communication of volt bar with volt box and damage detection with transaction results transmitted to the central hub, in accordance with one embodiment of the present invention.

FIG. 22 illustrates one method of purchase and volt bar dispensing as requested in FIG. 21, communication of volt bar with volt box and damage detection with transaction results transmitted to the central hub, in accordance with one embodiment of the present invention.

Figure 23:
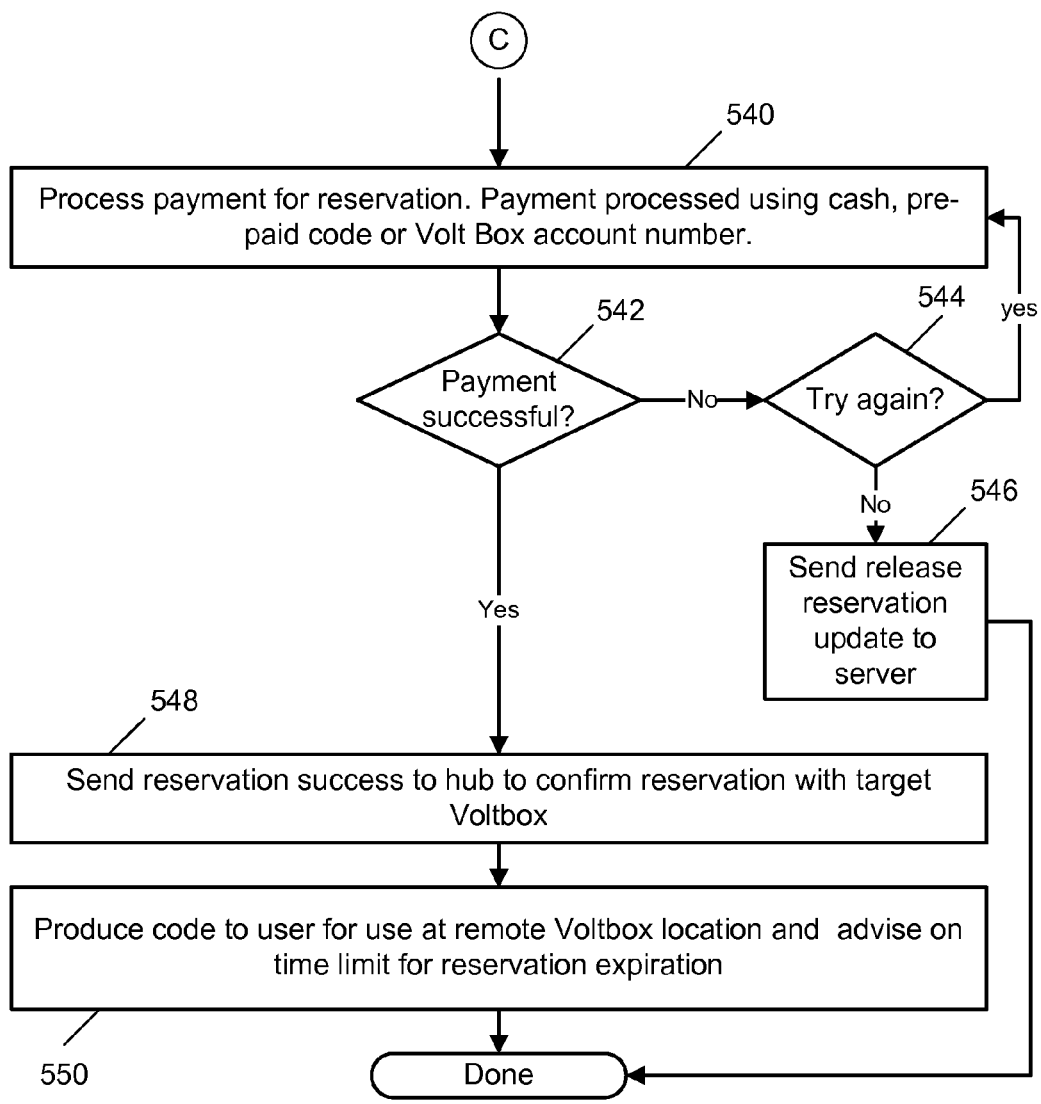
FIG. 23 illustrates one method of volt box-to-volt box reservation with pre-payment and reservation completion through the central hub, in accordance with one embodiment of the present invention.

FIG. 23 illustrates one method of volt box-to-volt box reservation with pre-payment and reservation completion through the central hub, in accordance with one embodiment of the present invention.

Figure 24:
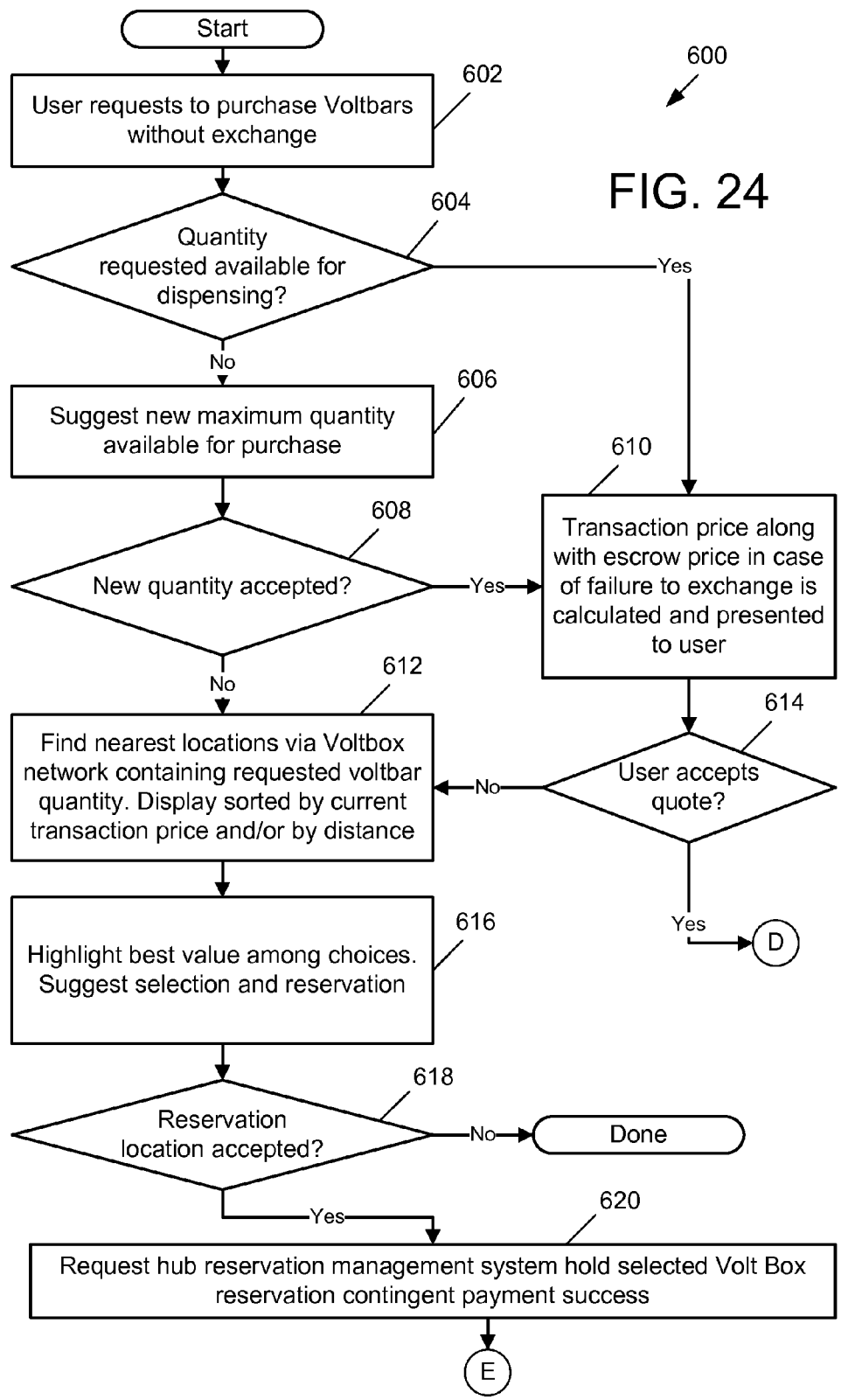
FIG. 24 illustrates a volt box use case in which a user requests to purchase volt bars without exchange, as well as logic for confirming validity of the request, exception handling, re-routing of the request and remote reservation for the request, in accordance with one embodiment of the present invention.

FIG. 24 illustrates a volt box use case in which a user requests to purchase volt bars without exchange, as well as logic for confirming validity of the request, exception handling, re-routing of the request and remote reservation for the request, in accordance with one embodiment of the present invention. In this example, flow 600 can continue to D on FIG. 25 and continue to E on FIG. 26. In this example of the embodiment, a user requests to purchase volt bars at a volt box without tendering spent volt bars in 602. The user will enter the amount of volt bars the user wishes to purchase and the system will determine, 604 if there are sufficient fully charged volt bars available to fill the user's request. If there are enough fully charged volt bars to fill the users order, a transaction price along with an escrow price will be calculated presented to the user.

The transaction price will be based on the number of fully charged volt bars requested by the user using the latest pricing information from the volt box network in 610. If the user does not accept the quote and pricing offered by the volt box, 614, the user proceeds to 612. If the volt box in 614 determines that the user has accepted the pricing presented in 610 (see, FIG. 25) the volt box will ask for payment in one of the available forms including but not limited to cash, NFC, credit, pre-paid volt box code or a volt box credit account number in 622. Alternatively, if the user is reserving/purchasing volt bars via application on a network connected device, payment will be taken over the network as well.

The volt box will then determine in 624 if the payment was successful. If the payment was not successful, the volt box or application on a network connected device will give the user the option to try to tender payment again in 626. If the user does not opt to try again the use case ends. In one embodiment, the volt box and network servers are updated with transaction results data. If the payment is successful initially or after subsequent attempts in 624, then the volt box, volt box kiosk or application on a network connected device will make the number of fully charged volt bars available for removal of the volt box and designate their location in the volt box either visually and or audibly in 628. The user then removes the volt bars from the volt box in 630. After the removal of volt bars is complete, the volt box calculates if there is a refund due to the user or if the transaction has been completed in 632. After removal at 630 and calculation at 632 is complete, the volt box updates the volt box network with the results of the transaction to update all dependant data structures, data stores and data warehouses, 634.

If at 604 the volt box, volt box kiosk or application on a network connected device determines there are not sufficient fully charged volt bars at the volt box to fill the user's order, the volt box interface will suggest the user request the available maximum volt bars from the volt box in 606. If the new quantity is accepted in 608 then the user continues to 610. If the user does not accept the new quantity of available fully charged volt bars available for transaction, the volt box will calculate and display using information from the volt box network which of the nearest volt box locations can fill the users requested volt bar quantity. The volt box will use incentive, load balancing information from the volt box network to display the user's options sorted by price, distance and or both in 612. The volt box in 616 will suggest the best value or incentives option for the user and allow the user to reserve the volt bars at the location described by the volt box in 616.

If the user does not reserve the volt bars suggested by the volt box the use case ends without further action, and the server may be updated. However, if the user does accept one of the qualifying volt box transaction sites, the volt box sends a request to the volt box reservation system to hold the volt bars requested at the volt box location indicated for the user while the user tenders payment in 620. (see FIG. 26) The volt box will ask for payment in one of the available forms including but not limited to cash, pre-paid volt box code or a volt box account number in 636. The volt box will then determine in 638 if the payment was successful. If the payment was not successful, the volt box or application on a network connected device will give the user the option to try again in 640. If the user does not opt to try again the volt box will notify the server at the processing hub to release the volt bars from reservation at the target volt box to make them available in the general pool of reservable/exchangeable/purchasable volt bars in 642.

If the payment is successful initially or after subsequent attempts in 638, then the volt box, volt box kiosk or application on a network connected device where the payment transaction in was completed will send a confirmation to the target volt box through the volt box network to retain the requested amount of volt bars for at least a pre determined number of minutes or hours in 644. The volt box will also produce a code for the user to take to the target volt box to redeem the pre purchased volt bar transaction.

Additionally, the volt box network may update the user's account with reservation data accessible through any network connected device to view metrics and data related to all interactions the user has with the volt box network. When the user arrives at the target volt box holding reservation data for the user's transaction, the user will enter the code to redeem his or her transaction. The volt box will compare the code to code data on the server through the network to determine the validity and dispense as needed in 646.

If the user does not perform the transaction at the target volt box within the allotted time, the volt bars will be released into the available pool and the user will be credited. After the user performs his or her transaction the use case ends without further action, and the servers may be updated.

Figure 25:
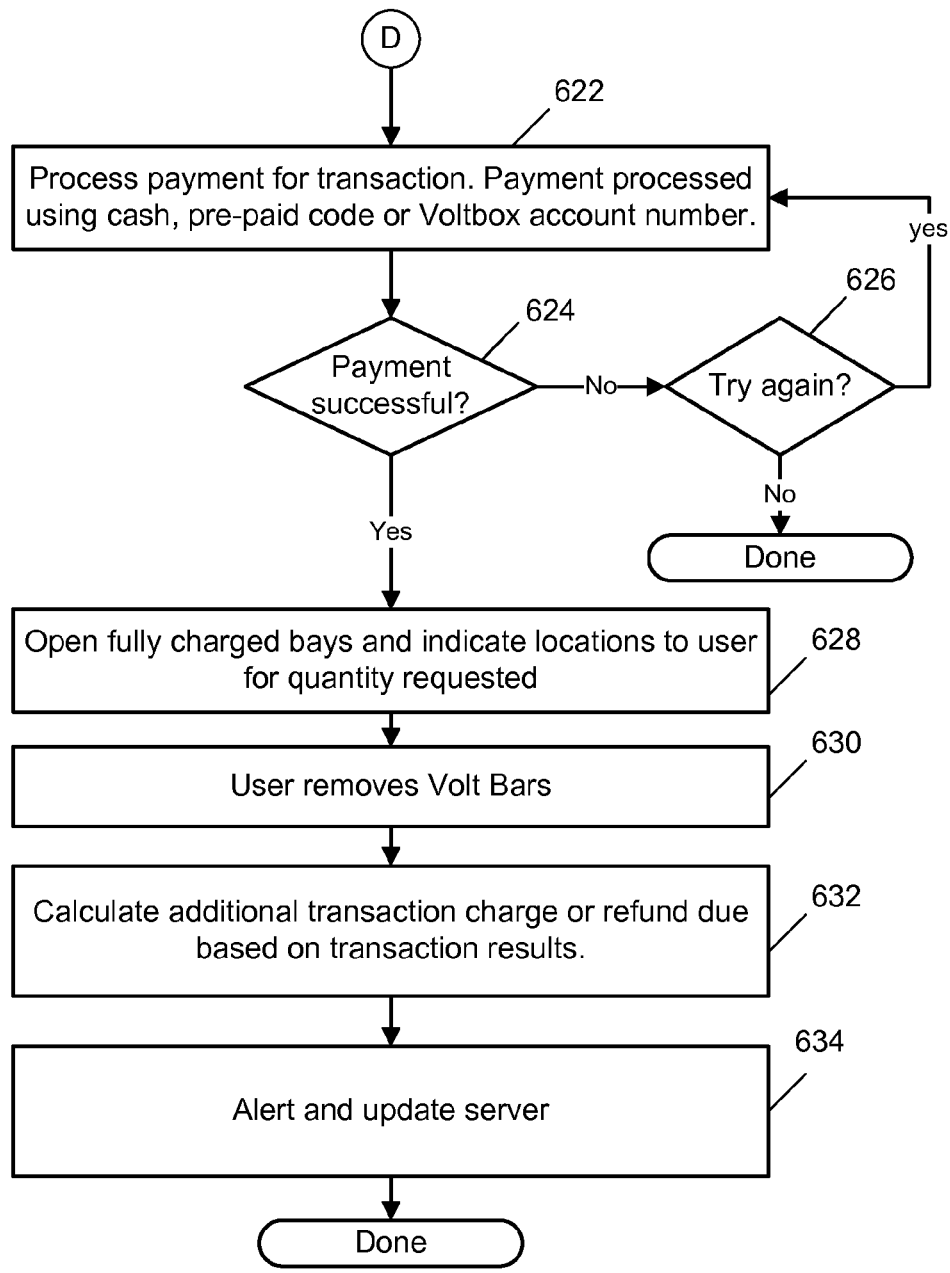
FIG. 25 illustrates one method of purchase and volt bar dispensing as requested in FIG. 24, communication of volt bar with volt box and damage detection with transaction results transmitted to the central hub, in accordance with one embodiment of the present invention.

FIG. 25 illustrates one method of purchase and volt bar dispensing as requested in FIG. 24, communication of volt bar with volt box and damage detection with transaction results transmitted to the central hub, in accordance with one embodiment of the present invention.

Figure 26:
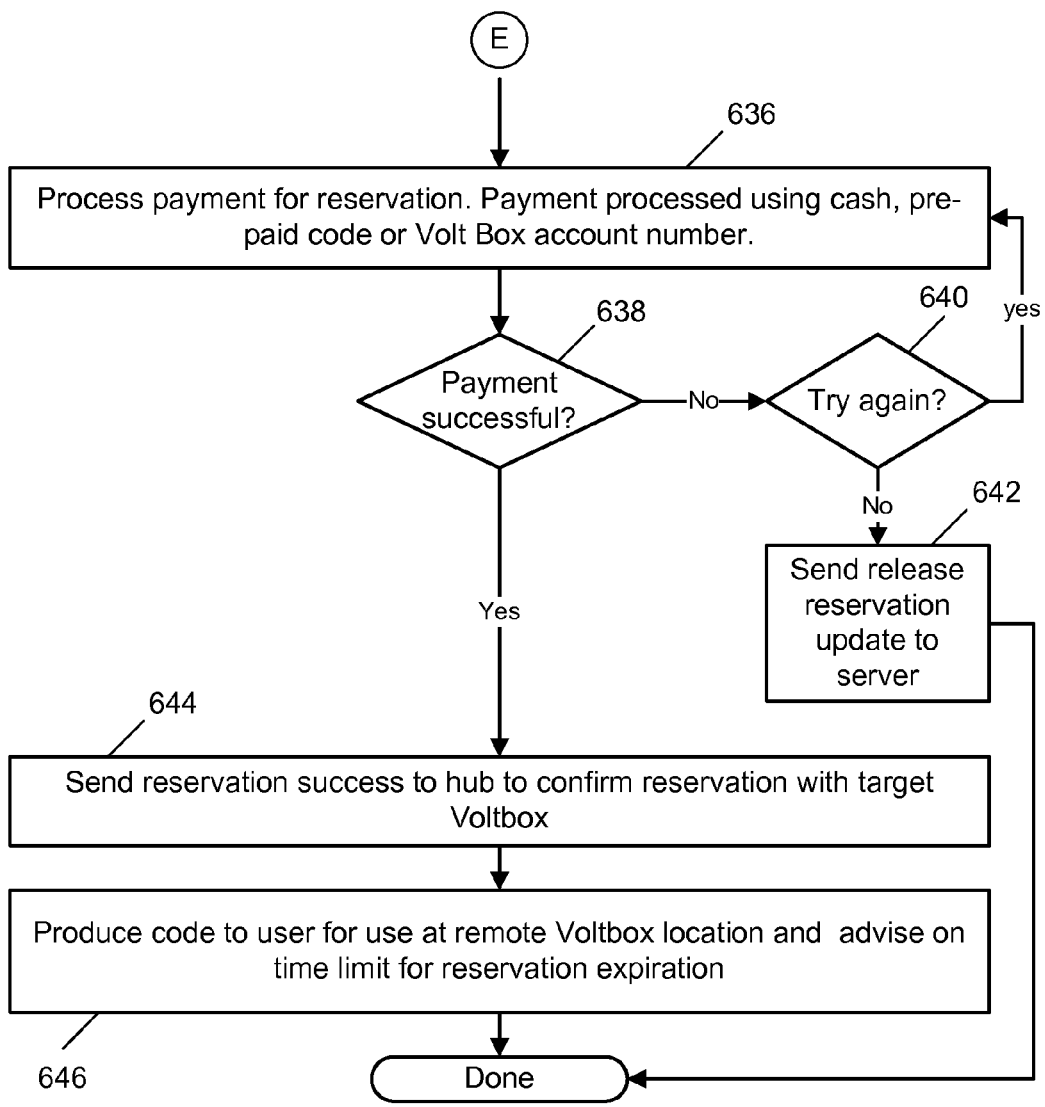
FIG. 26 illustrates one method of volt box-to-volt box reservation for the requested transaction in FIG. 24 with pre-payment and reservation completion through the central hub, in accordance with one embodiment of the present invention.

FIG. 26 illustrates one method of volt box-to-volt box reservation for the requested transaction in FIG. 24 with pre-payment and reservation completion through the central hub, in accordance with one embodiment of the present invention.

Figure 27:
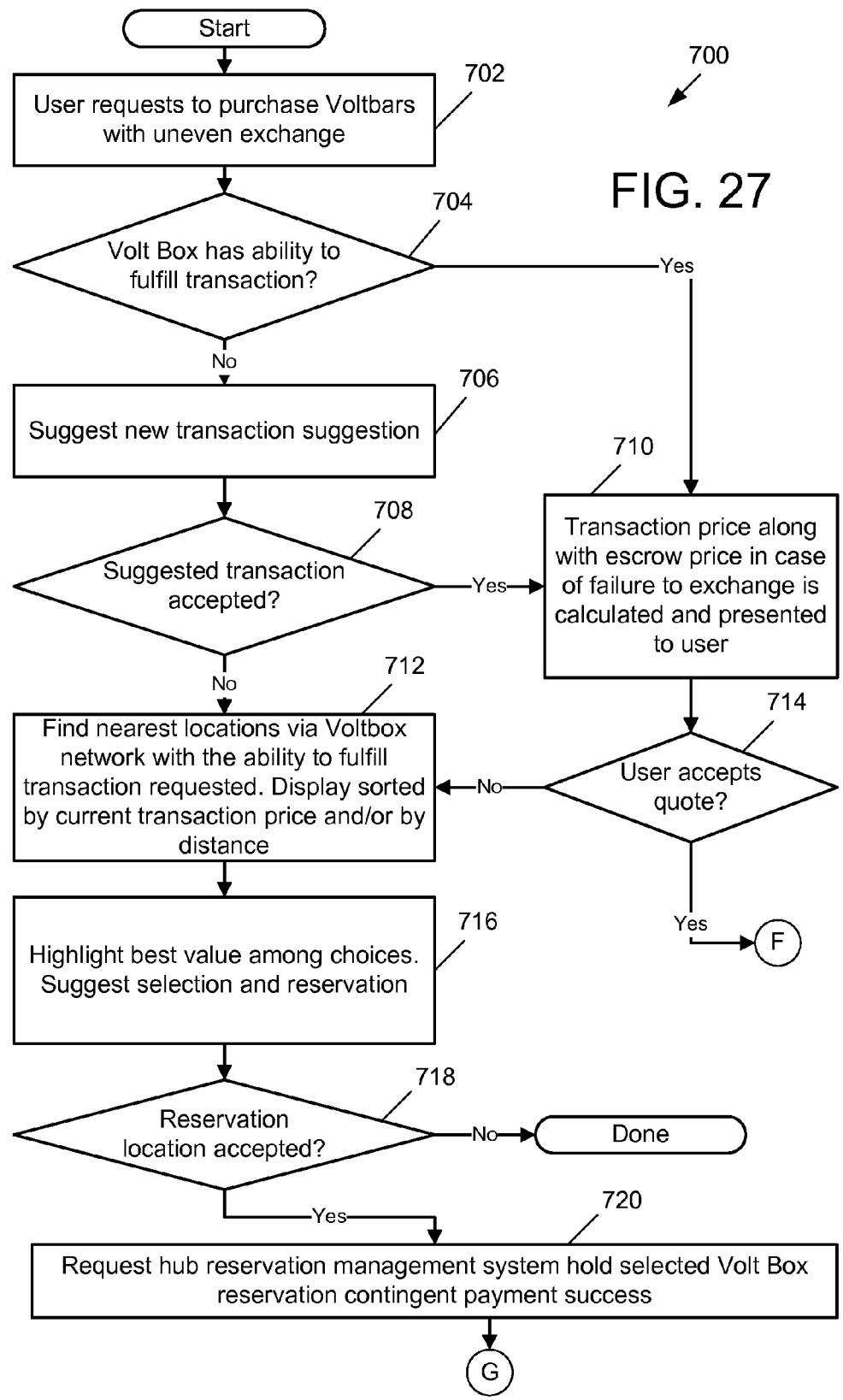
FIG. 27 illustrates a volt box use case in which a user requests to purchase volt bars with an un-even volt bar exchange, as well as logic for confirming validity of the request, exception handling, re-routing of the request and remote reservation for the request, in accordance with one embodiment of the present invention.
Figure 28:
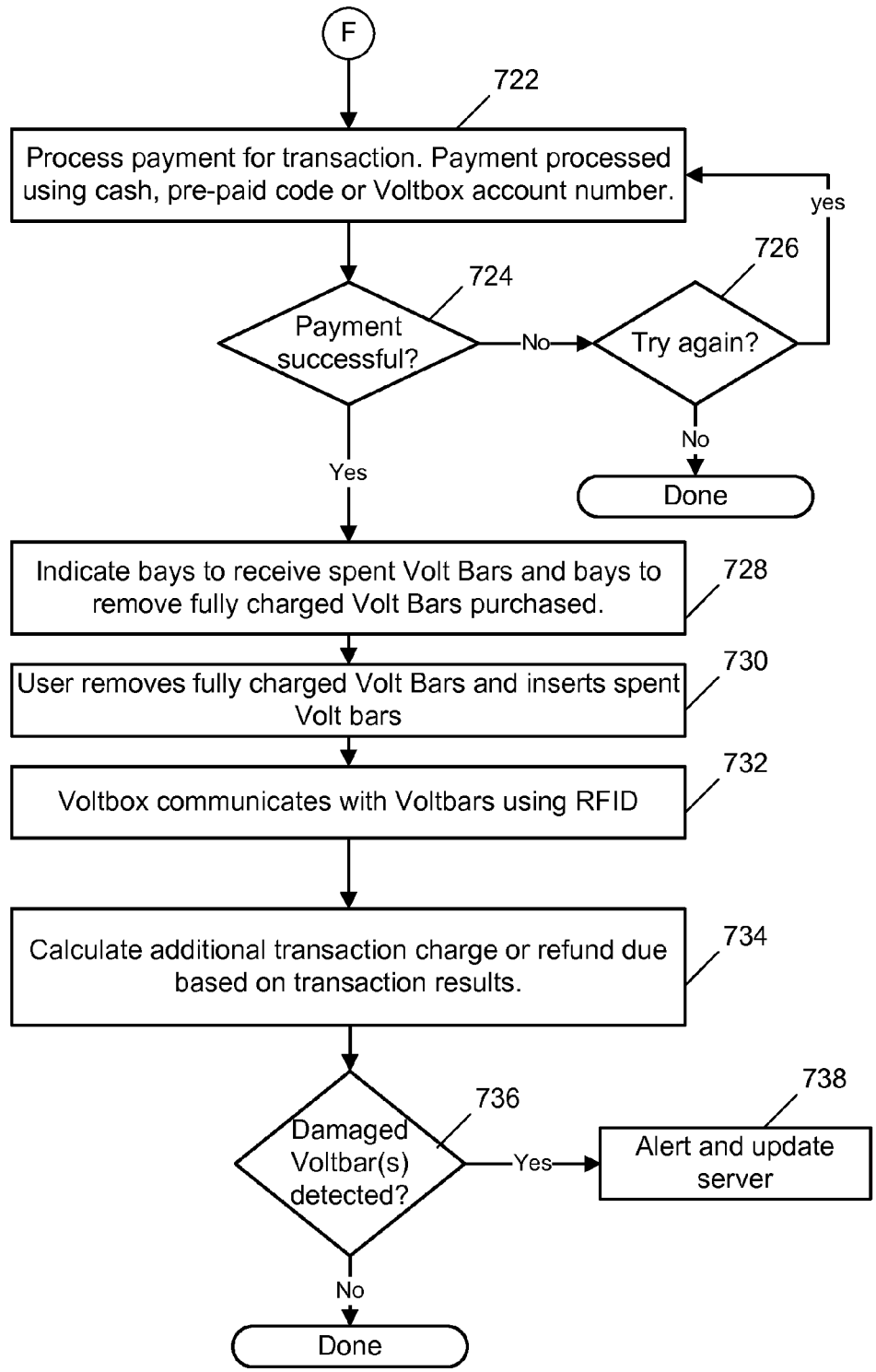
FIG. 28 illustrates one method of purchase and volt bar dispensing as requested in FIG. 27, communication of volt bar with volt box and damage detection with transaction results transmitted to the central hub, in accordance with one embodiment of the present invention.
Figure 29:
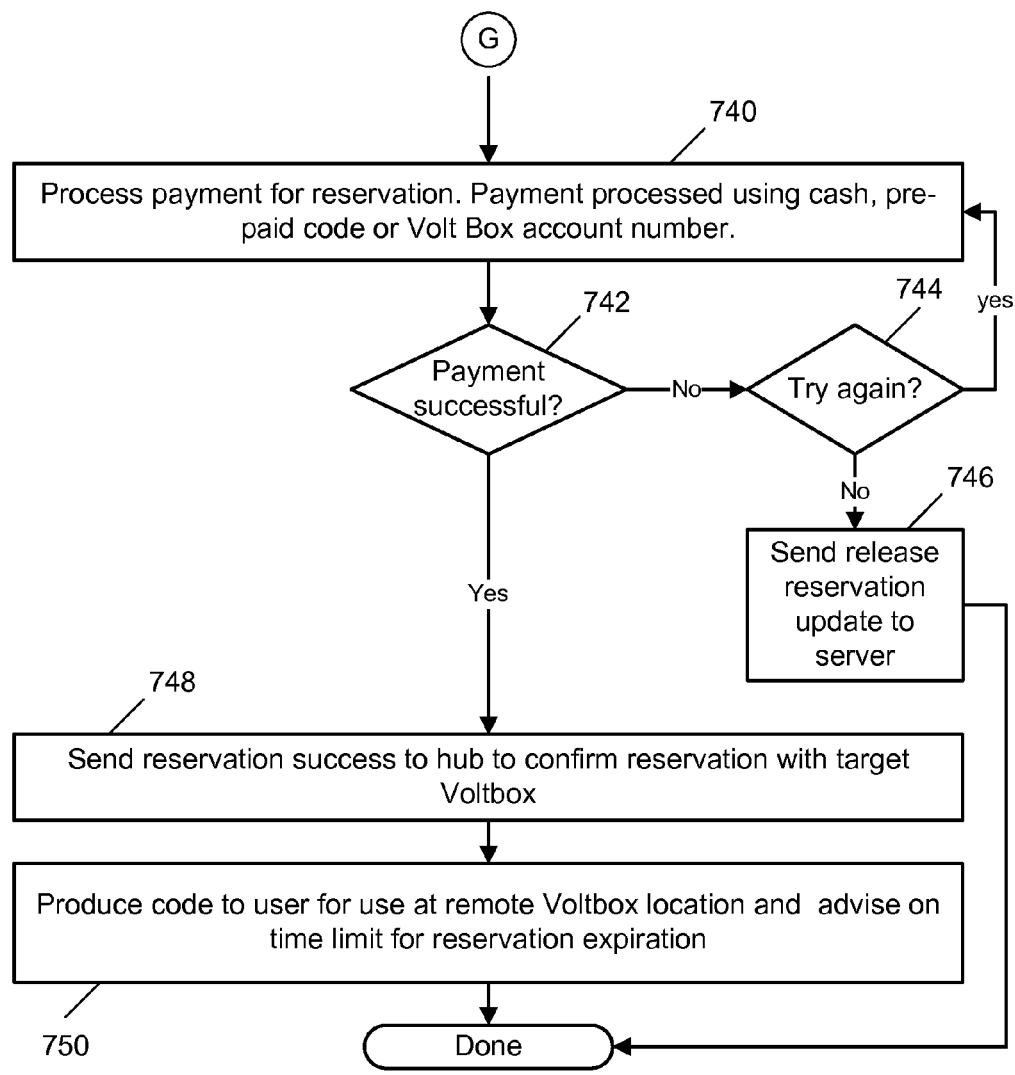
FIG. 29 illustrates one method of volt box-to-volt box reservation for the requested transaction in FIG. 27 with pre-payment and reservation completion through the central hub, in accordance with one embodiment of the present invention.

FIG. 27 illustrates a volt box use case in which a user requests to purchase volt bars with an un-even volt bar exchange, as well as logic for confirming validity of the request, exception handling, re-routing of the request and remote reservation for the request, in accordance with one embodiment of the present invention by flow 700 with continuation to F on FIG. 28 and continuation to G on FIG. 29. In this example of the embodiment, a user requests to exchange volt bars at a volt box where the amount of fully charged volt bars requested does not equal the amount of discharged or spent volt bars the user will deposit into the volt box in 702.

The user will enter the amount of volt bars he or she would like to purchase along with the amount of spent volt bars he or she will be depositing into the volt box and the system will determine, 704 if there are sufficient fully charged volt bars available to fill the user's request and if the volt box has the capability to capture the amount of spent volt bars the user wishes to deposit. If the volt box can fill the order for the user, a transaction price along with an escrow price will be calculated presented to the user.

The transaction price will be based on a successful transaction in which the user receives the amount of volt bars they require and deposit the amount of spent volt bars they indicated they wished to turn into the volt box. The volt box will determine if a penalty fee will be deducted from the escrow paid by the user in 710 or if a refund is required after the actual transaction takes place using the information gathered at this point. If the user does not accept the quote and pricing offered by the volt box, 714, the user proceeds to 712. If the volt box in 714 determines that the user has accepted the pricing presented in 710 (see, FIG. 28), the volt box will ask for payment in one of the available forms including but not limited to cash, NFC, credit, pre-paid volt box code or a volt box credit account number in 722. Alternatively, if the user is reserving/purchasing volt bars via application on a network connected device, payment will be taken over the network as well. The volt box will then determine in 724 if the payment was successful.

If the payment was not successful, the volt box or application on a network connected device will give the user the option to try to tender payment again in 726. If the user does not opt to try again the use case ends, and the volt box and network servers may be updated with transaction results data. If the payment is successful initially or after subsequent attempts in 724, then the volt box, volt box kiosk or application on a network connected device will make the number of fully charged volt bars available for removal of the volt box and designate their location in the volt box either visually and or audibly in 728. The user then performs the exchange in 730 where the user's spent volt bars are deposited into the same bays, available bays, slots or mechanism for depositing volt bars.

The volt box then communicates with the volt bars via RFID or other wired or wireless communication method to determine if the correct amounts of depleted volt bars have been deposited in 732. The volt box also gathers information regarding the state of each volt bar at the time of deposit. After the deposit has been completed, the volt box calculates if there is a refund or penalty is due to the user or if the transaction has been completed in 734. If the volt box determines that damaged volt bars have been detected, an exception code is sent to the server at the processing hub that tags the volt box for volt bar replacement service. The volt box communicates data to the server about the transaction including but not limited to where the volt bars were tendered, the charge cycles the volt bar has completed, the user(s) the volt bar has been used by and other identifying information for reporting metrics and data warehousing. The volt box then places the bay(s) containing the damaged volt bar(s) out of service as well as the volt bar(s) themselves by deactivating them. If no volt bars in 736 were determined to be damaged the use case ends after the server on the volt box network is updated with the transaction results.

If at 704 the volt box, volt box kiosk or application on a network connected device determines the requested volt bar/return volt bar combination is not available to fill the user's order, the volt box interface will suggest the user request the best available combination currently available at the volt box. 706. If the new quantity is accepted in 708 then the user continues to 710. If the user does not accept the new quantity combination for the transaction, the volt box will calculate and display using information from the volt box network which of the nearest volt box locations can fill the users requested volt bar exchange combination quantity. The volt box will use incentive, load balancing information from the server at the processing hub to display the user's options sorted by price, distance and or both in 712. The volt box in 716 will suggest the best value or incentives option for the user and allow the user to reserve the volt bars at the location described by the volt box in 716.

If the user does not reserve the volt bars suggested by the volt box the use case ends without further action, and the server may be updated. However, if the user does accept one of the qualifying volt box transaction sites, the volt box sends a request to the volt box reservation system to hold the volt bars requested at the volt box location indicated for the user while the user tenders payment in 720. (see FIG. 29) The volt box will ask for payment in one of the available forms including but not limited to cash, pre-paid volt box code or a volt box account number in 740. The volt box will then determine in 742 if the payment was successful. If the payment was not successful, the volt box or application on a network connected device will give the user the option to try again in 744. If the user does not opt to try again the volt box will notify the server at the processing hub to release the volt bars from reservation at the target volt box to make them available in the general pool of reservable/exchangeable/purchasable volt bars in 746. If the payment is successful initially or after subsequent attempts in 742, then the volt box, volt box kiosk or application on a network connected device where the payment transaction in was completed will send a confirmation to the target volt box through the volt box network to retain the requested amount of volt bars for at least a pre determined number of minutes or hours in 748. The volt box will also produce a code for the user to take to the target volt box to redeem the pre purchased volt bar transaction.

In one embodiment, the volt box network may update the user's account with reservation data accessible through any network connected device to view metrics and data related to all interactions the user has with the volt box network. When the user arrives at the target volt box holding reservation data for the user's transaction, the user will enter the code to redeem his or her transaction. The volt box will compare the code to code data on the server through the network to determine the validity and dispense as needed in 750. If the user does not perform the transaction at the target volt box within the allotted time, the volt bars will be released into the available pool and the user will be credited. After the user performs his or her transaction the use case ends without further action, and the servers may be updated.

FIG. 28 illustrates one method of purchase and volt bar dispensing as requested in FIG. 27, communication of volt bar with volt box and damage detection with transaction results transmitted to the central hub, in accordance with one embodiment of the present invention.

Figure 30:
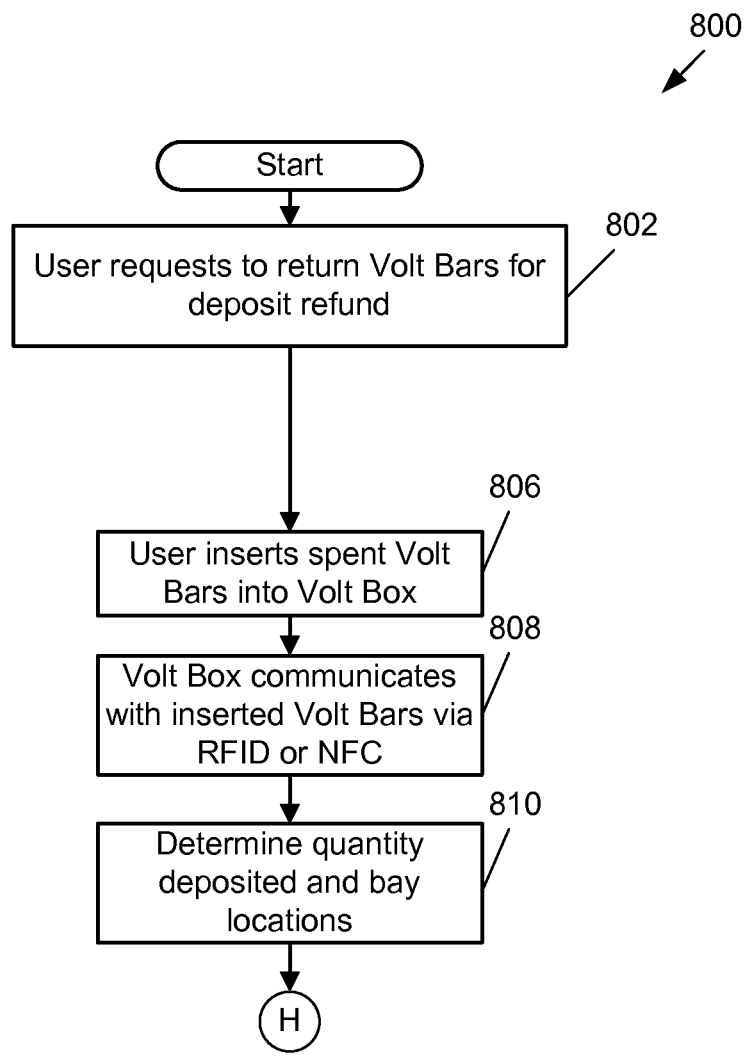
FIG. 30 illustrates a volt box use case in which a user requests to return volt bars for deposit refund, as well as logic for confirming validity of the request, exception handling, in accordance with one embodiment of the present invention.
Figure 31:
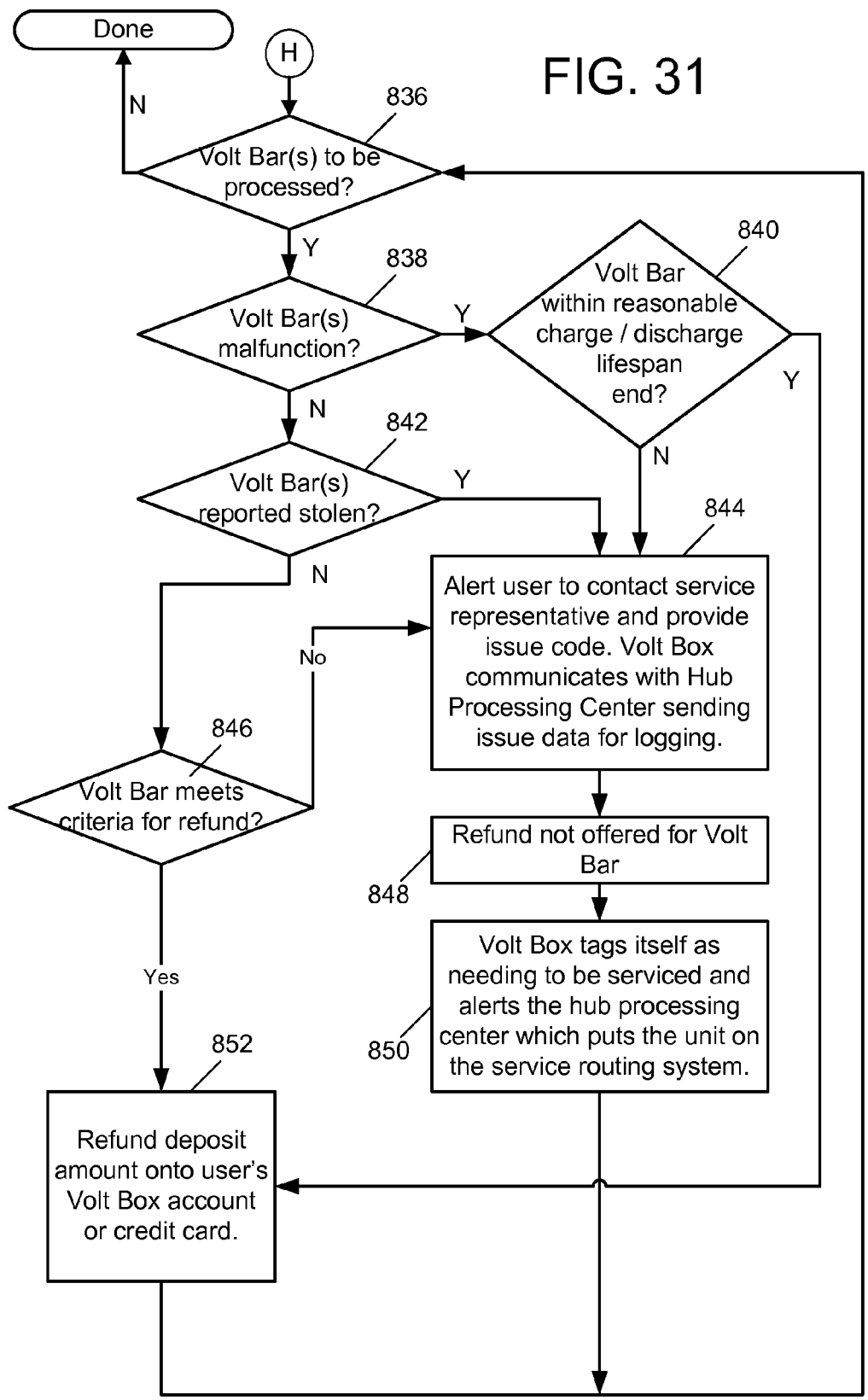
FIG. 31 illustrates one method of volt bar return where the volt box used for return validates the number of volt bars requested to be returned, the condition of each volt bar tendered, validity of volt bar ownership as well as the calculation of refund, deposit of refund and service requests along with transaction results transmitted to the central hub, in accordance with one embodiment of the present invention.

FIG. 29 illustrates one method of volt box-to-volt box reservation for the requested transaction in FIG. 27 with pre-payment and reservation completion through the central hub, in accordance with one embodiment of the present invention FIG. 30 illustrates a volt box use case in which a user requests to return volt bars for deposit refund, as well as logic for confirming validity of the request, exception handling, re-routing of the request and remote reservation for the request, in accordance with one embodiment of the present invention by flow 800 with continuation to H on FIG. 31. In this example, a user requests to return volt bars to a volt box in varying stages of charge for a refund. The return of the volt bar to a volt box may be triggered by a variety of reasons in 802 including but not limited to, exchange for a fully charge volt bar, return for a refund, defective volt bar return, transaction where the user wishes to purchase a certain amount of volt bars and return an certain amount of volt bars where the amounts do not necessarily require to match.

The user deposits volt bars they have previously purchased at a volt box in 806 at which point the volt box communicates with the volt bars that were tendered in 808. The volt bar deposit aggregate information is collected in 810 including the amount of volt bars deposited among other metrics. The volt box system then cycles through 1–n volt bars deposited processing each one individually in 836 while the number of volt bars left to process is greater than 0. For each volt bar in 838 the volt box will determine if the volt bar tendered is operational or if it is malfunctioning form. If the volt bar is malfunctioning, the volt box uses additional data collected from the volt bar and the volt box network in 840 to determine if the volt bar is within a reasonable charge/discharge life span. If the volt bar is determined to be reasonably malfunctioning, the user is refunded their escrow previously paid to remove the at one point fully charged volt bar from a volt box.

If the volt bar is malfunctioning and is not reasonably at the end of its life, the user is altered and to volt box network server is updated with the issue data and logging information in 844 for the user to follow up to determine why the volt box did not provide a refund in 848. The volt box then tags itself using the volt box network for service and alerts the hub processing center to add the volt box to the service routing system in 850. If the volt bar in 838 was not malfunctioning at the time of deposit, the system will determine if the volt bar has been reported stolen in 842. If the volt bar is determined to be stolen using information gathered from the volt bar in conjunction with information gathered from the server at the hub processing center using the volt box network, then the user proceeds to 844.

However, if at 842 the volt bar is determined to not be stolen, the volt box in 846 will confirm that the volt bar meets the criteria for escrow refund. If the volt bar does not meet the refund criteria, the user proceeds to 844. However, if the volt bar passes all tests and is determined in 846 to qualify for a refund in 846, a refund is provided for the user by adding it to his or her volt box credit account, credit card or voucher in 852.

FIG. 31 illustrates one method of volt bar return where the volt box used for return validates the number of volt bars requested to be returned, the condition of each volt bar tendered, validity of volt bar ownership as well as the calculation of refund, deposit of refund and service requests along with transaction results transmitted to the central hub, in accordance with one embodiment of the present invention.

Figure 32:
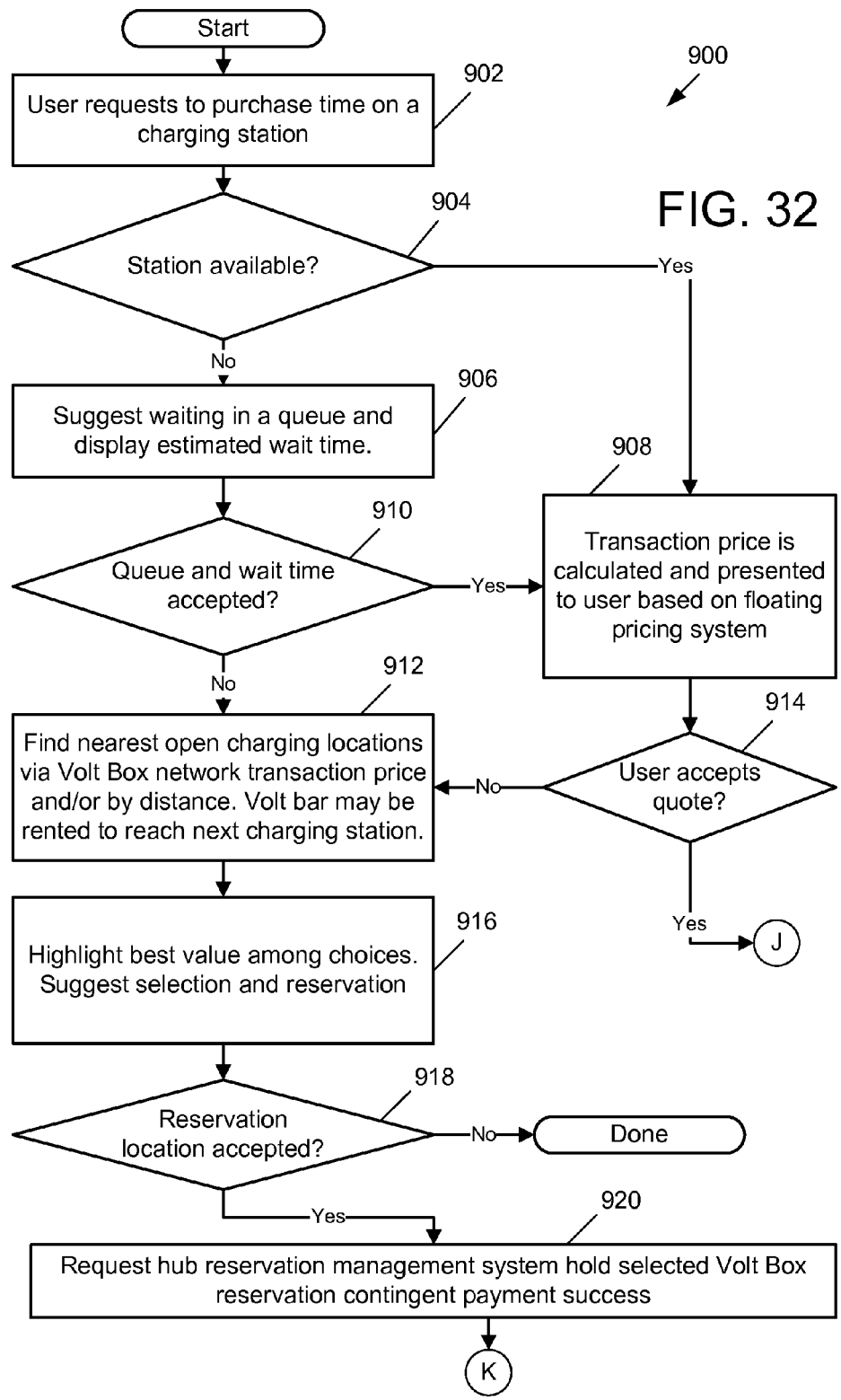
FIG. 32 illustrates a volt box use case in which a user requests to purchase charging time at a volt box location, as well as logic for confirming validity of the request, exception handling, re-routing of the request and remote reservation for the request, in accordance with one embodiment of the present invention.
Figure 33:
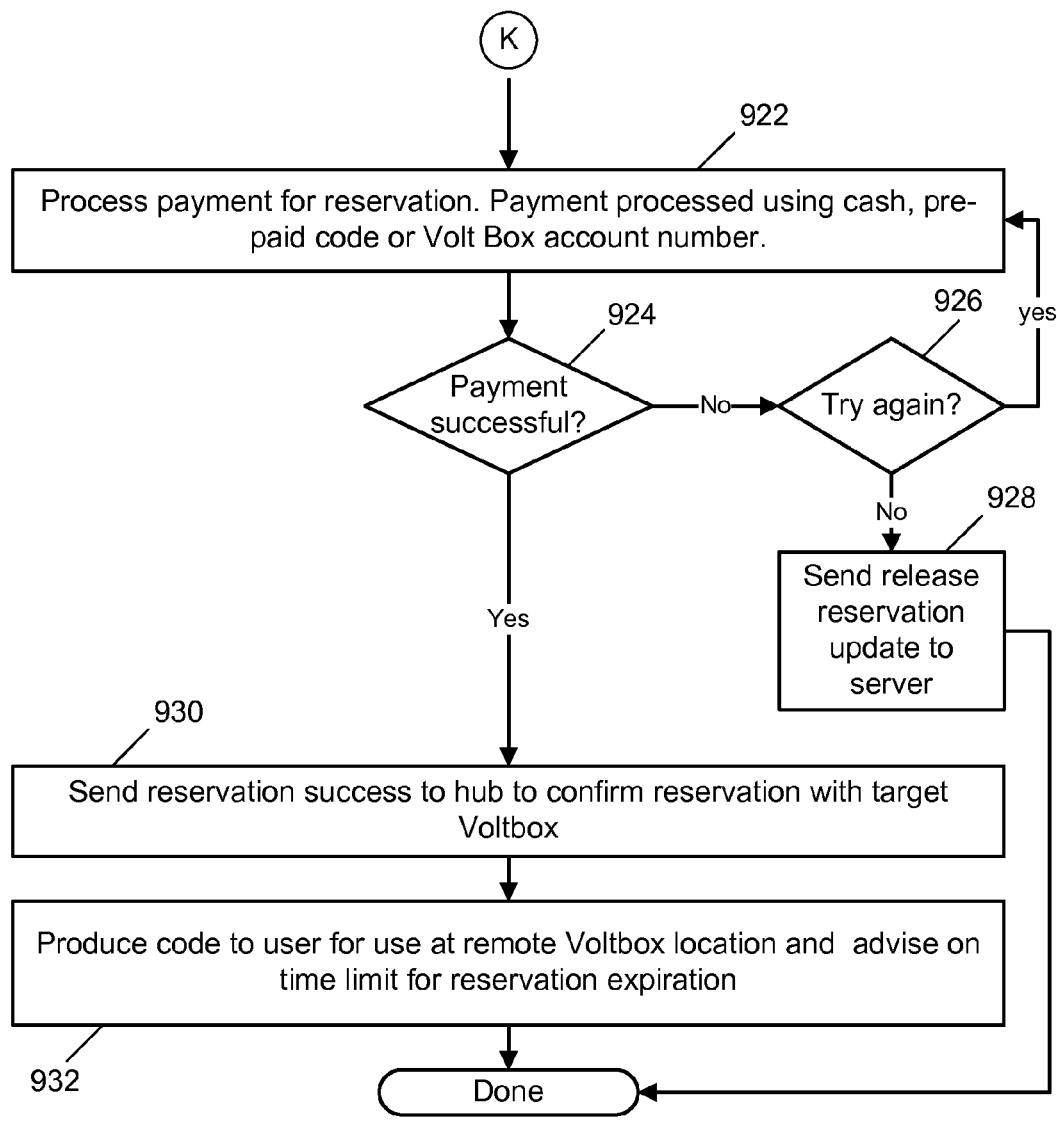
FIG. 33 illustrates one method of volt box-to-volt box reservation for the requested transaction in FIG. 32 with pre-payment and reservation completion through the central hub, in accordance with one embodiment of the present invention.
Figure 34:
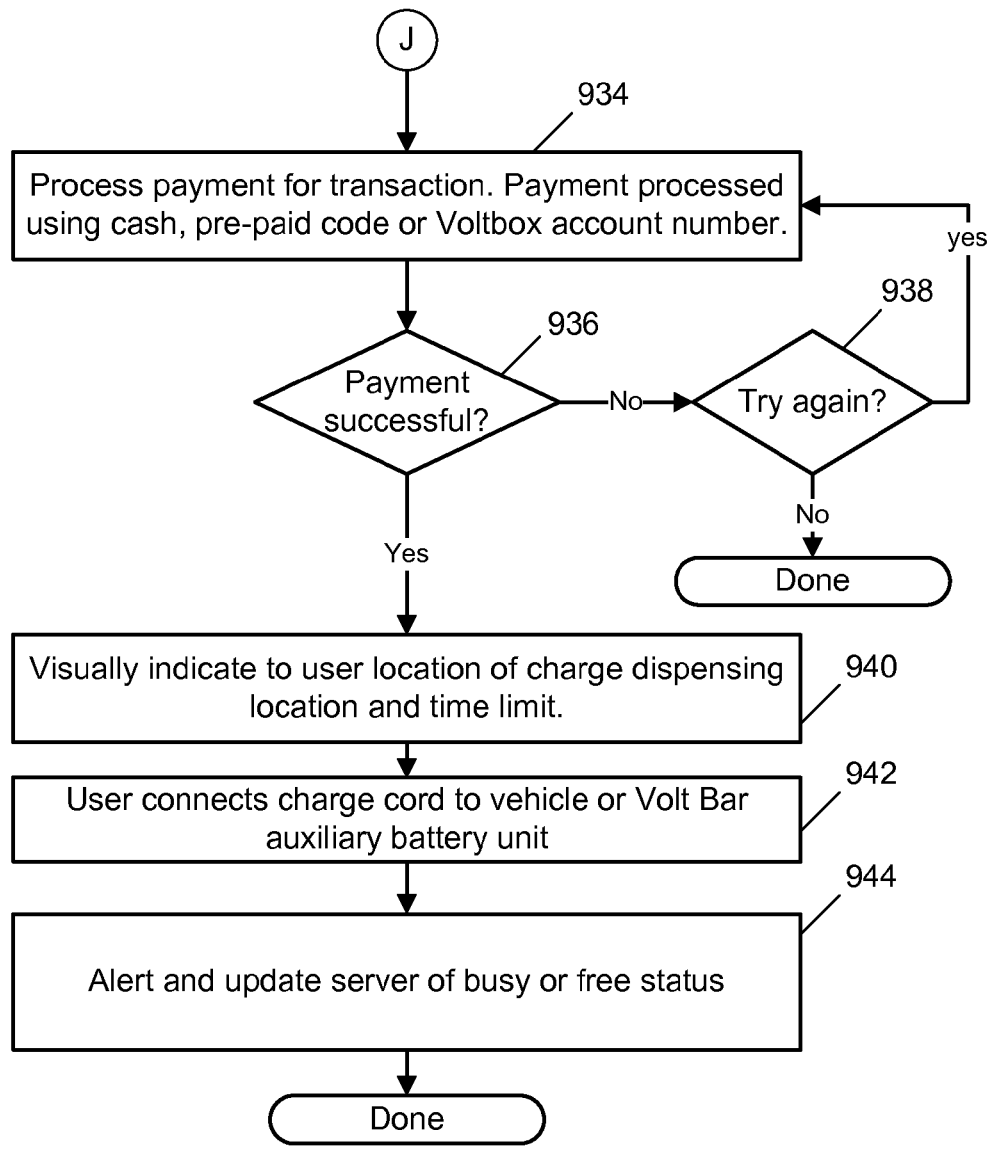
FIG. 34 illustrates one method of volt box location charge time purchase, visual user cues and central hub update procedure, in accordance with one embodiment of the present invention.

FIG. 32 illustrates a volt box use case in which a user requests to purchase charging time at a volt box location, as well as logic for confirming validity of the request, exception handling, re-routing of the request and remote reservation for the request, in accordance with one embodiment of the present invention by flow 900 with continuation to J on FIG. 34 and continuation to K on FIG. 33. In this example of the embodiment, a user requests to purchase charging time at a volt box charging station where one or more charging stations are present at a given location in 902 through a central kiosk transaction and payment system.

If the kiosk determines that at least one of the charging stations at the particular site is available in 904, a transaction price determined and displayed in a form including but not limited to price per time unit, price per volt, price per watt or price per amp of charging will be calculated and displayed to the user based on a floating pricing system using an incentive based load balancing algorithm on the volt box network server in 908. If the user does not accept the quote and pricing offered by the volt box, 908, the user proceeds to 912. If the volt box in 914 determines that the user has accepted the pricing presented in 908, (see FIG. 34) the volt box will ask for payment for either a specific amount of time or units the user has requested or pre-qualifies the user using a credit card for a maximum transaction and waits to determine final time or units actually consumed to charge the users account. Alternatively, the user may simply pay cash and the charge purchased with the amount of cash will dispense until the units or time has elapsed.

The volt box charging station kiosk will allow payment in one of the available forms including but not limited to cash, NFC, credit, pre-paid volt box code or a volt box credit account number in 934. Alternatively, if the user is reserving/purchasing charging units via application on a network connected device, payment will be taken over the network as well. The volt box will then determine in 936 if the payment was successful. If the payment was not successful, the volt box or application on a network connected device will give the user the option to try to tender payment again in 938. If the user does not opt to try again the use case ends, and the volt box and network servers may be updated with transaction results data. If the payment is successful initially or after subsequent attempts in 936, then the volt box, volt box kiosk or application on a network connected device will make the charging station available for use and designate their location in the volt box charging station either visually and or audibly in 940.

The user then performs the connection 942 between the charging station via charging cord to a volt bar auxiliary battery unit or directly to the vehicle's main battery. While charging is progressing in 944, the volt box charging station communicates the current status of the charging station to the server on the volt box network to communicate metrics including but not limited to busy status, free status, estimated wait time and efficiency among other identifying and measurable data and again at the conclusion of the transaction. If at 904 the volt box, volt box kiosk or application on a network connected device determines there are no charging stations available, the volt box interface will suggest the user enter a queue and display an estimated wait time in 906. If the user accepts entering a queue in 910, the user proceeds to 908. If the user does not accept to enter a queue and agree to the estimated wait time, the volt box interface will calculate and display using information from the volt box network which of the nearest volt box locations can fill the users requested charging requirements and provide the option to rent a volt bar to reach the location, the volt bar rental quantity determined by the distance to the target charging station in 912.

The volt box interface will also use incentive, load balancing information from the server at the processing hub to display the user's options sorted by price, distance and or both in 912. The volt box interface in 916 will suggest the best value or incentives option for the user and allow the user to reserve the charging time/units and or volt bars at the location described by the volt box interface in 916. If the user does not reserve the volt bars suggested by the volt box the use case ends without further action, and the server may be updated. However, if the user does accept one of the qualifying volt box transaction sites, the volt box sends a request to the volt box reservation system to hold the volt bars and or charging station requested at the volt box location indicated for the user while the user tenders payment in 920 (see FIG. 33).

The volt box interface will ask for payment in one of the available forms including but not limited to cash, pre-paid volt box code or a volt box account number in 920. The volt box interface will then determine in 924 if the payment was successful. If the payment was not successful, the volt box or application on a network connected device will give the user the option to try again in 926. If the user does not opt to try again the volt box, volt box kiosk or application on a network connected device will notify the server at the processing hub to release the charging station and or volt bars from reservation at the target volt box to make them available in the general pool of reservable/exchangeable/purchasable volt bars in 928.

If the payment is successful initially or after subsequent attempts in 924, then the volt box, volt box kiosk or application on a network connected device where the payment transaction in was completed will send a confirmation to the target volt box through the volt box network to retain the requested amount of volt bars and or charging station for at least a pre determined number of minutes or hours in 930. The volt box will also produce a code for the user to take to the target volt box to redeem the pre purchased volt bar transaction. In one embodiment, the volt box network may update the user's account with reservation data accessible through any network connected device to view metrics and data related to all interactions the user has with the volt box network.

When the user arrives at the target volt box holding reservation data for the user's transaction, the user will enter the code to redeem his or her transaction. The volt box will compare the code to code data on the server through the network to determine the validity and dispense as needed in 932. If the user does not perform the transaction at the target volt box within the allotted time, the volt bars and or charging station will be released into the available pool and the user will be credited. After the user performs his or her transaction the use case ends without further action.

FIG. 33 illustrates one method of volt box-to-volt box reservation for the requested transaction in FIG. 32 with pre-payment and reservation completion through the central hub, in accordance with one embodiment of the present invention.

FIG. 34 illustrates one method of volt box location charge time purchase, visual user cues and central hub update procedure, in accordance with one embodiment of the present invention.

Figure 35:
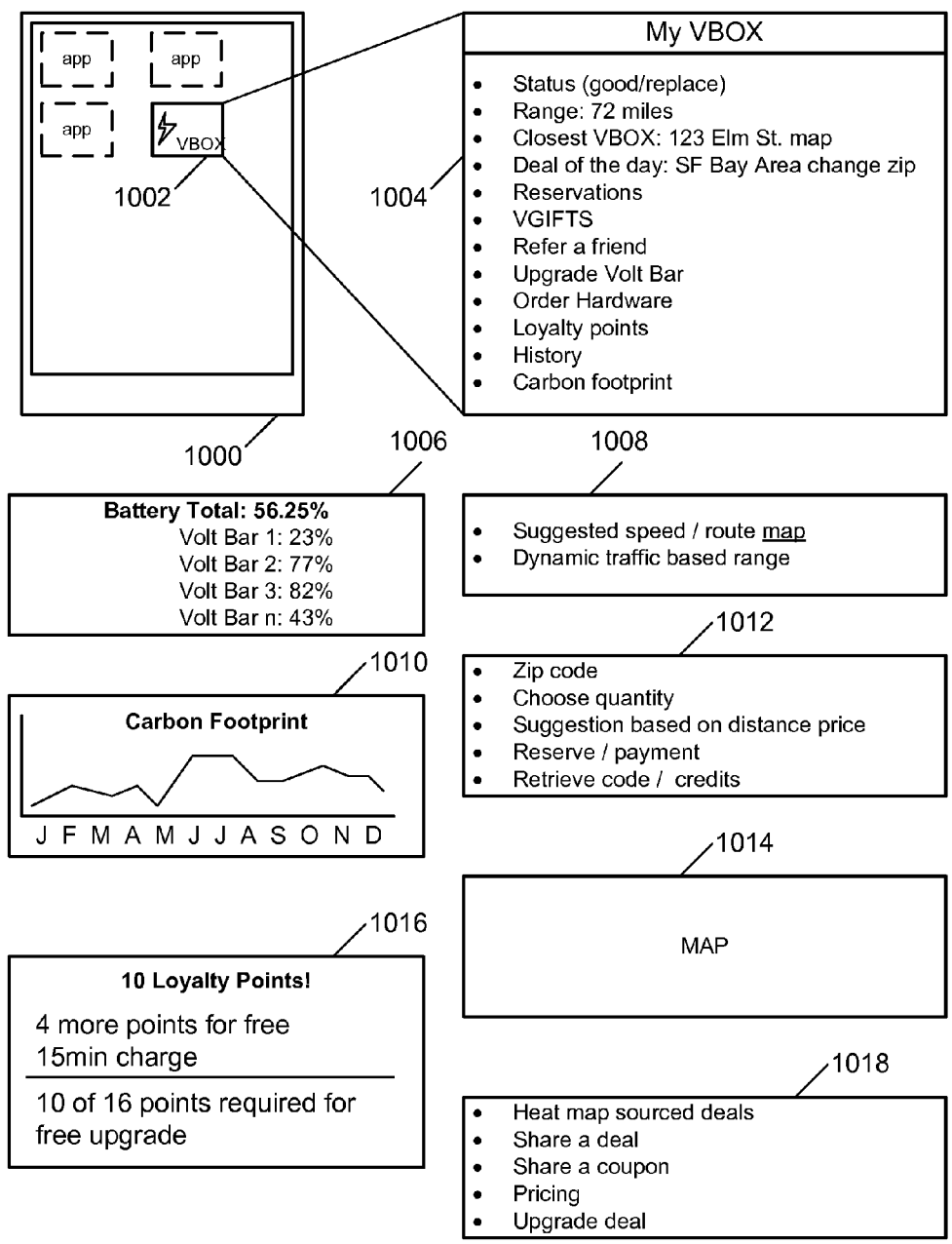
FIG. 35 illustrates and example instance of a computer or mobile application used for two way communication, administration, metric analysis, commerce gateway, loyalty reward status and administration among other customizable functionality working in conjunction with the volt box network and central hub as viewed by the user and dependent on details of the user's account, in accordance with one embodiment of the present invention.

FIG. 35 illustrates and example instance of a computer, mobile application or network connected device used for two way communication, administration, metric analysis, commerce gateway, loyalty reward status and administration among other customizable functionality working in conjunction with the volt box network and central hub as viewed by the user and dependent on details of the user's account, in accordance with one embodiment of the present invention.

This example illustrates a smart phone or network connected device operating system 1000 having a plurality of applications. One application could be a volt box application 1002. When the user selects to run the volt box, the volt box application can produce a number of screens. For example my volt box screen can include general information 1004 regarding the status of a user's current volt bars, the range provided by my volt bars, the closest volt box to my current location, the deals of the day a particular ZIP code or region, any reservations I wish to make, the gifts they can be made to friends, referrals to and for friends to purchase volt bars, upgrades to volt bar infrastructure, hardware configuration upgrades or replacements, loyalty points, history information of my purchases, and the carbon footprint produced by the utilization of my volt bars.

Other information screens can also provide the total battery capability of each particular volt bar in a user's auxiliary battery carrier or slots on my vehicle 1006. Additional information can also include a carbon footprint graph 1010 showing the utilization of the user's volt bars, and the efficient utilization and purchasing of volt bars without requiring inefficient retrieval of volt bars. For example, if users obtain volt bars from locations that are near their current location or need, users reduce the amount of travel time to simply secure volt bars.

This reduction in travel time will cut down the carbon footprint produced by the simple act of obtaining the volt bars. Mapping functions can also be used. Maps 1014 can also be overlaid with social networking data, to provide additional real-time information about charge locations, deals, coupons, pricing, and liked kiosk locations. Newsfeed data can also be accessed from various networks to provide rich data back to the user's application. The application can be run on any smart device, and the device can have access to cloud processing for immediate data interfacing and/or local storage. Data can also be gathered from other internet sources, such as Wikipedias, Internet search sites etc., and data can be processed, compiled and presented back to the user's mobile device, vehicle display, etc. The application would also allow the user to remotely find, reserve and make purchases for a target volt box, any number of volt bars or charging time/units based on distance, price, zip code etc. in 1012.

Further information can also include loyalty points 1016 for purchases at various kiosk locations, and show bonuses provided to users that frequently utilize the volt bars. Additional dynamic information 1008 can be provided through the applications such as suggested travel speeds to conserve energy, maps for routing, better dynamic traffic information based on real-time information, and other settings. The user can also access heat map sourced deals 1018 to show where the network has decided that volt bars are accumulating and special discounts are being provided, coupon sharing, pricing, upgrade deals, and access to social networks to communicate deals to friends.

The deals to friends can be provided by way of a map that identifies the location of your friends and the possibility of giving your friend special points or the receipt of loyalty points for referring friends to specific kiosk locations. Additionally, ride sharing programs can also identify locations where people can be picked up if users desire to travel to the same location or same general area. All of these features can be integrated into the mobile app and internet website portals.

By providing this dynamic status information to users, users are better able to identify kiosk locations to obtain volt bars, and charge, as users traverse distances utilizing their electric vehicles. Range anxiety will thus be all but eliminated. Informed users and the ability to access charge when needed, solves these problems.

Figure 37A:
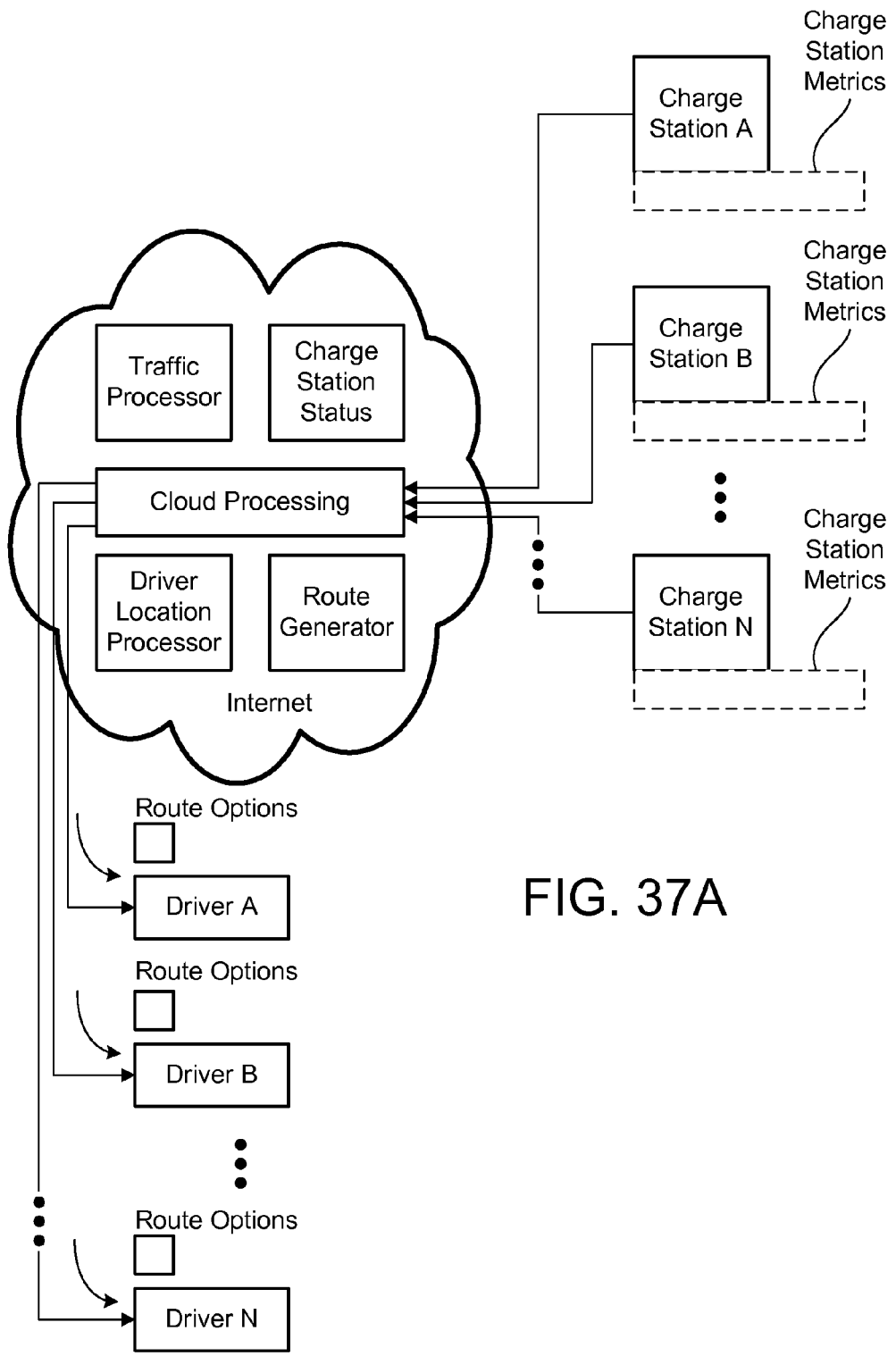
Figure 38:
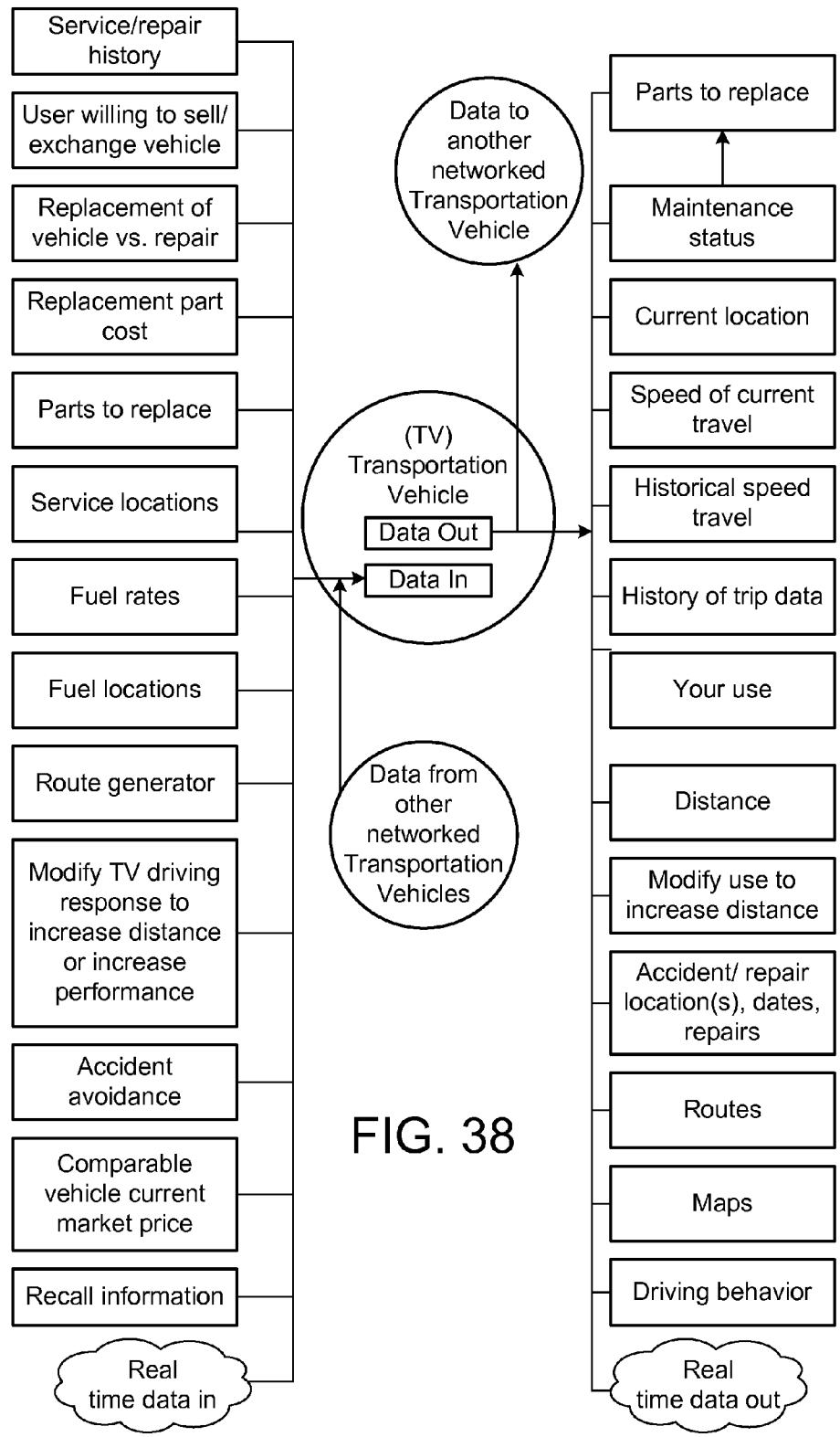
FIG. 38 illustrates an example system that monitors systems and data associated with a vehicle, and methods and systems for processing such information to provide live interactive data for informed decision making, in accordance with one embodiment of the present invention. In one embodiment, the system of FIG. 38 can rich data, including data from systems that collect operational information. Such operational information is sometimes referred to as a vehicles "black box." Thus, the data is not limited to black box data, but also data obtained from the Internet, data input by the user and data collected from car manufacturers and social networks.

FIGS. 36-38 illustrate examples of an auxiliary battery being inserted into a compartment of a vehicle, in accordance with one embodiment of the present invention. In this illustration, the auxiliary battery can be installed into a trunk space of a vehicle, and the trunk space can have a compartment in the floor of the trunk. The top surface of the auxiliary battery can provide the surface of the trunk, instead of the previously defined surface. In one embodiment, auxiliary battery is a single unit that is installed into a compartment.

In other embodiments, the auxiliary battery can be one compartment that has multiple smaller compartments for receiving volt bars (charging units), or other battery type charging devices. Further, the auxiliary battery is shown interconnected to the main battery of the vehicle, or to a battery distribution or charge distribution handling unit. In other embodiments, the auxiliary battery can be inserted into side panels of the vehicle, in the front compartment of the vehicle, the floorboard of the vehicle, the site support structure of the vehicle, etc.

FIG. 37A illustrates an example of cloud processing technology, which provides processing resources to connected vehicles through a distributed network. In one embodiment, the cloud processing can communicate with various charging stations using Internet connections, where charge Station metrics can be uploaded to the cloud processing system. The charge Station metrics can include availability of charge pumps, charge handles, charge plugs, charge mats (for wireless charging), volt bars, or other charge providing facilities.

Examples of such metrics can include the number of charge pumps available at particular period of time, historical availability times of the charge pumps, typical charge time estimates at particular charging stations, prices associated with the charge at the particular charging stations, feedback from customers through social networks, concerning the charging stations, and the like. The cloud processing can then process the charge Station status, traffic information associated with locations around or between charging stations and a user's current location, and provide specific suggested routes. The route generator can provide guided routes to the various charging stations (e.g., charge locations), based on the users immediate needs, desire for discounts, sponsored rewards, or the amount of time it will take to obtain access to a charge pump at a particular point in time. Broadly speaking, a discount is a reward and a reward is a discount, and a sponsored reward is a discount that is at least partially paid by another party for a the benefit of the recipient of the reward.

The driver location processor can communicate the information concerning drivers to the cloud processing logic, so as to provide the most effective information concerning charge availability to the various drivers. As illustrated in FIG. 37A, various drivers that communicate with the cloud processing unit can (e.g., over the internet wirelessly) be provided with specific routes or route options. For example, users in their particular vehicles may have a connected display or a portable device having access to the Internet. Based on the users location and charging needs, (and optionally the destination) the user can be provided with route options (e.g., one or more optional paths). The route options can be, for example, the fastest and most available charge Station (or charge providing devices) to the users current location, the cheapest charge available at a particular point in time, or information regarding charge prices for a particular future point in time.

Once the user selects a route option, the route generator can provide information concerning the charging station, and can also prepay or book a charging station slot. A charging station slot can include, for example a parking spot in front of a charging station. The charging station slot can be reserved if the user decides the prepay for the charging station, as a convenience. For example, if charging slots at a particular charge Station appear to be heavily used, a user can pre-reserve a charging slots ahead of time, so that when the user arrives at the charging station, the charging slot will be immediately available. This could be considered a convenience fee associated with pre-reserving of a charging slot, along a particular route. In another embodiment, the charging station can provide incentives to users to come to the particular charging station.

For example, if the user prepays for charge at a particular charging station, the charging station can provide a discount on the charge provided. For example, if the charging station wishes to fill a plurality a charging slots during a particular slow time, the charging station can communicate with the cloud processing and publish availability of its charging stations per particular period of time. A database associated with cloud processing will hold this information so it can be dynamically updated and accessed in real-time by users to fill their charging needs of their electric vehicles. During that particular period of time, the charging station can offer discounts or rewards to users so that drivers can decide to visit the charging station instead of another charging station. Still further, charging stations can offer discounts for users to use the particular charging station, and the discounts can be offered by more than one party or entity. For instance, if the charging stations are located near a particular business, that particular business can sponsor discounts or rewards at the charging station to drive traffic to or near that particular business. When users are charging their vehicles at the particular station near the particular business, users can spend their time at the particular business while there vehicle is being charged.

Potentially, the owners of the particular business that sponsored the discounts can increase traffic to their business and increase sales. In another embodiment, the owners of the particular business can offer discounts to their business products or services, if the business products or services or located near or beside the charging station. As will be described below, other embodiments can include having charging station pumps or handles or plugs, located in nontraditional charging station configurations. For example, charging plugs can be installed at various nontraditional locations, such as parking lots of retail stores. Other examples locations can include, without limitation, parks, city streets, parking garages, post offices, government areas, schools, office complexes or campuses, coffee shops, malls, strip malls, box store parking lots, beach parking, homes, public roads, etc. If a large retail store has a large parking lot, a portion of that parking lot can be dedicated for charging plugs, which can be used by customers while the customers shop at the retail location. In such a situation, the owners of the retail store that have charging plugs assigned to particular parking spots, can publish availability of those charging plugs through the cloud processing network.

The cloud processing network can then publish availability and prices for users that may be driving around, or may be passing by the retail store along a particular path or route. In some embodiments, the retail store can offer significant discounts for charge, if users charge their vehicles at the charging plugs of the retail store. While the users charge their vehicles, the users may visit the retail store and purchase goods or services, which is a reward for the retailer that is offering the discount for the charge. In still another embodiment, retail stores having charge plugs can advertise availability of the charge plugs (and parking spots) in real time, and provide discounts or deals to users that may wish to charge at the particular retail location.

The discounts can be for the goods and services of the retail store, or simple discounts on the charge provided by the charge plugs of the retail store. As noted above, one embodiment would allow the parking spots having the charge plugs to be reserved and advance, to provide additional convenience to users. In such a configuration, the parking spots can include mechanical barriers that lift and close to allow vehicles to come into and leave the particular parking spots. Thus if a parking spot is reserved, the mechanical barrier can remain closed until the vehicle having the code can communicate access to lift the mechanical barrier so that charging can commence immediately upon arriving at the reserved parking spot. In another embodiment, the charging station or plug can include a monitor or display that indicates whether or not the charging plug is reserved.

If the charging plug is reserved, no other user can park in front of the parking spot, or else will receive a ticket or fine for parking in a parking spot that's been reserved. The parking spot reservation for charge can be made in advance, such as while user is driving around looking for charge and the reservation is made by smart phone, or an integrated device of the vehicle that has access to the Internet. The transaction can also allow a user that is searching for charge to prepay for the charge using a graphical user interface or other exchange mechanism, associated with the route and reservation of a particular charge station or slot. In some embodiments, the charge stations or plugs can be placed in shared parking lots or locations where multiple retail outlets reside.

In such a case, multiple retailers can provide discounts to users to come and use the charging stations located at the retailers locations. These discounts can then be published to the cloud processing logic. These discounts can also be published dynamically at the request of the provider of the charge, using an Internet portal, that allows the user to participate in a network of charge stations that provide discounts. In such embodiments, the discounts can be provided by multiple retailers for their goods and services, and the plug can be located in the shared parking lot. Having this information, the cloud processing can communicate with a route generator to generate various routes (e.g., paths) that are optimized to the user's desired outcome.

The optimization can be to route a user for charge along a plurality of charge stations or plugs that provide discounts. If this is the goal of the user, the route may be longer than other routes, but the discounts may be greater. Such routes may be viewed as a sponsored path, that requires a user to traverse a particular route in order to obtain charge for their vehicle. The sponsored routes can change dynamically over time, as sponsors decide to add or remove discounts. Thus, a user that finds a good path may wish to buy now, to avoid losing the discount. If a particular charge station or chart plug has a lot of customers during a particular period to time, the discounts may drop dynamically. If the charge plug for station experiences low activity, the discounts may be increased dynamically. The dynamic adjustment of discounts can occur based on a preset number of rules (e.g., what discount, where offered, when offered, how long it lasts, incentives for fast buy, logic for combining discounts, logic for sharing costs of discounts with others, logic for reducing the cost of the charge, etc.), as set by the provider the charge and/or the sponsor.

FIG. 37B illustrates an example of a charge station and its metrics, in accordance with one embodiment of the present invention. In this example, the charge station has 10 plugs and 6 plugs are in use at a particular period of time. The charge station can also have historical data that can provide estimates of when charge plugs would be available. Additionally, the charge station metrics can also provide charge cost estimates, which can be adjusted dynamically over time.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug.

In some embodiments, the price of the charge may be more expensive if the green rating is very high, but the charge value to the user may be high, if the user wishes to obtain a very high green rating, and a lower carbon footprint.

FIG. 37C illustrates an example of route options for driver A, as shown in FIG. 30A, in accordance with one embodiment of the present invention. In this example, a display screen can be provided in the vehicle which would allow the user to be informed of where charge is available now for a certain price. The user can select to get a map route, get information regarding distance, get information regarding discounts, reserved charge plugs are stations, cancel request, or show lower rate charge options and distances associated with obtaining the lower cost charge.

This is only one example of the various options provided to the user through a graphical user interface. As noted above, the graphical user interface can be integrated with the vehicle, or can be part of a smart device that communicates with the vehicle. The smart device that communicates with the vehicle can communicate using wireless technology so that metrics associate with the vehicle and location of the vehicle can be obtained and then communicated to the cloud processing to exchange information.

FIG. 38 illustrates one example of metrics data that can be obtained by a transportation vehicle (TV), and communication to and from other networked TVs, in accordance with one embodiment of the present invention. In this example, information can be obtained from a particular vehicle, such as service and repair history, whether user is willing to sell or exchange the vehicle, the replacement cost of the vehicle versus repairing the vehicle, the replacement part cost of a vehicle, parts to replace for vehicle (as known from historical data of the same vehicle, or based on a current malfunction), the fuel rates, fuel locations for charge, route generators, modification suggestions for driving to increase performance, accident avoidance data, comparable vehicle current market price, recall information for the current vehicle, etc.

This information can be obtained from the vehicle or from the users of the vehicle. This information can also be obtained by the cloud processing which communicate with other systems connected to the Internet. Other systems can be data stores for information concerning the same vehicle, historical data concerning potential breakdown of the vehicle, price estimates of the vehicle, marketplace data concerning exchange the vehicle, etc. This information can be provided at the vehicle to the user through a computer user interface. On demand, the user can determine whether it's worthwhile to exchange the vehicle for another vehicle, and the potential of the current vehicle to break down.

Furthermore, the user may decide that it's time to exchange the vehicle for new vehicle, and market rates for the current vehicle based on actual vehicle data of the user's vehicle, can be used to identify its current market price. The current market price for replacement vehicle can also be obtained dynamically, and comparable data can be presented to the user in the user interface. Accordingly, the user would not have to input information concerning its vehicle into the user interface simply to figure out what the market price is. The data concerning the vehicle is inherently collected and stored in the vehicle memory based on vehicle use, age, accidents, condition, etc. Additionally, information concerning available vehicles near the user which may be for sale can also be attained dynamically and in real time.

For example if the user wishes to replace the vehicle, the user can simply click a button, select an icon, touch a screen, speak a command, gesture an input, etc., to figure out what his vehicle value is, the cost of a replacement vehicle, and the total cost after exchange. This information can be useful to the user in deciding whether or not to trade in the vehicle or remain with the current vehicle and make investments in repairs. As shown, the data exchange between vehicles and the vehicles and the cloud processing can be extensive, but such information can be made available to drivers of those vehicles to make informed decisions.

FIG. 39 illustrates an example of various paths that a driver can make between point A and point B. For example, point A can be the current location of a vehicle, and point B can be the destination that the vehicle user wishes to traverse. If the user needs to travel to point B from point A, the system in the vehicle, as connected to the cloud processing, can determine various paths to take between A and B. In one embodiment, the user wishes to traversed directly to point B, and does not wish to receive any sponsor discount along the path.

This path would then generate a recommendation to the user to charge the vehicle at charging station C1. In another embodiment, the user may wish to traverse the path between A and B, but receive some sponsored assistance in the charge or discount on a good or service. In this example, the system can generate a path between A and B, where the user may stop and charge at charging station C2 (or plug location). In this embodiment, the system will calculate that the user can traverse from point A to C2 with the current charge availability in the vehicle, and then arrive at point B. In another embodiment, the user may wish to select a different path 2, which is also a sponsored path that takes the user to charging stations or plugs C3 and C4, before reaching point B.

In this example, the user may have received additional discounts from the providers of the charge at C3 and C4, or from a sponsor that sponsored a discount at the charging stations or plugs C3 and C4. In this example, a retail outlet that sits proximate to the charging station or charging plugs can provide a discount to the users to charge their vehicles at C3 and C4, or they can provide a discount at the retail outlet, which would be proximate to the location of C3 and C4. The discount provided by the various retailers that sponsored the charging stations can be dynamically posted, so that drivers can obtain current and real-time discounts as they drive around and look for charge.

The drivers can also be provided with information of the duration of the discount, so that drivers can obtain the discount if they have the time to traverse the path, or avoid the path if the discount will not be present when the driver arrives at that application. In another embodiment, the logic in the vehicle or the processing system in the cloud processing can determine whether or not the user would be able to arrive at each of the charging stations or plugs to receive the sponsor discounts. This analysis can include, for example, reviewing traffic patterns, travel speeds and estimates to traversed the different distances, time of day, etc.

In another embodiment, the user may select to traverse path 3, which takes the user to charge provider C5 and C6 before progressing on path B. In this illustration, it is shown that the user must go off path to travel to charge C6. However, it may be more beneficial for the user to travel to charge C6, as that location is offering a larger discount. In some embodiments, even though the user travels off path, the discounts offset the cost of going off path. In some embodiments, going off path can actually be faster if the particular charge stations or pumps or plugs are more available and there is less wait. In still another embodiment, the user may not actually have a path in mind, and the user may select to simply obtain charge and would be provided with path 4.

In this example, the users looking to charge the vehicle along a path that is sponsored. A currently sponsored path may be to charge C7. The user can be provided with an option of charge discounts, which can include discounting the cost of the charge itself, or discounts to retail or service providers that are proximate to the charge outlet. In such an embodiment, the data can be provided to the display of the user's car or vehicle, or can be provided to the user's device. For example, if the user wishes to obtain charge, and the user is currently sitting in his or her office, (and the car is in the parking lot) the user can select it obtain a sponsored path to obtain charge. That sponsored path can identify the closest station, or a number of stations or plugs their offering particular discounts.

In some embodiments, the discounts are provided by a combination of the charge station and retail shops nearby. In other embodiments, the retail shops and plugs/charge providers can provide combined packages of discounts, which could drive users to their location. Accordingly, it should be understood that the dynamic generation of paths can be sponsored, such that the user can be provided with identification of charging locations along a particular path, and the discounts that may be provided along those particular paths.

FIG. 40 illustrates an example of data that can be provided or associated with the various paths describe in FIG. 39, in accordance with one embodiment of the present invention. As shown, the path that is displayed by the system of the vehicle, or the processing provided by the cloud processing, can provide information that is displayed to the user.

Again, the information displayed to the user can be displayed in the vehicle's display screen or can be displayed on the users display device (e.g. smart phone, computer, tablet, etc.). In this example, path 1 can be selected such that the user simply wishes to obtain charge and the path is not a sponsored path. In this example, the user is provided with information, such as the mapping of the path, whether the reward or sponsor is provided, the estimated trip time with charge stop, and estimated cost. This information is generated dynamically for the particular point in time when the user wishes to obtain charge. In path 1, the number stops is still 1, but the sponsored path is sponsored by big coffee company.

Big coffee company is going to provide a $2 off charge discount to the user, which lowers the price from $10 to $8 for the charge. The time increase in the charge time is only 2 min, but the discount was $2. For some people, the discount is not sufficient to overcome the additional amount of time taken to obtain the discount, but for others, the discount is sufficient. Sponsored path 2, illustrates that stops are provided and the sponsors are a quick stop market and a big coffee shop. The discount in this scenario is $4 off of the charge bill. The estimated time is now 17 min, which is 5 min longer than an unsponsored path, but the discount is $4 off a $10 non-sponsored charge.

Path 3 illustrates an example where there are 2 stops, and the sponsors are box store and big coffee company. In this example, the discount is $5 off the charge bill. And the estimated time with charge stopped is also 17 min., while the total cost to the user for the charge would be $5. Path 4 would be another sponsored path where the number of stops is 0 between the current location and the charge location. In this example, the path is sponsored by big coffee company.

Big coffee company is providing a $1 off the charge bill (or a free coffee or discount on coffee), and the estimated time with charge stop is 5 min. This example would be one where the user simply wishes to obtain charge now, but also wishes to obtain a discount. Map information (e.g., dynamically generated maps (street and satellite) on a display using internet provider data) can also be displayed on the users device or vehicle display, including any other options and discounts provided. This information can be provide using a global positioning map, with turn by turn directions, voice directions, voice activation, etc. Voice input and voice output is also possible for providing information regarding the sponsored paths. As the discounts changed during the day or different times, the different map options can also change. The providers of the discounts can also dynamically change your discounts over time based on the desired need to drive traffic to their locations or charge spots.

Accordingly, the generated maps/paths for users are incentivized to provide the user with the desired sponsored path for obtaining charge. Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parks over, and the charge can be transferred wirelessly to the vehicle via conductors on the underside of the vehicle. The vehicle can simply park in the slot and once payment is made, the charge can start to flow capacitively or wirelessly to the electric vehicle.

As can be appreciated, the sponsored path process can provide a quick and efficient manner for allowing the user to identify their desired endpoint, and provide options for traversing a path to that and point. Along that endpoint, the user can be provided with discounts for charge by sponsors, which can influence or drive people to their charging outlets. The discounts can also be provided in a hybrid manner, such as providing discounts for the charge and discounts with in the retail outlets that are located proximate to the charging stations.

Providing this information to drivers in real time is efficient for both drivers and the retail locations. Drivers in their electric vehicles will need charge, and providers of the charge will benefit from driving users to their location. If the user is still progressing along their desired path, the providers of the discount are simply providing a service and driving customers to their location, where the drivers may purchase other goods and services while the vehicle is being charged.

Sponsored paths can therefore take on various forms, depending on the user's desire to seek faster charge times, lower charge rates, or even obtain charge for free. If the provider of the charge plug or the sponsor the charge plug wishes to pay for the charge altogether, the sponsored path can identify those particular charge locations and provide the user with options to traversed that path along their desired journey from point A to point B.

In one embodiment, the sponsored paths may be generated on electronics and circuitry of the vehicle, or by processing in the cloud processing system (e.g. networked Internet systems). In some embodiments, the sponsor paths may be processed partially on the vehicle and partially on the cloud processing system. In some embodiments, the sponsored paths would be dynamically generated on the cloud processing system, and the vehicle or smart phone of the user would simply connect to the cloud processing system.

The data exchange can therefore be dynamically set to be real time, such that providers of the discounts, providers of the charge, and drivers of the vehicles can exchange information. In this example, the provided to the charge can provide discount information, incentives, etc., and the drivers of the vehicles can provide information concerning their desired paths. The processing system can then generate a plurality of options for the user to traverse from point A to point B. For example, the user can select to traverse a sponsored path, to a particular address. The display the vehicle can then requested the user identify whether or not a sponsored path is desired.

If the sponsored path is desired, the vehicle to provide one or more options for traversing the path, and the metrics associated with traversing the various types of paths, as shown in FIG. 40. This information can also be provided to the user via voice input and voice output, to avoid excessive display data inside of a vehicle. In one embodiment, instead of relying on the user to request a sponsored path, the information regarding sponsored paths can be automatically pushed to the electric vehicle as the vehicle is driven around. For instance, if a reward is being offered ahead of the driving path, the navigation system can inform the user "You will need charge in X miles, and a reward X is being offered if you charge at location X in two miles." These notifications can be pushed to the electric vehicle dynamically, and presented to the user's display on demand or can be provided as alert to the user. The alerts can be voice alerts, sound alerts, dashboard icons, gauges, or combinations thereof. Thus, the information regarding availability of charge and any rewards can be obtained dynamically by the user on demand or can be provided to the user dynamically using push notification. The notification method can also be programmed by the user, so that the notification is best received.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing information regarding batteries available for use by electric vehicles, comprising:
   (a) providing access to a processing server that communicates over a network with,
      (i) a plurality of kiosks having one or more batteries with charge available for exchange with batteries with reduced charge, the batteries of the kiosks being for use by the electric vehicles to power electric motors of the electric vehicles, each of the plurality of kiosks having a computer that is configured to communicate with the processing server;
      (ii) a plurality of user accounts that are accessible via computing devices of users for accessing the processing server, the plurality of user accounts being associated with users that registered to access the information regarding the batteries and enable access to exchange at least one battery at one of the plurality of kiosks; and
   (b) providing the processing server with access to a database that stores data or update data regarding one or more of the plurality of kiosks and the information regarding the batteries located and available at each of the plurality of kiosks;
   wherein the processing server receives requests from one or more of the plurality of user accounts via one or more computing devices to locate one or more kiosks proximate to a particular geo-location, and in response to each request, the processing server identifies at least one location having a kiosk proximate to the particular geo-location and identifies availability of batteries at the kiosk of the identified location, the processing server further identifying discounts or rates chargeable for batteries at the kiosk of the identified location;
   wherein each of the plurality of kiosks is part of a network of geographically dispersed kiosks that are each configured for communication availability of batteries to the processing server, the processing server communicates with respective computers of the plurality of kiosks to collect and receive information from each of the plurality of kiosks and to forward instructions to ones of the plurality of kiosks,
   wherein the instructions forwarded by the processing server include a reservation instruction for reserving at least one battery in response to the processing server receiving a reservation request for at least one battery of the batteries identified to be available,
   wherein the processing server is further configured to process requests for information regarding particular kiosks and provide data to enable generation of routing options to one or more of the plurality of kiosks, the requests being received by the processing server from one or more of the computing devices which include one or more of hand held-devices, or computers, or vehicle computers, or tablet computers, or smartphones;
   wherein the electric vehicles are one of a two-wheel vehicle, or a three-wheel vehicle, or a four-wheel vehicle, or a motorcycle, or a car, or a truck, or a pickup, or a utility car, or a delivery vehicle, or an industrial vehicle.

2. The method of claim 1, wherein an expiration time is associated with the reserving of the at least one battery.

3. A system for processing batteries usable in electric vehicles, the batteries being exchangeable for charged batteries, comprising,
   (a) a processing server that,
      (i) communicates with a plurality of kiosks having one or more batteries available for use by the electric vehicles, each of the plurality of kiosks includes a computer;
      (ii) accesses a plurality of user accounts;
      (iii) communicates with a plurality of applications, each of the plurality of applications being executed by a computing device, each of the plurality of applications being associated with a respective user account;
   (b) a database being accessible by the processing server, the database stores and provides access to data regarding the plurality of kiosks and batteries located at respective ones of the plurality of kiosks;
   wherein the processing server processes requests from one or more of the plurality of applications to locate kiosks proximate to a particular geo-location, and in response to each request, the processing server identifies a least one location of a kiosk proximate to the particular geo-location and availability of batteries for exchange at the kiosk of the at least one location, the processing server further providing information regarding discounts or cost for batteries at the kiosk of the at least one location, the processing server further manages the plurality of user accounts to process requests to exchange at least one battery from at least one of the plurality of kiosks;
   wherein each kiosk has a plurality of receptacle slots configured for hand-insertion of batteries into the receptacle slots and hand-removal of batteries out of the receptacle slots, wherein at least one of the receptacle slots of at least one kiosk enables charging of a battery when disposed in the at least one of the receptacle slots;
   wherein the computer of each kiosk is configured to release one or more of the batteries for hand-removal and hand-insertion based in part on communication between an electric vehicle having at least one battery and a kiosk, the communication acts to in part confirm validity of requests and to release at least one battery from the at least one of the plurality of kiosks.

4. The system of claim 3, wherein the processing server processes the discounts or cost, wherein at least one of the discounts or cost is set to provide an incentive to obtain batteries where battery excess inventory exists at particular kiosks or provide a disincentive to obtain batteries where battery inventory is low at particular kiosks.

5. The system of claim 3, wherein the processing server processes the discounts or cost at the plurality of kiosks to maintain a load balancing of inventory of batteries in a geographical region or at particular ones of the plurality of kiosks.

6. The system of claim 3, wherein batteries include tracking identifiers, the tracking identifiers being used to track a current location of batteries when in kiosks or at least a last used kiosk for particular batteries.

7. The system of claim 3, wherein each kiosk receives electronic payments or at least processes electronic payments in coordination with the processing server from users of the user accounts, wherein records of the electronic payments provide a historical tracking of battery usage for particular accounts or determination of associated discounts for the user accounts based on the historical tracking of battery usage.

8. The system of claim 3, wherein the processing server is configured to receive reservations of batteries at specific kiosks from applications associated with particular user accounts, the reservation enables confirmation that one or more reserved batteries will be held available at the kiosk when the electric vehicle arrives at the kiosk or for a limited period of time before a reservation is caused to expire.

9. The system of claim 3, wherein the processing server generates notifications to be sent to the user accounts regarding battery availability or discounts, or processes data for rendering one or more of status of batteries in the kiosks, or processes data to determine nearby kiosks relative to a geo-location, or processes data to identify deals provided at certain kiosks, or processes data to make reservations for reserving batteries at a particular kiosks, or processes data to identify gifts available at particular kiosks, or processes data to identify loyalty points for past use of batteries, or processes data to render a history of use of batteries, or processes data to determine a carbon footprint from use of the batteries, or combinations of two or more thereof.

10. The system of claim 3, wherein each of the kiosks is part of a network of geographically dispersed kiosks that are each capable of being in communication with the processing server, and the processing server collects information from each of the kiosks and forwards programming or instructions to each or select ones of the kiosks, the processing server is further configured to make available options for requesting selected information regarding particular kiosks to the applications.

11. The system of claim 3, wherein the electric vehicles are one of a two-wheel vehicle, or a three-wheel vehicle, or a four-wheel vehicle, or a motorcycle, or a car, or a truck, or a pickup, or a utility car, or a delivery vehicle, or an industrial vehicle.

12. The system of claim 11,
wherein the processing server is configured to receive a reservation of one or more available batteries for a specific kiosk from an application associated with one of the plurality of user accounts;
wherein the processing server is configured to send instructions to the specific kiosk to enable a hold of one of more of the available batteries at the specific kiosk, the hold associated with the reservation having an expiration time.

13. The system of claim 11, wherein the processing server processes data to update or post social network data regarding one or more of the kiosks or battery availability or discounts or promotions.

14. A system of a network of distributed kiosks for exchanging batteries usable to power an electric motor of an electric vehicle, comprising,
a plurality of kiosks being part of the network of distributed kiosks, wherein each of the plurality of kiosks is associated with a respective geo-location, wherein each kiosk has a plurality of slots for holding at least one battery, the at least one battery having a form factor to fit in the plurality of slots of the kiosks and at least one slot of the electric vehicle, wherein each of the plurality of kiosks having a computer;
a processing server for communicating with the computer of each of the plurality of kiosks and a plurality of applications, each of the plurality of applications being associated with a respective user account that is setup for enabling access to the server for locating particular ones of the plurality of kiosks and receiving information regarding availability of batteries at particular ones of the plurality of kiosk locations;
wherein the processing server, in response to a request from an application, is configured to provide data to the application or take an action;
wherein when the request is to locate at least one of the plurality of kiosks, the data provided to the application is to enable generation of a map that identifies a current location of an electric vehicle associated with the application and a location of at least one of the plurality of kiosks, the map enables display of at least one route from the current location of the electric vehicle to the location of the at least one of the plurality of kiosks;
wherein when the request is to reserve at least one battery at the at least one of the plurality of kiosks, the processing server takes an action by designating the at least one battery as reserved for a user account associated with the application making the request;
wherein the processing server is configured to receive information from the at least one of the plurality of kiosks when at least one battery is dispensed or received;
wherein the electric vehicle is one of a two-wheel vehicle, or a three-wheel vehicle, or a four-wheel vehicle;
wherein the application is processed by a computing device capable of making internet access for communicating with the processing server, the computing device being one of a hand held-device, or a vehicle computer, or a tablet computer, or a smartphone, or a computer.

15. The system of claim 14, wherein the processing server generates notifications to be sent to the user accounts regarding new discounts, or processes data to modify or set deals provided at certain kiosks, or processes data to set gifts available at particular kiosks, or processes data to update loyalty points for past use of batteries for particular user accounts, or processes data to render a history of use of batteries by particular user accounts, or processes data to determine a carbon footprint from use of the batteries by particular user accounts, or processes data to update or post social network data regarding one or more of the kiosks, or combinations of two or more thereof.

16. The system of claim 14, wherein an expiration time is associated with the at least one battery that is reserved.

* * * * *